United States Patent
Kakimoto et al.

(10) Patent No.: US 7,652,961 B2
(45) Date of Patent: Jan. 26, 2010

(54) OPTICAL INFORMATION RECORDING METHOD AND OPTICAL INFORMATION REGENERATION RECORDER, AND SIGNAL PROCESSING CIRCUIT, AND RECORDING REPRODUCTION PROGRAM AND INFORMATION RECORDING MEDIUM

(75) Inventors: Hiroya Kakimoto, Gunma (JP); Mitsuo Sekiguchi, Gunma (JP); Fuyuki Miyazawa, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 438 days.

(21) Appl. No.: 11/757,144

(22) Filed: Jun. 1, 2007

(65) Prior Publication Data
US 2007/0291604 A1 Dec. 20, 2007

(30) Foreign Application Priority Data
Jun. 2, 2006 (JP) .............................. 2006-155242

(51) Int. Cl.
*G11B 7/00* (2006.01)
(52) U.S. Cl. ................. 369/47.5; 369/47.53; 369/59.11; 369/53.45
(58) Field of Classification Search ................. None
See application file for complete search history.

(56) References Cited

U.S. PATENT DOCUMENTS

| 2005/0265183 | A1* | 12/2005 | Kakimoto et al. | ........ 369/47.53 |
| 2006/0215514 | A1* | 9/2006 | Watanabe et al. | ........ 369/47.53 |
| 2007/0121461 | A1* | 5/2007 | Kobayashi et al. | ....... 369/59.11 |

FOREIGN PATENT DOCUMENTS

| JP | 2002-197600 | 7/2002 |
| JP | 2002-197660 | 7/2002 |
| JP | 2003-015129 | 1/2003 |
| JP | 2003-030837 | 1/2003 |
| JP | 2003-303417 | 10/2003 |
| JP | 2004-013978 | 1/2004 |
| JP | 2004-063024 | 2/2004 |
| JP | 2004-110995 | 4/2004 |
| JP | 2004-152473 | 5/2004 |
| JP | 2004-213759 | 7/2004 |
| JP | 2004-280876 | 10/2004 |

* cited by examiner

*Primary Examiner*—Muhammad N. Edun
(74) *Attorney, Agent, or Firm*—Knobbe Martens Olson & Bear LLP

(57) ABSTRACT

An optical information recording method in an optical recording generation method for performing recording and reproduction of information by radiating laser light which is pulse-modulated according to a recording waveform having a plurality of setting parameters onto a storage medium is disclosed. The method comprises reading information recorded in the storage medium; determining positions corresponding to a detection pattern from the detection pattern and a reproduction signal, the detection pattern being defined according to a specific parameter from among the plurality of setting parameters, and the reproduction signal being obtained by reading the information; detecting the state of the reproduction signal according to the result of the determination; generating an ideal reproduction signal according to the detection pattern; and obtaining a predetermined signal evaluation index value using the result of detection of the state of the reproduction signal and the ideal reproduction signal.

23 Claims, 62 Drawing Sheets

Fig. 18
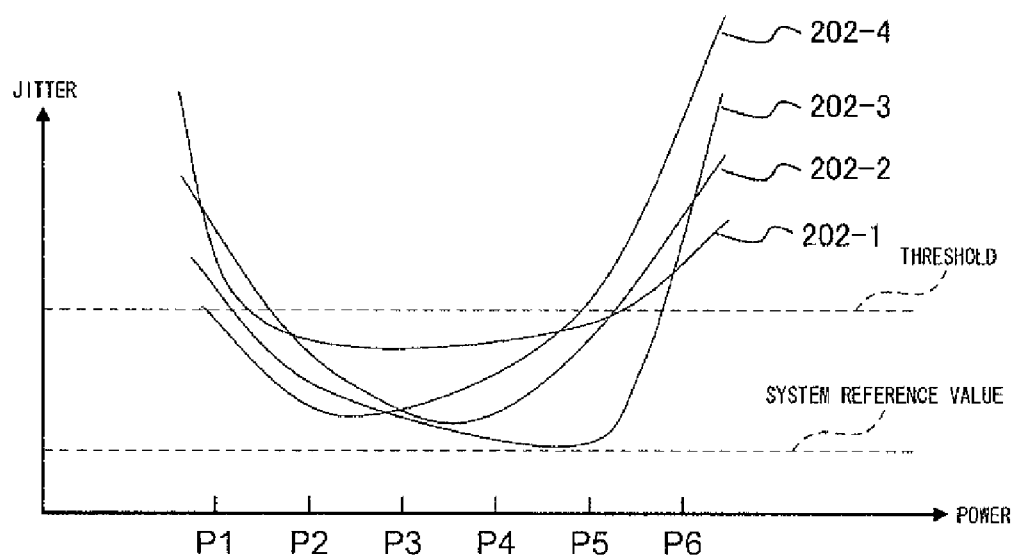

Fig. 27

| PATTERN | SHAPE | RELATION WITH THRESHOLD | PREDICTION OF RECORDING CHARACTERISTICS | PULSE WIDTH |
|---|---|---|---|---|
| 1 | OPTIONAL | MAXIMUM JITTER ≤ THRESHOLD | SAME SENSITIVITY | ±0.2T |
| 2 | VALLEY TYPE | MINIMUM JITTER ≤ THRESHOLD | SAME SENSITIVITY | ±0.1T |
| 3 | VALLEY TYPE | MINIMUM JITTER > THRESHOLD | SAME SENSITIVITY + LARGE DIFFERENCE IN FEATURE | ±0.2T |
| 4 | RIGHTWARDLY DECREASED | MINIMUM JITTER ≤ THRESHOLD | SMALL LOW SENSITIVITY | +0.1T, +0.2T |
| 5 | RIGHTWARDLY DECREASED | MINIMUM JITTER > THRESHOLD | LARGE LOW SENSITIVITY | +0.2T+0.4T |
| 6 | RIGHTWARDLY INCREASED | MINIMUM JITTER ≤ THRESHOLD | SMALL HIGH SENSITIVITY | -0.1T-0.2T |
| 7 | RIGHTWARDLY INCREASED | MINIMUM JITTER > THRESHOLD | LARGE HIGH SENSITIVITY | -0.2T-0.4T |
| 8 | CHEVRON | MAXIMUM JITTER > THRESHOLD | NG | ±0.2T- |

Fig. 38

| No | POLARITY | AMPLITUDE LEVEL |
|---|---|---|
| 1 | Mark | 5 |
| 2 | Space | 6 |
| 3 | Mark | 9 |
| 4 | Space | 8 |
| 5 | Mark | 13 |
| 6 | Space | 8 |
| . | . | . |
| . | . | . |
| . | . | . |

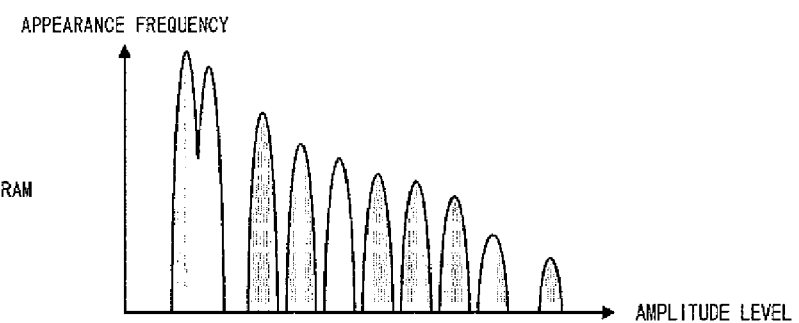
Fig. 39A MARK HISTOGRAM
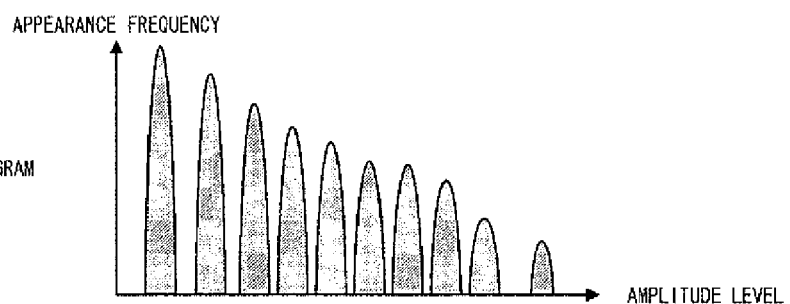
Fig. 39B SPACE HISTOGRAM

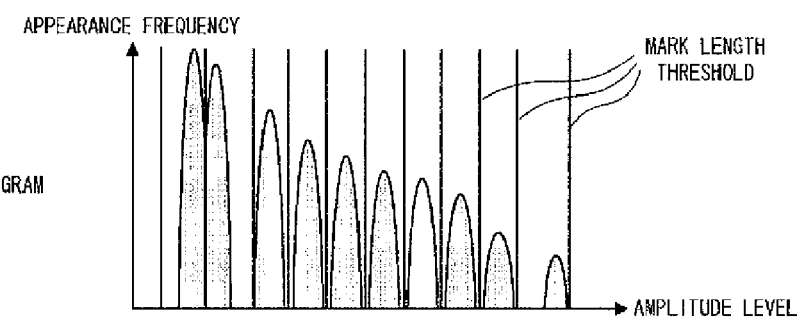
Fig. 40A MARK HISTOGRAM
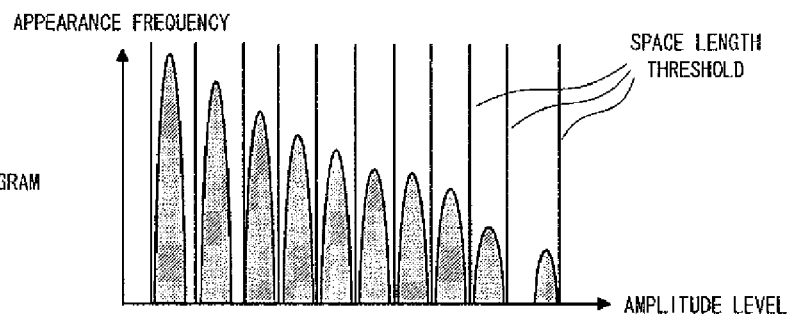
Fig. 40B SPACE HISTOGRAM

Fig. 41A

MARK LENGTH THRESHOLD

| DATA | AMPLITUDE LEVEL |
|---|---|
| 2T-3T | 2 |
| 3T-4T | 9 |
| 4T-5T | 18 |
| 5T-6T | 26 |
| 6T-7T | 35 |
| . | . |
| . | . |
| . | . |
| 14T-15T | 100 |

Fig. 41B

SPACE LENGTH THRESHOLD

| DATA | AMPLITUDE LEVEL |
|---|---|
| 2T-3T | 2 |
| 3T-4T | 10 |
| 4T-5T | 18 |
| 5T-6T | 26 |
| 6T-7T | 35 |
| . | . |
| . | . |
| . | . |
| 14T-15T | 100 |

Fig. 45A DETECT FRONT PHASE SHIFT OF MARK
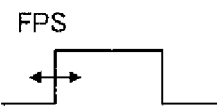
FPS
| SEARCH PATTERN | MxT THRESHOLD | | SyT THRESHOLD | | MzT THRESHOLD | |
|---|---|---|---|---|---|---|
| | min | max | min | max | min | max |
| M6 OR HIGHER-S4-M3 | 26 | 100 | 10 | 18 | 2 | 9 |
| M6 OR HIGHER-S4-M4 | 26 | 100 | 10 | 18 | 9 | 18 |
| M6 OR HIGHER-S4-M5 | 26 | 100 | 10 | 18 | 18 | 26 |
| M6 OR HIGHER-S4-M6 | 26 | 100 | 10 | 18 | 26 | 35 |
| ... | ... | ... | ... | ... | ... | ... |
Fig. 45B DETECT REAR PHASE SHIFT OF MARK
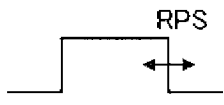
RPS
| SEARCH PATTERN | MxT THRESHOLD | | SyT THRESHOLD | | MzT THRESHOLD | |
|---|---|---|---|---|---|---|
| | min | max | min | max | min | max |
| M3-S4-M6 OR HIGHER | 2 | 9 | 10 | 18 | 26 | 100 |
| M4-S4-M6 OR HIGHER | 9 | 18 | 10 | 18 | 26 | 100 |
| M5-S4-M6 OR HIGHER | 18 | 26 | 10 | 18 | 26 | 100 |
| M6-S4-M6 OR HIGHER | 26 | 35 | 10 | 18 | 26 | 100 |
| ... | ... | ... | ... | ... | ... | ... |

| SEARCH PATTERN | SxT THRESHOLD | | MyT THRESHOLD | | SzT THRESHOLD | |
|---|---|---|---|---|---|---|
| | min | max | min | max | min | max |
| S3-M4-S6 OR HIGHER | 2 | 9 | 10 | 18 | 26 | 100 |
| S4-M4-S6 OR HIGHER | 9 | 18 | 10 | 18 | 26 | 100 |
| S5-M4-S6 OR HIGHER | 18 | 26 | 10 | 18 | 26 | 100 |
| S6-M4-S6 OR HIGHER | 26 | 35 | 10 | 18 | 26 | 100 |
| ... | ... | ... | ... | ... | ... | ... |

HID

Fig. 52A

AMOUNT OF CORRECTION OF Ttopr

| FRONT SPACE | MARK FOR CORRECTION |||||||||||
|---|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

Fig. 52B

AMOUNT OF CORRECTION OF Tlastf

| FRONT SPACE | MARK FOR CORRECTION |||||||||||
|---|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

OPTICAL INFORMATION RECORDING METHOD AND OPTICAL INFORMATION REGENERATION RECORDER, AND SIGNAL PROCESSING CIRCUIT, AND RECORDING REPRODUCTION PROGRAM AND INFORMATION RECORDING MEDIUM

BACKGROUND OF THE INVENTION

1. Field of the Invention

The present invention relates to an optical information regeneration recorder, an optical information recording method and a signal processing circuit and, more specifically, an optical information recording method and an optical information regeneration recorder, and a signal processing circuit, and a recording reproduction program, and information recording medium in which recording conditions according to compatibility between a drive and a medium may be optimized.

2. Description of the Related Technology

In recording of an optical information recording medium represented by CD-R or DVD-R (hereinafter, referred to as "media"), compatibility between target media and recorders used for recording (hereinafter, referred to as "drive") differs depending on the combination. It is because of the fact that the optimum recording conditions vary according to the type of recording material of which the media is formed or layer difference at the time of manufacture as factors on the media side, and the fact that optimum conditions vary according to the type of a pick up or a semiconductor laser which constitutes the drive or assembly variations at the time of manufacture as factors on the drive side. Actually, there exist recording conditions which are suitable for the respective combinations taking the causes on both sides into account as a compound factor.

Therefore, the related art employs an approach to store ID information indicating the type of the media and being able to be identified from the drive side on the media side, and store recording conditions prepared for the type of the media on the drive side. At the time of actual recording, the ID information of the media is read from the media loaded in the drive, and the recording conditions which are associated with the ID information (referred to as "write strategy") are used.

However, with this approach in the related art, although suitable recording conditions may be selected to some extent for verified and known media, the prepared recording conditions may not support unknown media which are not verified. Even with the known media, there are cases in which the prepared recording conditions cannot support such known media depending on the change of recording environment such as recording speed, disturbance and change with time.

Examples of such known approach which supports the unknown media include approaches disclosed in JP-A-2003-30837 and JP-A-2004-110995. In paragraph 0020 in JP-A-2003-30837, there is a statement "detects the phase gap with respect to the channel clock in every write pattern. The recording correct parameter adjustment part 12 optimizes the light waveform rule on the basis of the detected result in the phase gap detector 11 . . . ", and an approach to detect and correct the phase gap through comparison with the channel clock is disclosed.

In the paragraph 0024 in the same document, there is a statement "Subsequently, a test pattern for determining the light waveform rule is recorded. Then, the area in which the test pattern is recorded is reproduced, and the relation between the prepared light waveform rule and the amount of phase gap is inspected. In other words, the amounts of phase gap in the respective combinations of the lengths of various marks and various spaces immediately before these marks are measured. The light waveform rule in which the amount of phase gap is zero is predicted from the measured amount of phase gap to determine a desired light waveform rule . . . ", in which an approach to measure the amount of phase gap for each mark and space combination to predict the light waveform rule in which the amount of phase gap is zero is disclosed (see FIG. 16 and FIG. 20).

According to the approach stated in JP-A-2003-30837, correction on the basis of the phase gap of the write pattern is performed, and hence it is an effective approach for optimizing the strategy.

In paragraph 0045 in JP-A-2004-110995, there is a statement "a top pulse which corresponds to 3 T period and a non-multi pulse which corresponds to 8 T period are integrally (continuously) generated", and in paragraph 0046 in the same document, there is a statement "the laser power of the write pulse is regulated in two levels, and the optimum power is obtained when the ratio between the laser power (the peak value of the top pulse) Ph and the laser power (the peak value of the non-multi pulse) Pm is optimum . . . ", in which the effectiveness of optimization of the ratio of Ph/Pm is suggested.

On the other hand, employment of a PRML (Partial Response and Maximum Likelihood) method is considered as a code identification method of a high-density record system using a blue laser. In the PRML method, the code identification is performed on the basis of amplitude information of an RF signal acquired by reproducing the write pattern. Therefore, in order to achieve a high-quality recording, setting of the recording conditions using an evaluation index different from a slice method in the related art is required.

Here, JP-A-2004-13978, JP-A-2004-280876, JP-A-2003-15129, JP-A-2004-63024, JP-A-2004-213759 and JP-A-2004-152473 are known as methods of setting the recording conditions on the basis of the amplitude information of the RF signal.

In JP-A-2004-13978 and JP-A-2004-280876, a method of determining conditions of a first pulse, an intermediate pulse and a last pulse with the index of asymmetry is disclosed, a method of determining conditions of a write pulse on the basis of the difference between an ideal waveform with an assumption of PRML and a reproduced waveform acquired from an actual record is disclosed in JP-A-2003-15129, JP-A-2004-63024 and JP-A-2004-213759, and a method of determining a start position of the first pulse with the index of asymmetry and the widths of the first pulse and the intermediate pulse with the index of jitter is disclosed in JP-A-2004-152473.

A method disclosed in JP-A-2002-197660 is known as a method of performing code determination using a bitabi decoder.

In JP-A-2002-197660, a method of identifying the code in the reproduction signal and detecting amplitude and asymmetry of a reproduction signal by synchronizing output from the bitabi decoder which receives supply of digitally sampled reproduction signals and the timing-regulated digital reproduction signal using a delay circuit is disclosed.

In JP-A-2003-15129 and JP-A-2004-63024, a method of evaluating the amount of reference from ideal by the comparison with an ideal signal which is originally to be detected is described. The method of this type is described in the documents shown above and also in JP-A-2002-197600 and JP-A-2003-303417, and is a method effective for evaluating and setting high-density recorded data such as Blue standard.

However, in the method disclosed in JP-A-2003-30837, the strategy stored in the drive in advance is fine adjusted as in the related art, and hence a desirable record characteristic is hardly satisfied for the media which does not match the strategy stored in advance.

In the method disclosed in JP-A-2004-110995, the initial values of Ph and Pm are provisionally set on the basis of the values stored in the drive or the media and then the ratio of Ph/Pm is obtained as described in the paragraph 0067 in the same document. Therefore, the desirable record characteristic is hardly satisfied for the media which do not match the provisionally set value as in the case of the JP-A-2003-30837.

In the methods disclosed in JP-A-2004-13978 and JP-A-2004-280876, the conditions of the first pulse and the last pulse are determined at the same time using the same index. Therefore, the shortest pulse, which is most likely to be affected by error, is not optimized, and hence is affected easily by the disturbance, so that the probability of occurrence of error increases. Therefore, in these methods, a recording margin is large and hence a high-quality record system can hardly be provided.

In the methods disclosed in JP-A-2003-15129, JP-A-2004-63024 and JP-A-2004-213759, since only the pulse shapes which are generally known are corrected, and hence it is difficult to specify which part of the pulse shape is effective for which index. Therefore, the recording margin is large and hence the high-quality record system can hardly be provided as in the case of JP-A-2004-13978 and JP-A-2004-280876.

In the method of JP-A-2004-152473, although the start position of the first pulse is determined with the index of asymmetry, the widths of the first pulse and the intermediate pulse are determined simultaneously with the index of jitter. Therefore, the recording margin is large and hence the high-quality record system can hardly be provided as in the case of JP-A-2004-13978 and JP-A-2004-280876.

In the method disclosed in JP-A-2002-197660, it is assumed that the quality of the reproduction signal has at least a quality which may be decoded through the bitabi decoding. Therefore, when the quality of the reproduction signal is low, the code is erroneously identified, and hence there remains a problem that the amplitude level of the data code to be obtained cannot be detected. Specifically, erroneous identification may often occur for the unknown media in which the write strategy is not registered in advance in a memory of the recorder.

In order to cope with increase channel bit rate in association with increase in density of the recording data, when the signal length is short, samples cannot be obtained by the number sufficient for the level detection with a low-speed A/D converter, and cost increase is resulted when a high-speed A/D converter is used.

The evaluation of the amount of reference from the idea described in JP-A-2003-15129, JP-A-2004-63024, JP-A-2002-197600 and JP-A-2003-303417 is an evaluation and setting method using evaluation indices for the recording state represented by SbER and PRSNR. Such method is effective for total evaluation of the recording state, and, however, is subject to mutual affect such that when one of the parameter conditions is optimized, the other parameter condition which is adjusted previously is deviated from the optimum state, and hence it is not a satisfactory method for partly or respectively optimizing a plurality of parameters possessed by a recording power or write pulse conditions.

SUMMARY OF CERTAIN INVENTIVE ASPECTS

Accordingly, it is an object to provide a method of optimizing recording conditions according to compatibility between drives and media and, more specifically, to provide a method of optimizing recording conditions effective in a case in which a method such as PRML in which the code identification is performed on the basis of amplitude information of RF signals is assumed, and a method of evaluation of a recording state suitable for partly or respectively optimizing a plurality of parameters possessed by a recording power or write pulse conditions.

In order to achieve the above-described object, a first aspect of the invention is an optical information recording method in an optical recording regeneration method for performing recording and reproduction of information by radiating laser light which is pulse-modulated according to a recording waveform having a plurality of setting parameters onto a storage medium including the steps of:

reading information recorded in the storage medium;

determining positions corresponding to a detection pattern from the detection pattern and a reproduction signal, the detection pattern being defined according to a specific parameter from among the plurality of setting parameters, and the reproduction signal being obtained by reading the information;

detecting the state of the reproduction signal according to the result of the determination;

generating an ideal reproduction signal according to the detection pattern; and obtaining a predetermined signal evaluation index value using the result of detection of the state of the reproduction signal and the ideal reproduction signal.

Preferably, a step of controlling the specific parameter using the evaluation index value is further provided.

Preferably, the specific parameter is a laser power intensity condition.

Preferably, the specific parameter is a write pulse width condition.

Preferably, the specific parameter is a start position and/or an end position of the laser radiation.

Preferably the reproduction signal is digital data obtained by sampling light returned from the storage medium at a predetermined frequency.

Preferably, the reproduction signal is a signal obtained by applying a waveform equalizing process to the digital data obtained by sampling light returned from the storage medium at a predetermined frequency.

Preferably, the detection pattern is a code pattern having at least one or more marks and space periods.

Preferably, the step of determining the positions corresponding to the detection pattern outputs a detection instruction signal as the result of determination, and the detection instruction signal is a gate signal including the positions corresponding to the detection pattern.

Preferably, the ideal reproduction signal is an ideal signal corresponding to the reproduction signal obtained when the mark and the space corresponding to the detection pattern are recorded accurately in the storage medium.

Preferably, the signal evaluation index value is an evaluation index obtained by quantizing the amount of reference of the detection signal with respect to the ideal signal.

Preferably, the signal evaluation index value is an evaluation index showing the possibility that the detection signal is recognized as a code pattern different from the one actually recorded.

Preferably, the control of the specific parameter is achieved by changing conditions of the specific parameter so that the evaluation index value becomes smaller.

Preferably, control of the specific parameter is achieved by changing conditions of the specific parameter so that the evaluation index value satisfies a predetermined target level or a predetermined allowable range.

One inventive aspect provides an optical information regeneration recorder in an optical recording reproduction device for performing recording and reproduction of information by radiating laser light which is pulse-modulated according to a recording waveform having a plurality of setting parameters onto a storage medium including:

means that reads information recorded in the storage medium;

means that determines positions corresponding to a detection pattern from the detection pattern and a reproduction signal, the detection pattern being defined according to a specific parameter from among the plurality of setting parameters, and the reproduction signal being obtained by reading the information;

means that detects the state of the reproduction signal according to the result of the determination;

means that generates an ideal reproduction signal according to the detection pattern; and means that obtains a predetermined signal evaluation index value using the result of detection of the state of the reproduction signal and the ideal reproduction signal.

Preferably, means for displaying at least one of a value obtained in a process of obtaining the evaluation index value, the recording conditions, the quality of the storage medium, and the result of processing is further provided.

Preferably, means for storing at least one of a recording reproduction setting condition used in a process of obtaining the evaluation index value, an obtained characteristic value, a calculated evaluation parameter value, the amount of laser power correction, storage medium positional information, temperature information, moisture information and the result of processing is further provided.

Preferably, means for registering a target value and/or an allowable range of the signal evaluation index value in advance is further provided.

According to another aspect of the invention, there is provided a signal processing circuit integrated in an optical recording reproduction device for performing recording and reproduction of information by radiating laser light which is pulse-modulated according to a recording waveform having a plurality of setting parameters onto a storage medium, including:

means that reads information recorded in the storage medium;

means that determines positions corresponding to a detection pattern from the detection pattern and a reproduction signal, the detection pattern being defined according to a specific parameter from among the plurality of setting parameters, and the reproduction signal being obtained by reading the information;

means that detects the state of the reproduction signal according to the result of the determination;

means that generates an ideal reproduction signal according to the detection pattern; and means that obtains a predetermined signal evaluation index value using the result of detection of the state of the reproduction signal and the ideal reproduction signal.

According to another aspect of the invention, there is provided an optical recording preproduction program for causing a computer to execute an optical recording reproduction processing for performing recording and reproduction of information by radiating laser light which is pulse-modulated according to a recording waveform having a plurality of setting parameters onto a storage medium, the program including the steps of;

reading information recorded in the storage medium;

determining positions corresponding to a detection pattern from the detection pattern and a reproduction signal, the detection pattern being defined according to a specific parameter from among the plurality of setting parameters, and the reproduction signal being obtained by reading the information;

detecting the state of the reproduction signal according to the result of the determination;

generating an ideal reproduction signal according to the detection pattern; and obtaining a predetermined signal evaluation index value using the result of detection of the state of the reproduction signal and the ideal reproduction signal.

According to still another aspect of the invention, there is provided an optical information recording medium in which information is stored by radiating laser light which is pulse-modulated according to a recording waveform having a plurality of setting parameters onto a storage medium, the information being stored by the steps of:

reading information recorded in the storage medium;

determining positions corresponding to a detection pattern from the detection pattern and a reproduction signal, the detection pattern being defined according to a specific parameter from among the plurality of setting parameters, and the reproduction signal being obtained by reading the information;

detecting the state of the reproduction signal according to the result of the determination;

generating an ideal reproduction signal according to the detection pattern; and obtaining a predetermined signal evaluation index value using the result of detection of the state of the reproduction signal and the ideal reproduction signal.

Preferably, a target value and/or an allowable range of the signal evaluation index value is recorded in advance.

In the above description, the recording waveform preferably includes a row of a plurality of types of codes, and the plurality of types of code information corresponds to 3 T to 11 T in the case of a CD system, corresponds to 3 T to 11 T and 14 T in the case of a DVD system, corresponds to 2 T to 8 T in the case of Blu-ray system, and corresponds to 2 T to 11 T in the case of the HD-DVD system.

As described above, the recording conditions which are closer to the optimum condition may be obtained even though the media is unknown for the drive. Also, the recording conditions which are closer to the optimum conditions may be obtained corresponding to the change in recording environment, such as the recording velocity, the disturbance and the change with time, and the piece-to-piece variations of the drive even for the known media. This inventive aspect is effective when being applied to a system such as PRML performs code identification particularly on the basis of the amplitude information of the RF signal.

BRIEF DESCRIPTION OF THE DRAWINGS

FIG. 18 is a conceptual drawing showing an example of the flow shown in FIG. 17;

FIG. 27 is a drawing showing an example of a case in which Step S120 in FIG. 16 is performed using eight patterns;

FIG. 38 is a conceptual drawing showing a storage image of the amplitude level shown in FIG. 36;

FIGS. 39A and 39B are conceptual drawings showing images of preparation of histograms shown in FIG. 36;

FIGS. 40A and 40B are conceptual drawings showing an image of determination of the threshold show in FIG. 36;

FIGS. 41A and 41B are conceptual drawings showing an example of the threshold obtained by the method shown in FIGS. 40A and 40B;

FIGS. 45A and 45B are conceptual drawings showing configurations of tables for searching a specific pattern used in the mark front phase shift detection and the rear phase shift detection;

FIGS. 52A and 52B are conceptual drawings showing configurations of tables for storing the amounts of correction Ttopr and Tlastf;

DESCRIPTION OF CERTAIN INVENTIVE EMBODIMENTS

Referring now to the attached drawings, embodiments of the invention will be described. The invention is not limited to the embodiments shown below, and may be modified as needed.

Figure 1:
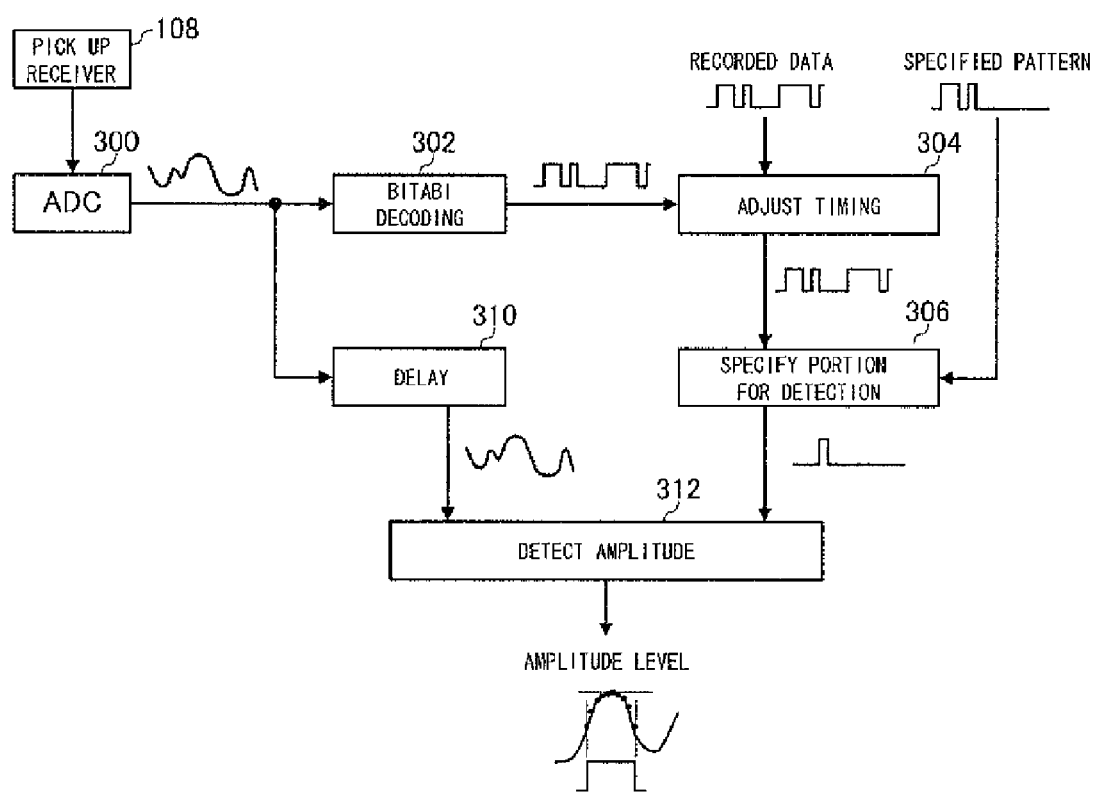
FIG. 1 is a block diagram showing a configuration of amplitude information detection according to an embodiment.

FIG. 1 is a block diagram showing a configuration of amplitude information detection according to an embodiment of the invention. As shown in FIG. 1, in this amplitude detection block, an RF signal received from a pick up receiver 108 is applied with code determination in a bitabi decoder 302 and, using the result, is synchronized with a write pulse to determine a code included in a reproduction signal and, using the result, a portion of the code for detection, and the amplitude of the specified portion is detected. Hereinafter, description will be given for each component.

An A/D converter 300 converts the RF signal received from the pick up receiver 108 into digital data at a predetermined sampling frequency and outputs the same to the bitabi decoder 302 and a delay circuit 310. The sampling frequency employed here is, for example, 72 MHz when a record system including a standard clock of 64.8 MHz and a 2 T code of 32.4 MHz is assumed. The change of the amplitude of the RF signal is converted into a digital signal by this A/D converter.

The bitabi decoder 302 performs the code determination on the basis of the data after sampling supplied from the A/D converter 300, and outputs the result to a timing regulator 304. The configuration disclosed in JP-A-2002-197660 may be employed for the bitabi decoder 302. Coding information included in the RF signal is reproduced by the bitabi decoder 302, and is outputted as pulse data including code rows.

The timing regulator 304 matches recorded data with the timing of the reproduction signal through a pattern matching between a signal supplied from the bitabi decoder 302 and the recorded data, and outputs the timing-regulated recorded data to a detection portion specifying unit 306.

Pattern matching between the output data from the bitabi decoder 302 and the recorded data is performed by specifying specific code rows defined as the synchronous patterns from both data, and matching the timing of the synchronous patterns. Preferably, such code patterns that the result of the bitabi decoding is hardly affected by the recording state are selected as synchronous patterns.

The detection portion specifying unit 306 extracts a specified pattern specified from the timing-regulated recorded data, and outputs a gate signal for specifying a portion for detection to an amplitude detector 312. The specified pattern is set as specific code patterns stored in advance for each detection element, such as asymmetry detection, phases shift detection, heat interference detection.

For example, in a case where the specific pattern is defined by a row of three continuous codes of X, Y and Z, the asymmetry detection pattern targets at the specific length for Y at the center, and all the codes for X and Z at both ends, and the phase shift detection pattern and the heat interference detection pattern employ a pattern in which one of X, Y and Z is set to be variable and remaining codes are fixed. The specific pattern will be described in detail later.

The delay circuit 310 delays data supplied from the A/D converter 300 and outputs the same to the amplitude detector 312. The amount of delay is set to a timing at which the output from the delay circuit 310 is synchronized with the output from the detection portion specifying unit 306.

The amplitude detector 312 accumulates the amplitude data at the portion specified by the detection portion specifying unit 306 from the reproduction signal supplied from the delay circuit 310, and outputs a maximum value as an amplitude level of a code specified as a code for detection.

Figure 2:
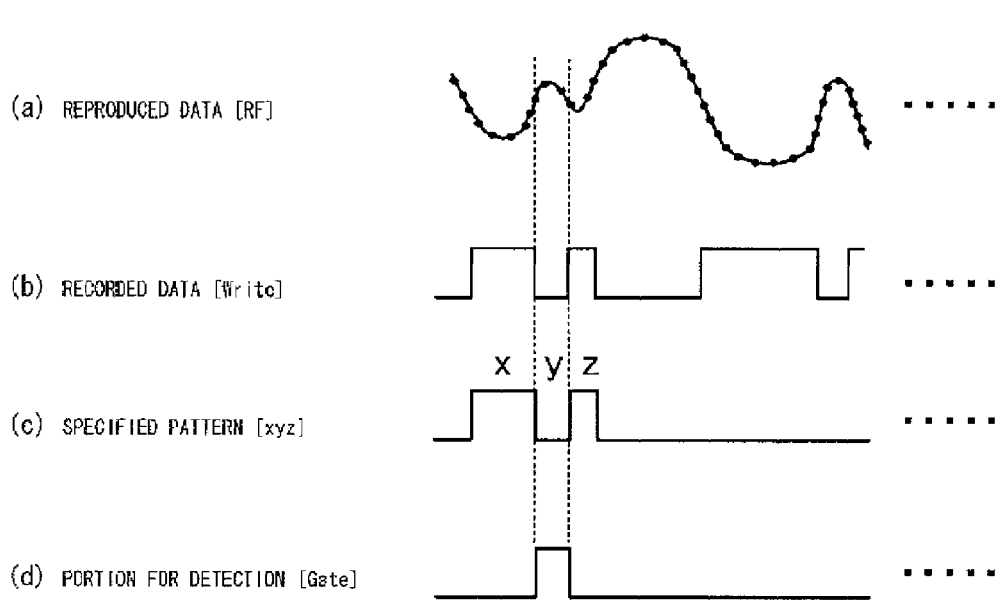
FIG. 2 is a timing chart showing an example of operation of the amplitude detection block shown in FIG. 1.

FIG. 2 is a timing chart showing an example of operation of the amplitude detection block shown in FIG. 1. As shown in the part indicated by (a), an RF signal detected by pick up receiver is sampled by the A/D converter and points indicated by black points in the drawing are converted into digital data in sequence as data.

Here, as shown in the part indicated by (b) in FIG. 2, the timing-regulated recorded data is outputted in a phase synchronous with reproduced data shown in the part indicated by (a) in FIG. 2, the portion specified by the specified pattern xyz shown in the part indicated by (c) in FIG. 2 is specified, and the portion for detection y is outputted as a gate signal as shown in the part indicated by (d) in FIG. 2. Consequently, the data corresponding to the portion for detection y from among the sampling data shown in the part indicated by (a) in FIG. 2 is taken as the amplitude information of the specified code.

Figure 3:
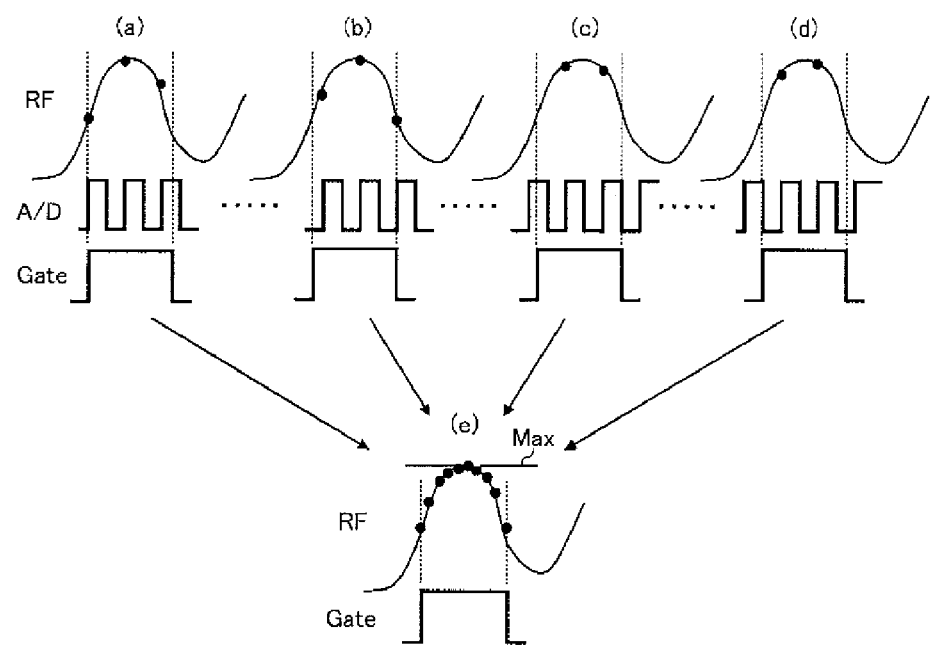
FIG. 3 is a conceptual drawing showing a concept of detection of an amplitude level that an amplitude detector performs shown in FIG. 1.

FIG. 3 is a conceptual drawing showing a concept of amplitude level detection that the amplitude detector shown in FIG. 1 performs. As shown in the parts indicated by (a) to (d) in FIG. 3, the value of the amplitude level detected varies according to the relation between the appearance position in the reproduction signal and the sampling timing of the A/D converter even the specified code is the same.

Therefore, as shown in the part indicated by (e) in FIG. 3, the peak value of the reproduced RF signal is taken with high degree of accuracy by collecting sampling data relating to the codes of the same type existing in the specified patterns of the same type until the total number of the sample reaches a predetermined value, and the maximum value or a minimum value in the collected samples is employed as the amplitude level of the corresponding code. Whether to detect the maximum value or the minimum value is determined according to the polarity of the signal.

Figure 4:
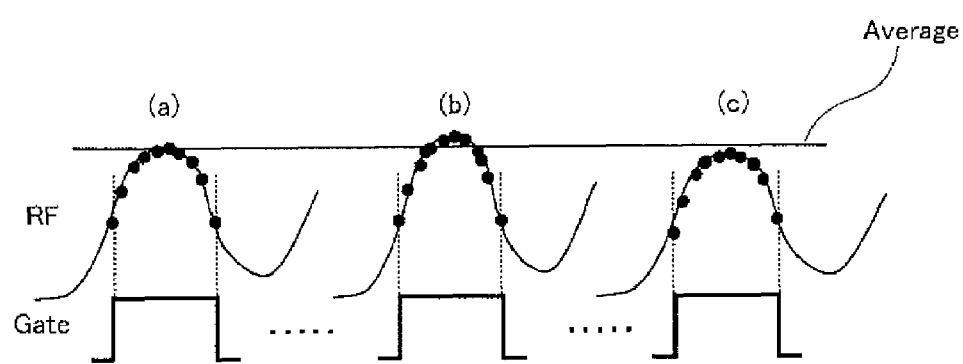
FIG. 4 is a conceptual drawing showing an example of a case in which the amplitude detection with higher degree of accuracy is performed by repeating collection of the sampling data shown in FIG. 3 by a plurality of times.

FIG. 4 is a conceptual drawing showing an example of a case in which the amplitude detection with higher degree of accuracy is performed by repeating collection of the sampling data shown in FIG. 3 by a plurality of times. As shown in the respective drawings, since the recording state and the detection state vary even for the code of the same type, the sampling of a predetermined times shown in FIG. 3 is performed by a plurality of times, and the average of the maximum values or the minimum values may be employed as the amplitude level relating to the codes.

FIGS. 5A to 5D are conceptual drawings showing a concept of setting of a specified pattern used in a phase shift correction or the heat interference correction. As shown in the respective drawings, the effect on the reproduced RF signal when front end and the rear ends of a mark are changed, that is, when the phase change is applied thereto, varies with the size of the mark for the effective diameter of a laser spot. Therefore, when setting the specified pattern, it is preferable to consider the relation between the spot effective diameter and the code length.

Figure 5A:
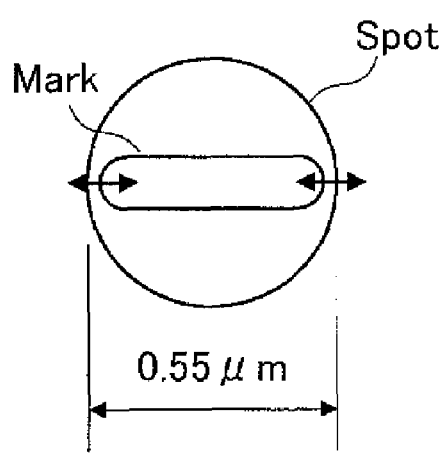
FIGS. 5A to 5D are conceptual drawings showing a concept of setting of the specified pattern used in a phase shift correction or a heat interference correction.

More specifically, as shown in FIG. 5A, when the phase of the mark smaller than the spot effective diameter is changed, the entire mark is contained within the spot. Therefore, as shown in FIG. 5C, the acquired RF signal is affected by the phase change over the entire area of the profile.

Figure 5B:
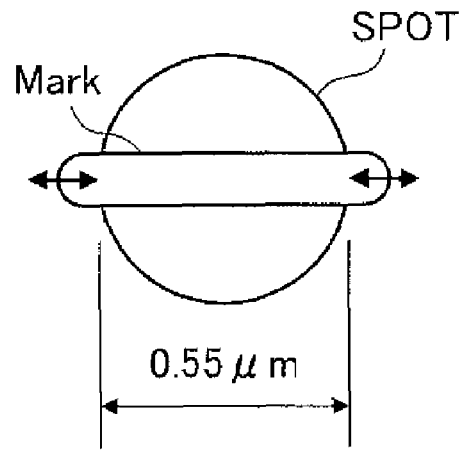
Figure 5C:
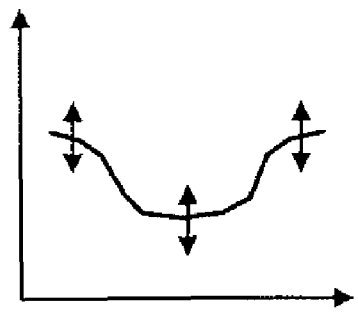
Figure 5D:
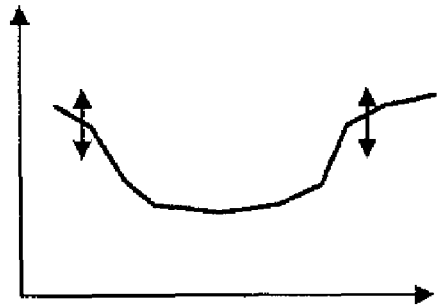

On the other hand, as shown in FIG. 5B, when the phase of the mark larger than the spot effective diameter is changed, the edge portions of the mark are protruded from the spot, as shown in FIG. 5D, the profile of the acquired RF signal near edges is affected by the phase change. However, there is little change in amplitude level.

Therefore, it is preferable to use a short mark or space shorter than the effective diameter of the laser spot for the portion for detection of the specified pattern used for the phase shift correction, and further to use code such as 4 T or 5 T longer than the code of high-density such as 2 T or 3 T which is hard to record.

For example, assuming that the effective diameter of the laser spot used for the HD-DVD system is 0.55 µm, it is preferable to use 4 T code having a length of 0.41 µm or 5 T code having a length of 0.51 µm for the portion for detection.

Figure 6:
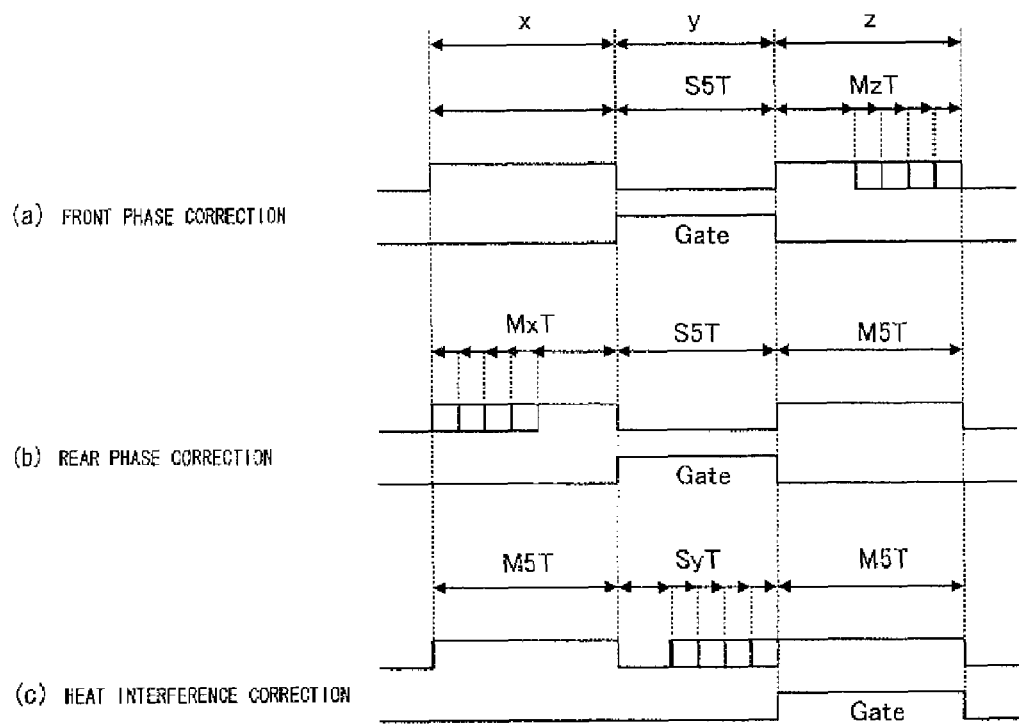
FIG. 6 is a conceptual drawing showing an example of a specified pattern used in the phase shift correction and the heat interference correction.

FIG. 6 is a conceptual drawing showing an example of the specified pattern used in the phase shift correction and the heat interference correction. As shown in the part indicated by (a) in FIG. 6, in the case of front phase correction, in a specified pattern including a row of continuous codes of xyz, a portion for detection y specified by a gate signal Gate is set to be 5 T spaces, and a preceding mark x is set to have a fixed length (preferably, 5 T or longer), and a following mark z is set to be a variable length mark of MzT (z=2 to 11).

Then, test recording by the specified pattern is performed and the front end portions which correspond to the start positions of the laser radiation of the respective following marks 2 T to 11 T is adjusted on the basis of the change of the amplitude obtained by reproducing 5 T spaces for detection. At this time, it is preferable to set the code whose signal modulation is almost equivalent to a rarefaction mark such as 11 T, for example, 8 T as the reference mark, and determine the difference as the amount of amplitude shift.

In the case of rear phase correction shown in the part indicated by (b) in FIG. 6, a portion for correction, in the specified pattern including the row of continuous codes of xyz, the portion for detection y specified by the gate signal Gate is set to be 5 T spaces, and the following mark z is set to have a fixed length (preferably, 5 T or longer), and the preceding mark x is set to be the variable length mark of MzT (z=2 to 11).

Then, the test recording by the specified pattern is performed and the rear end portions which correspond to the end positions of the laser radiation of the respective following marks 2 T to 11 T is adjusted on the basis of the change of the amplitude obtained by reproducing 5 T spaces for detection. At this time, it is preferable to set a code whose signal modulation is almost equivalent to the rarefaction mark such as 11 T, for example, 8 T as a reference mark, and determine the difference as the amount of amplitude shift.

As shown in the part indicated by (c) in FIG. 6, in the case of heat interference correction, in the specific pattern including the row of continuous codes of xyz, the portion for detection z specified by the gate signal Gate is set to be 5 T mark, and the preceding space y is set to be the variable length mark of MzT (z=2 to 11), and the preceding mark x is set to have the fixed length (preferably, 5 T or longer).

Then, the test recording by the specified pattern is performed and the front end portions which correspond to the start positions of the laser radiation of the marks 2 T to 11 T is adjusted on the basis of the change of the amplitude obtained by reproducing 5 T mark for detection. At this time, it is preferable to set the code whose signal modulation is almost equivalent to the rarefaction mark such as 11 T, for example, 8 T as a reference mark, and determine the difference as the amount of amplitude shift.

Figure 7:
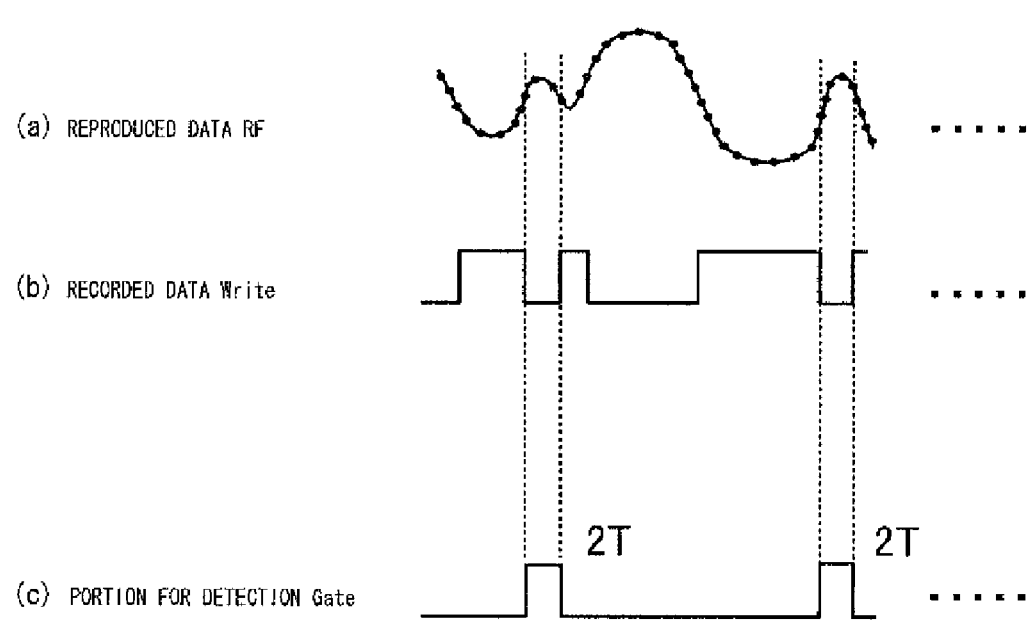
FIG. 7 is a timing chart showing an example of the specified pattern used at the time of detection of an amplitude level for asymmetry detection.

FIG. 7 is a timing chart showing an example of the specified pattern used at the time of amplitude level detection for asymmetry detection. As shown in FIG. 7, when detecting the amplitude level for asymmetry, a gate signal as shown in the part indicated by (c) in FIG. 7 is used to extract all portions which match the codes for detection irrespective of the codes in the front and rear instead of extracting the portion which matches the specified pattern from the recorded data.

For example, when detecting asymmetry 2T3T, a pulse which corresponds to 2 T and a pulse which corresponds to 3 T are extracted independently from the recorded data shown in the part indicated by (b) in FIG. 7 to generate the gate signal as shown in the part indicated by (c) in FIG. 7 and, using the generated gate signal, sampling data of a portion which corresponds to 2 T and sampling data of a portion which corresponds to 3 T are collected respectively from the reproduced data as shown in the part indicated by (a) in FIG. 7, and the asymmetric property of the amplitude level of 2 T and the amplitude level of 3 T detected using them is evaluated.

Figure 8:
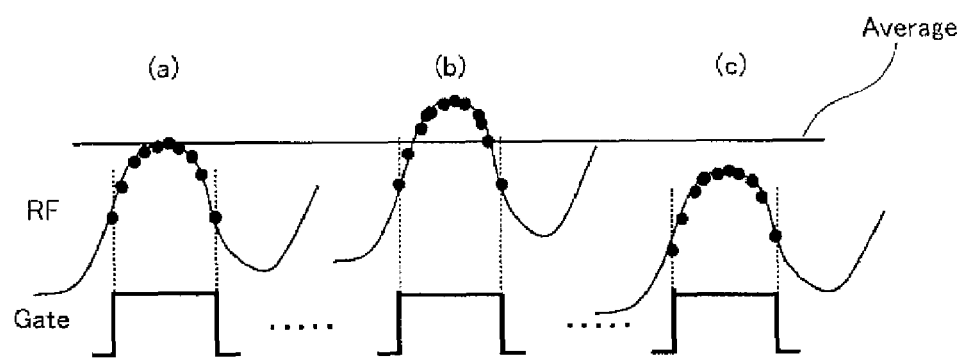
FIG. 8 is a conceptual drawing showing how the amplitude level detected using a gate signal shown in the part indicated by (c) in FIG. 7 looks.

FIG. 8 is a conceptual drawing showing how the amplitude level detected using the gate signal shown in the part indicated by (c) in FIG. 7 looks. As shown in FIG. 8, when the amplitude level of a specific code is detected irrespective of the code lengths in front and rear, fluctuation of the amplitude level is larger than the case in which only the codes included in the specified pattern of the same type are detected. However, by obtaining the average value, the amplitude level for the asymmetry detection may be specified.

Figure 9:
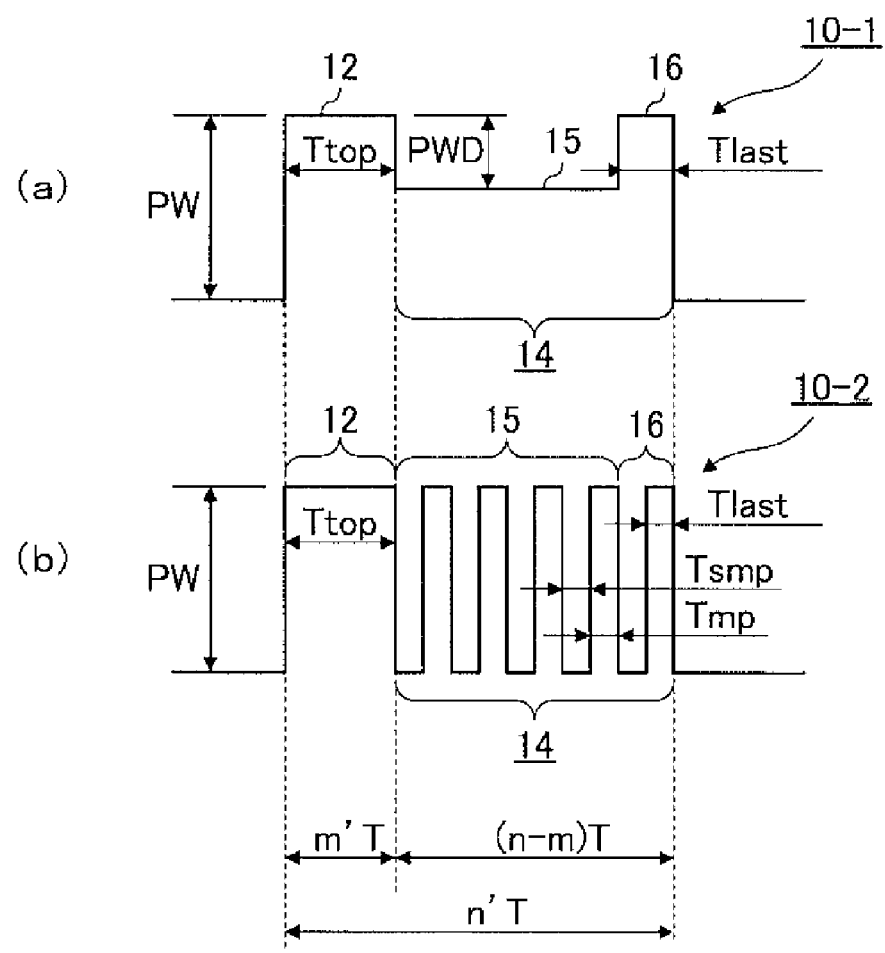
FIG. 9 is a conceptual drawing showing a configuration of write pulses according to the embodiment.

FIG. 9 is a conceptual drawing showing a configuration of write pulses according to the embodiment. The upper part of the drawing indicated by (a) is an example of a case in which a single pulse having a single pulse pattern is used, and the lower part of the drawing indicated by (b) is an example of a case in which a multi-pulse having a plurality of pulse patterns is used. As shown in FIG. 9, a single pulse 10-1 and a multi-pulse 10-2 include a top pulse 12 arranged at the first position of the write pulse and a subsequent pulse 14 following thereto, and the subsequent pulse 14 includes an intermediate pulse 15 following the top pulse 12 and a last pulse 16 arranged at the end of the write pulse.

Assuming that the lengths of the write pulses 10-1 and 10-2 are n'T, the top pulse 12 has a length of m'T, and the subsequent pulse 14 has a length of (n–m)T. This embodiment is achieved on the assumption of m=2, and n=2 to 11. The sign T represents a unit time defined by an optical disk system, and its cycle is determined by a clock signal.

The conditions of the write pulses 10-1 and 10-2 are determined by performing test recording in a state in which an optical information recording medium (hereinafter, referred to as "media" and "disk") is loaded in an optical information regeneration recorder (hereinafter, referred to as "recorder" or "drive").

Here, the energy amount of the write pulses as a total is defined by the height indicated by a main power PW, and the energy amount of a first stage provided to the front end of a record mark is defined by the length indicated by the top pulse width Ttop. The main power PW is preferably the highest value in the write pulses 10-1 and 10-2, and the top pulse width Ttop has a width corresponding to the shortest record mark having a length of 2 T. Since the appearance probability of the write pulses having the shortest width is the highest and hence such white pulses have a significant effect on the record characteristic. Therefore, it is preferable to fix the optimum conditions of the power PW and the width Ttop of the top pulse 12 first.

As regards conditions of the intermediate pulse 15, in the case of the single pulse 10-1, the record mark is prevented from becoming a tear drop shape as shown in the part indicated by (a) in FIG. 9 by providing a low power area lower than the main power PW by the amount of PWD and defining the corresponding amount. In the same manner, in the case of the multi-pulse 10-2, the record mark is prevented from becoming the tear drop shape as shown in the part indicated by (b) in FIG. 9 by defining the width Tmp of the intermediate pulse 15 positioned between the top pulse 12 and the last pulse 16 or defining the duty ratio between the Tmp and Tsmp.

The conditions of the last pulse 16 are determined by adjusting the width Tlast of the last pulse 16 arranged at the end of the write pulse. Determination of the conditions of the subsequent pulses including the intermediate pulse 15 and the last pulse 16 are achieved with reference to the conditions of the top pulse.

Figure 10A:
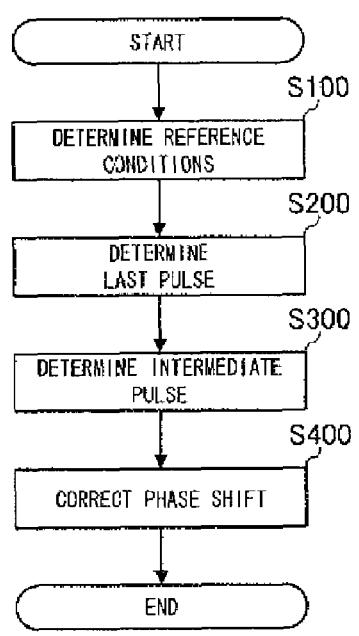
FIGS. 10A to 10D are conceptual drawings showing a first method for determining conditions of the write pulse.
Figures 10B, 10C:
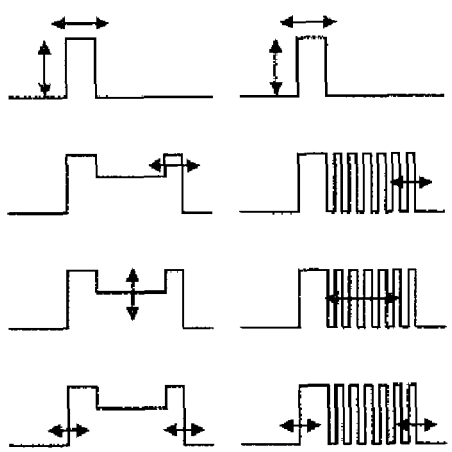
Figure 10D:
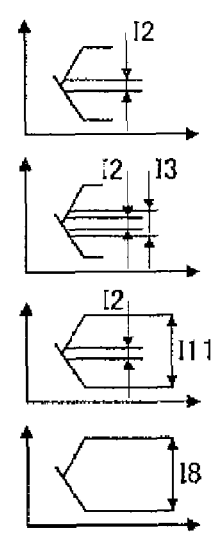

FIGS. 10A to 10D are conceptual drawings showing a first method for determining the conditions of the write pulse. FIG. 10A is a flowchart showing a determination process of the conditions of the write pulse, FIG. 10B is a drawing showing portions for adjustment in the case of the single pulse step-by-step, FIG. 10C is a drawing showing portions for adjustment in the case of the multi-pulse step-by-step, and FIG. 10D is a drawing showing parameters to be indexed in each step in FIG. 10A.

As shown in FIG. 10A, when determining the conditions of the write pulse in this method, the reference conditions of the write pulses corresponding to the respective codes are determined (Step S100). Setting of the reference conditions is achieved by obtaining conditions under which the shift amount of an amplitude value I2 of 2 T, which is the shortest code, assumes 0 or a predetermined target value or a value close thereto by adjusting the power and the width of the top pulse as shown by the portions corresponding to Step S100 from among FIGS. 10B, 10C and 10D.

The shift amount of amplitude may be determined by referencing the error value as an index in the detection pattern mainly including 2 T patterns from the recorded result in a randomly selected or a specific pattern, by referencing the shift amount of amplitude according to the specified pattern described in conjunction with FIG. 1 and FIG. 2, or by referencing the shift amount of amplitude obtained from all the code for detection irrespective of the specified pattern described in conjunction with FIG. 7 and FIG. 8.

Subsequently, the recording conditions of the last pulse are determined by performing the test recording using the reference conditions (Step S200). The condition setting of the last pulse is achieved by adjusting the width of the last pulse in the state in which the conditions of the intermediate pulse are fixed to the predetermined conditions, and obtaining the conditions under which the asymmetry 2T3T which indicates the asymmetric property between the amplitude value I2 of 2 T, which is the shortest code, and the amplitude value I3 of 3 T, which is the second shortest code, takes 0, a predetermined target value, or a value near thereto as a consequence as shown by the portions corresponding to Step S200 from among FIGS. 10B, 10C and 10D.

Subsequently, the recording conditions of the intermediate pulse are determined by performing the test recording using the reference conditions obtained in Step S100 and the last pulse obtained in Step S200 (Step S300). The condition setting of the intermediate pulse is achieved by adjusting the power of the intermediate pulse in the case of the single pulse, adjusting the width of a divided pulse constituting the intermediate pulse in the case of the multi-pulse, and obtaining the conditions under which the asymmetry 2T11T which indicates the asymmetric property between the amplitude value I2 of 2 T, which is the shortest code, and the amplitude value I11 of 11 T, which is the longest code, takes 0, a predetermined target value, or a value close thereto as a consequence as shown by the portions corresponding to Step S200 from among FIGS. 10B, 10C and 10D.

Since the conditions of the write pulse are determined by performing the aforementioned Steps S100 to S300, the phase shift correction of the write pulse is performed by further performing the test recording using the write pulse (Step S400). The phase shift correction is achieved by adjusting the start position and the end position of the write pulse, and obtaining the conditions under which the corresponding code, for example, the shift amount of the amplitude value I8 of 8 T in this example takes 0, a predetermined target value, or a value close thereto as a consequence as shown by the portions corresponding to Step S400 from among FIGS. 10B, 10C and 10D. The shift amount is preferably the shift amount of amplitude according to the patterns before and after 8 T.

Figure 11A:
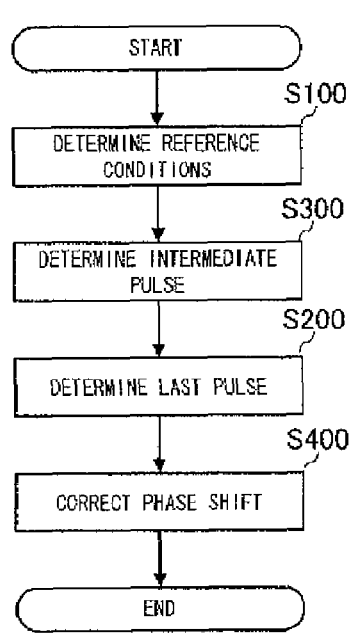
FIGS. 11A to 11D are conceptual drawings showing a second method for determining the conditions of the write pulse.
Figure 11B:
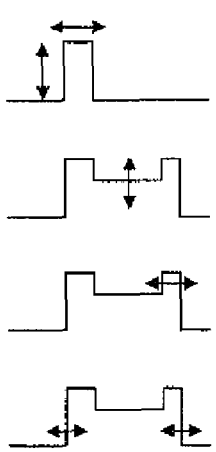
Figure 11C:
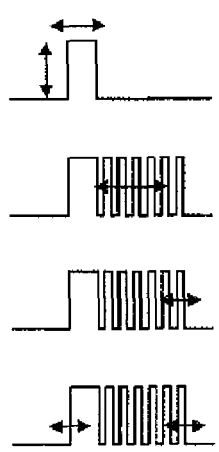
Figure 11D:
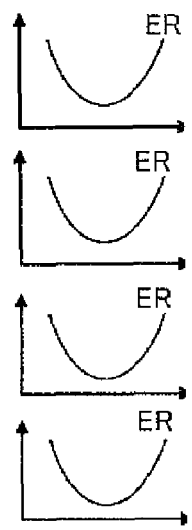

FIGS. 11A to 11D are conceptual drawings showing a second method for determining the conditions of the write pulse. FIG. 11A is a flowchart showing a determination process of the conditions of the write pulse, FIG. 11B is a drawing showing portions for adjustment in the case of the single pulse step-by-step, FIG. 11C is a drawing showing portions for adjustment in the case of the multi-pulse step-by-step, and FIG. 11D is a drawing showing parameters to be indexed in each step in FIG. 11A.

As shown in FIG. 11A, when determining the conditions of the write pulse in this method, the reference conditions of the write pulses corresponding to the respective codes are determined (Step S100). Setting of the reference conditions is achieved by obtaining conditions under which the minimum error rate is achieved by adjusting the power and the width of the top pulse as shown by the portions corresponding to Step S100 from among FIGS. 11B, 11C and 11D.

Subsequently, the recording conditions of the intermediate pulse are determined by performing the test recording using the reference conditions (Step S300). The condition setting of the intermediate pulse is achieved by adjusting the power of the intermediate pulse in the case of the single pulse, and adjusting the width of the divided pulses which constitute the intermediate pulse in the case of the multi-pulse, and obtaining the conditions under which the minimum error rate is achieved as shown by the portions corresponding to Step S300 from among FIGS. 11B, 11C and 11D.

Subsequently, the recording conditions of the last pulse are determined by performing the test recording using the reference conditions obtained in Step S100 and the intermediate pulse obtained in Step S300 (Step S200). The condition setting of the last pulse is achieved by adjusting the width of the last pulse in a state in which the conditions of the intermediate pulse are fixed to predetermined conditions and obtaining the conditions under which the minimum error rate is achieved as a consequence as shown by the portions corresponding to Step S200 from among FIGS. 11B, 11C and 11D.

Since the conditions of the write pulse are determined by performing the steps S100 to S300, the phase shift correction of the write pulse is performed by further performing the test recording using the write pulse (Step S400). The phase shift correction is performed by adjusting the start position and end position of the write pulse, and obtaining the conditions under which the minimum error rate is achieved as shown in the portions corresponding to Step S400 in FIGS. 11B, 11C and 11D.

In the example described above, an example in which the error rate is referenced as an index in every step has been described. However, each step may employ any arbitrary index such that the error rate may be referenced as an index for adjusting the reference conditions, the asymmetry may be referenced as an index for adjusting the last pulse and the intermediate pulse, and the shift amount of amplitude may be referenced as an index for correcting the phase shift. It is also possible to set the recording conditions under which the recording characteristic is most stabilized within the power margin when the error rate is referenced as an index.

Figure 12A:
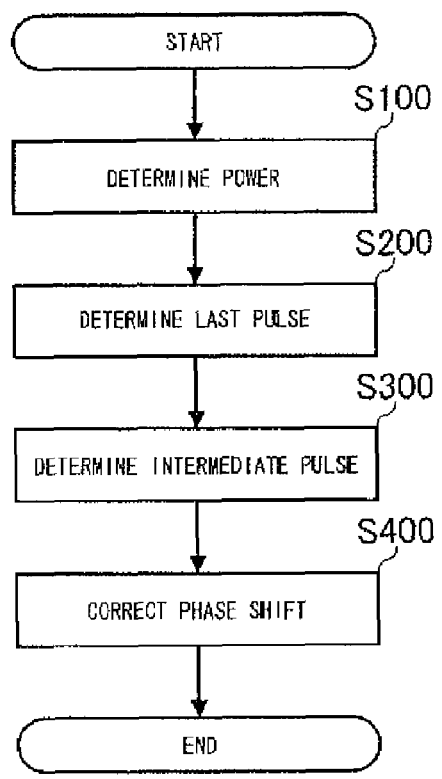
FIGS. 12A and 12B are conceptual drawings showing a third method for determining the conditions of the write pulse.
Figure 12B:
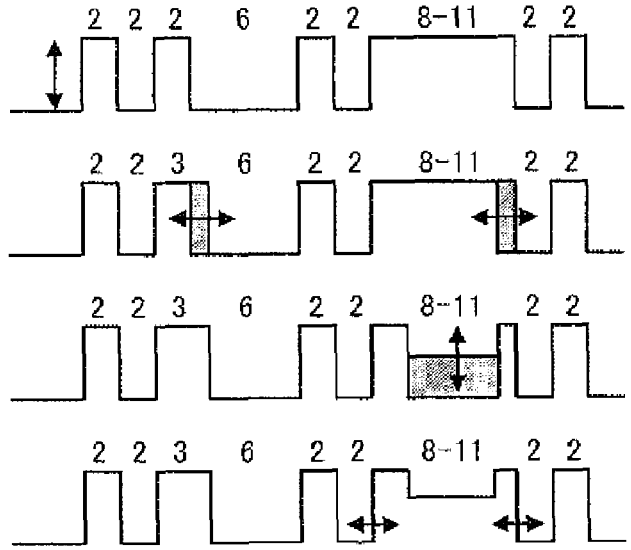

FIGS. 12A and 12B are conceptual drawings showing a third method for determining the conditions of the write pulse. The method shown in FIGS. 12A and 12B is an example of a method of performing the test recording using the write pattern including a plurality of types of codes and determining the recording condition on the basis of the result of the test recording. FIG. 12A is a flowchart showing a determination process of the conditions of the write pulse, and FIG. 12B is a drawing showing portions for adjustment of the write pattern including single pulses step-by-step in FIG. 12A. Numerals attached to FIG. 12B represent the lengths of the mark and the space which constitute the respective codes shown by the unit time length. The expression "8-11" represents an arbitrary code from 8 T to 11 T.

As shown in FIG. 12A, when determining the conditions of the write pulse with this method, the power condition of the write pattern which includes a plurality of code rows is determined first (Step S100). Setting of the power condition is achieved by adjusting the power of the entire write pattern as shown by a part corresponding to Step S100 in FIG. 22B. As an index of the power adjustment, a condition under which the shift amount of the amplitude value I2 of 2 T, which is the shortest code, becomes "0", a predetermined target value, or a value close thereto, or the minimum error rate is achieved. It is also possible to determine the power condition under which the most stable recording characteristic is achieved within the power margin when the error rate is referenced as an index.

Here, it is preferable that the above-described write pattern is prepared in the drive in advance, and the conditions of the top pulse, the intermediate pulse and the last pulse used in the write pattern may be a standard value stored in the drive or may be obtained through the test recording.

Then, the recording conditions of the last pulse are determined by performing the test recording using the power condition determined in Step S100 (Step S200). The setting of the conditions of the last pulse is performed by adjusting the width of the last pulse in a state in which the conditions of the top pulse and the intermediate pulse are fixed to predetermined conditions as shown in a portion corresponding to Step S200 in FIG. 12B.

In this example, since the code having a length of 3 T or more uses the last pulse, the ends of the pulse corresponding to 3 T mark and the pulse corresponding to 8 T to 11 T mark are adjusted in the example shown in FIG. 12B. As an index of the last pulse adjustment, the conditions under which the asymmetry 2T3T which indicates asymmetric property between the amplitude value I2 of 2 T, which is the shortest cord, and the amplitude value I3 of 3 T, which is the second shortest code, becomes "0", a predetermined target value, or a value close thereto, or the minimum error rate may be achieved.

Subsequently, the recording conditions of the intermediate pulse are determined by performing the test recording using the power conditions obtained in Step S100 and the last pulse obtained in Step S200 (Step S300). The setting of the conditions of the intermediate pulse is performed by adjusting the power of the intermediate pulse as shown by a portion corresponding to Step S300 in FIG. 12B.

In this example, since the code having a length of 4 T or larger uses the intermediate pulse, the power of the intermediate pulse corresponding to the 8 T to 11 T mark is adjusted in the example shown in FIG. 12B. As an index of adjustment of the intermediate pulse, the conditions under which asymmetry 2T11T which indicates asymmetry property between the amplitude value I2 of 2 T, which is the shortest code, and the amplitude value I11 of 11 T, which is the longest code, becomes "0", a predetermined target value, or a value close thereto, or the minimum error rate may be achieved.

Since the conditions of the respective recording pulses included in the write pattern are determined by performing Steps S100 to S300, the phase shift correction of the write pulse is performed as needed by performing further the test recording using the determined write pulse (Step S400). The phase shift correction is performed by adjusting the start position and the end position of the write pulse for correction as shown in a portion corresponding to Step S400 in FIG. 12B.

The write pulse for correction is specified by the test recording using a plurality of types of write patterns and, in the pattern shown in FIGS. 12B, 8 T to 11 T correspond to a code for correction. Either an asymmetry value or an error rate may be used as an index of the phase shift correction.

Figure 13A:
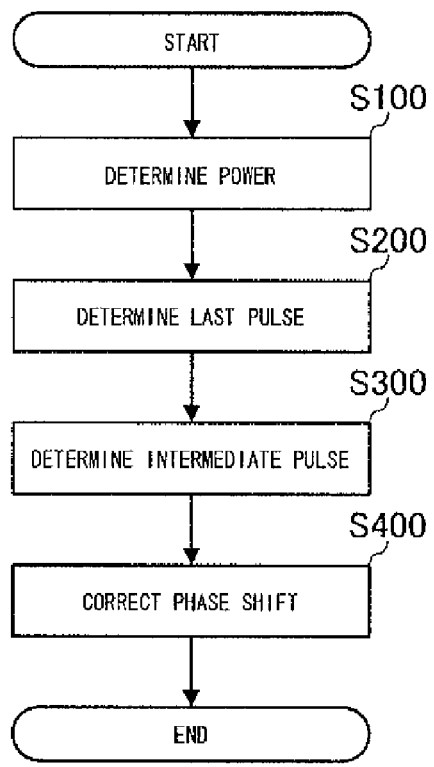
FIGS. 13A and 13B are conceptual drawings showing a forth method for determining the conditions of the write pulse.
Figure 13B:
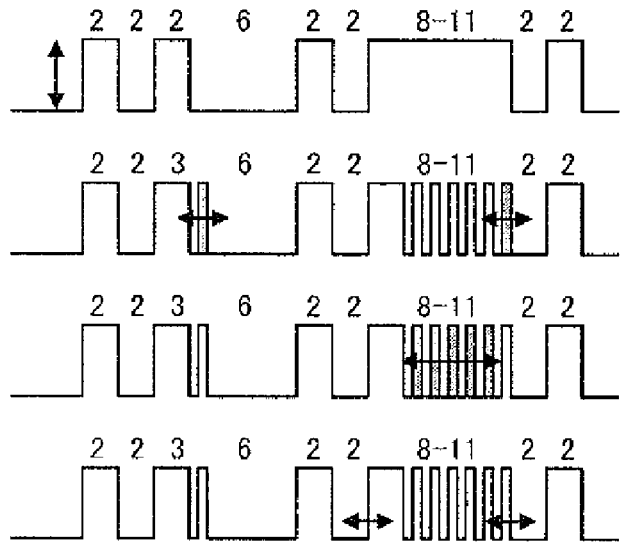

FIGS. 13A and 13B are conceptual drawings showing a fourth method for determining the conditions of the write pulse. In the same manner as FIGS. 12A and 12B, the method shown in FIGS. 13A and 13B is an example of a method of performing the test recording using the write pattern including a plurality of types of codes and determining the recording condition on the basis of the result of the test recording. FIG. 13A is a flowchart showing a determination process of the conditions of the write pulse, and FIG. 13B is a drawing showing portions for adjustment of the write pattern including multi-pulses step-by-step in FIG. 13A. Numerals attached to FIG. 13B represent the lengths of the mark and the space which constitute the respective codes shown by the unit time length. The expression "8-11" represents an arbitrary code from 8 T to 11 T.

As shown in FIG. 13A, when determining the conditions of the write pulse with this method, the power condition of the write pattern which includes a plurality of types of code rows is determined first (Step S100). Setting of the power condition is achieved by adjusting the power of the entire write pattern as shown by a part corresponding to Step S100 in FIG. 13B. As an index of the power adjustment, a condition under which the shift amount of the amplitude value I2 of 2 T, which is the shortest code, becomes "0", a predetermined target value, or a value close thereto, or the minimum error rate is achieved. It is also possible to determine the power condition under which the most stable recording characteristic is achieved within the power margin when the error rate is referenced as an index.

Here, it is preferable that the above-described write pattern is prepared in the drive in advance, and the conditions of the top pulse, the intermediate pulse and the last pulse used in the write pattern may be a standard value stored in the drive or may be obtained through the test recording.

Then, the recording conditions of the last pulse are determined by performing the test recording using the power condition determined in Step S100 (Step S200). The setting of the conditions of the last pulse is performed by adjusting the width of the last pulse in a state in which the conditions of the top pulse and the intermediate pulse are fixed to predetermined conditions as shown in a portion corresponding to Step S200 in FIG. 13B.

In this example, since the code having a length of 3 T or more uses the last pulse, the ends of the pulse corresponding to 3 T mark and the pulse corresponding to 8 T to 11 T mark are adjusted in the example shown in FIG. 13B. As an index of the last pulse adjustment, the conditions under which the asymmetry 2T3T which indicates asymmetric property between the amplitude value I2 of 2 T, which is the shortest cord, and the amplitude value I3 of 3 T, which is the second shortest code, becomes "0", a predetermined target value, or a value close thereto, or the minimum error rate may be achieved.

Subsequently, the recording conditions of the intermediate pulse are determined by performing the test recording using the power conditions obtained in Step S100 and the last pulse obtained in Step S200 (Step S300). The setting of the conditions of the intermediate pulse is performed by adjusting the widths of the divided pulses which constitute the intermediate pulse as shown by a portion corresponding to Step S300 in FIG. 13B.

In this example, since the code having a length of 4 T or more uses the intermediate pulse, the widths of the divided pulses corresponding to the 8 T to 11 T mark are adjusted in the example shown in FIG. 13B. As an index of adjustment of the intermediate pulse, the conditions under which asymmetry 2T11T which indicates asymmetry property between the amplitude value I2 of 2 T, which is the shortest code, and the amplitude value I11 of 11 T, which is the longest code, becomes "0", a predetermined target value, or a value close thereto, or the minimum error rate may be achieved.

Since the conditions of the respective recording pulses included in the write pattern are determined by performing Steps S100 to S300, the phase shift correction of the write pulse is performed as needed by performing further the test recording using the determined write pulse (Step S400). The phase shift correction is performed by adjusting the start position and the end position of the recording pulse for correction as shown in a portion corresponding to Step S400 in FIG. 13B.

The write pulse for correction is specified by the test recording using a plurality of types of write patterns and, in the pattern shown in FIG. 12B, 8 T to 11 T correspond to a code for correction. Either an asymmetry value or an error rate may be used as an index of the phase shift correction.

Figure 14A:
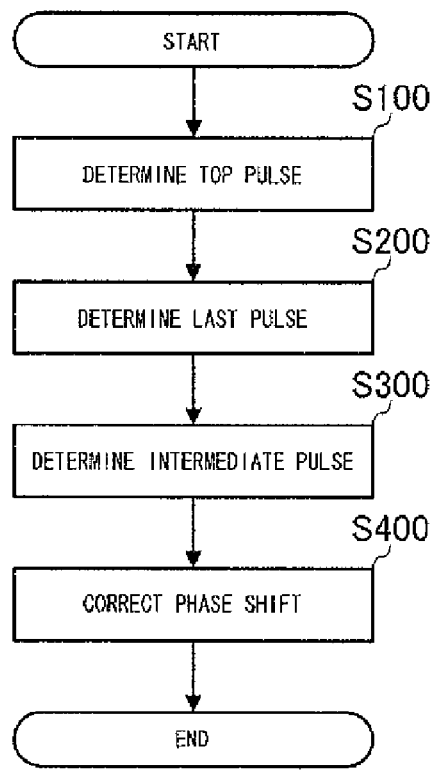
FIGS. 14A and 14B are conceptual drawings showing a fifth method for determining the conditions of the write pulse.
Figure 14B:
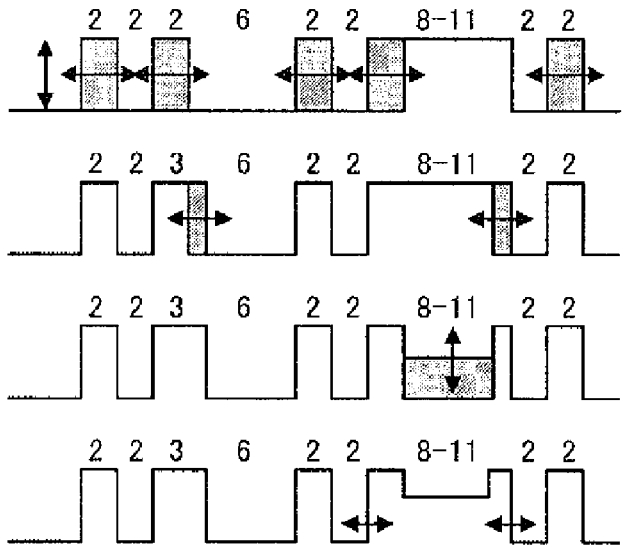

FIGS. 14A and 14B are conceptual drawings showing a fifth method for determining the conditions of the write pulse. As shown in FIGS. 12A and 12B, the method shown in FIGS. 14A and 14B is an example of a method of performing the test recording using the write pattern including a plurality of types of codes and determining the recording condition on the basis of the result of the test recording. FIG. 14A is a flowchart showing a determination process of the conditions of the write pulse, and FIG. 14B is a drawing showing portions for adjustment of the write pattern including single pulses step-by-step in FIG. 14A. Numerals attached to FIG. 14B represent the lengths of the mark and the space which constitute the respective codes shown by the unit time length. The expression "8-11" represents an arbitrary code from 8 T to 11 T.

As shown in FIG. 14A, when determining the conditions of the write pulse with this method, the top pulse condition of the write pattern which includes a plurality of types of code rows is determined first (Step S100). Setting of the top pulse condition is achieved by adjusting the powers and the widths of the top pulses of the respective codes which constitutes the recording pattern as shown by a portion corresponding to Step S100 in FIG. 14B. As an index of the top pulse adjustment, a condition under which the shift amount of the amplitude value I2 of 2 T, which is the shortest code, becomes "0", a predetermined target value, or a value close thereto, or the minimum error rate is achieved. Other features are the same as the examples shown in FIGS. 12A and 12B.

The result of verification of the effects of the respective methods described thus far with HD-DVD record system will be described. Firstly, it was confirmed that the asymmetry 2T3T value obtained when only the last pulse is changed step-by-step changed substantially linearly with respect to the width of the last pulse. When PRSNR value and SbER value indicating the recording characteristic at this time were measured, it was confirmed that both of these values have preferable recording margins for the asymmetry 2T3T value.

Subsequently, the change of the asymmetry 2T11T when only the intermediate pulse is changed step-by-step was confirmed, and it was confirmed that it changed subsequently linearly with respect to the width of the intermediate pulse. When the PRSNR value and SbER value which indicate the recording characteristics at this time were measured, it was confirmed that both of these values have preferable recording margins for the asymmetry 2T3T value.

Furthermore, when an intermediate pulse with which the asymmetry 2T11T value becomes "0", the predetermined target value, or the value close thereto was determined after having determined the last pulse with which the asymmetry 2T3T value becomes "0", the predetermined target value or the value close thereto, it was confirmed that the asymmetry 2T3T value obtained by adjusting the last pulse is maintained, and the asymmetry 3T11T value also becomes "0", the predetermined target value, or the value close thereto.

Figure 15:
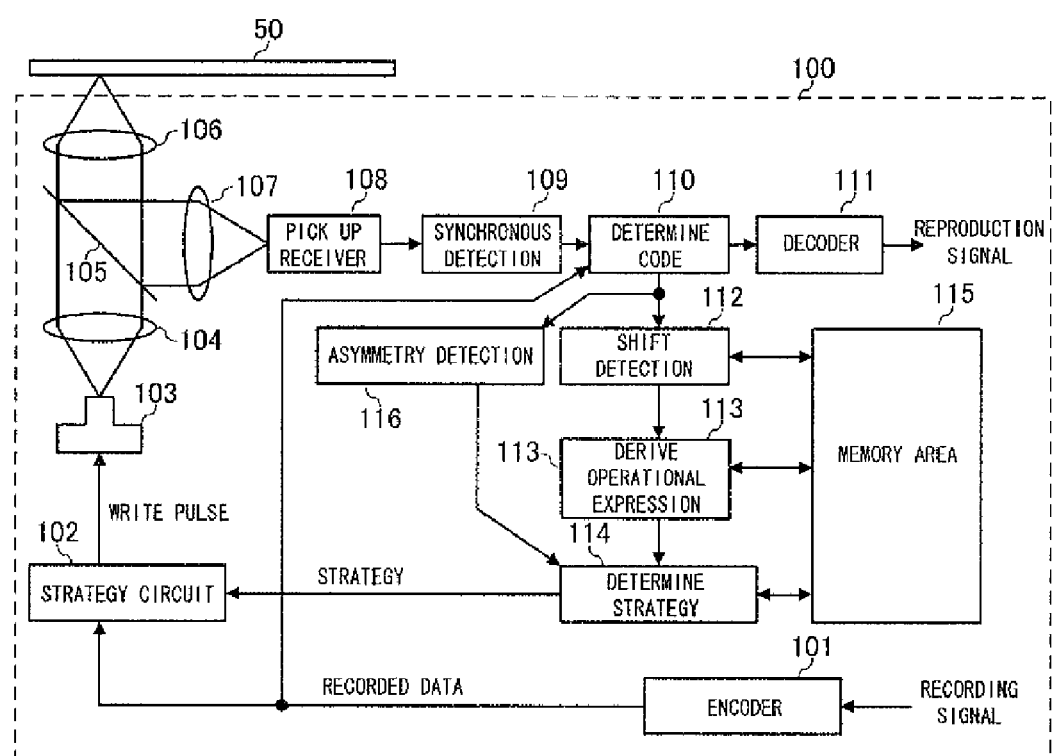
FIG. 15 is a block diagram showing an internal configuration of a drive according to the first embodiment.

FIG. 15 is a block diagram showing an internal configuration of the drive according to the first embodiment. As shown in FIG. 15, a drive 100 records and reproduces information with respect to a media 50 using laser light outputted from a laser oscillator 103.

When performing recording of the information with respect to the media 50, a recording signal corresponding to desired recording information is coded by an encoder 101 through EFM method, and the coded recorded data is applied to a strategy circuit 102.

Here, various setting parameters are set for a predetermined strategy in the strategy circuit 102, and the strategy circuit 102 controls the intensity and the pulse width of the laser light outputted from the laser oscillator 103 by correcting the various setting parameters of the strategy and generates the write pulse which might achieve a desired recording state.

The write pulse generated in the strategy circuit 102 is applied to the laser oscillator 103, and the laser oscillator 103 controls the outputted laser light corresponding to the write pulse and radiates the controlled laser light onto the media 50, which is rotated constantly in linear speed or constantly in rotational speed, via a lens 104, a half mirror 105 and a lens 106 from the laser oscillator 103, whereby the write pattern including a mark and space rows corresponding to the desired recorded data is recorded on a recording layer of the media 50.

On the other hand, when reproducing the information recorded on the media 50, a uniform reproduction laser light is radiated on the media 50, which is rotated constantly in linear speed or constantly in rotational speed, via the lens 104, the half mirror 105 and the lens 106 from the laser oscillator 103.

At this time, the reproduction laser light used here is a reproduction laser light which is lower in intensity than the laser light outputted from the laser oscillator 103 at the time of recording, and reflective light of the reproduction laser light from the media 50 is received by the pick up receiver 108 via the lens 106, the half mirror 105 and a lens 107 from the laser oscillator 103 and is converted into an electric signal.

The electric signal outputted from the pick up receiver 108 corresponds to the write pattern including the mark and space recorded in the media 50. As regards the electric signal outputted from the pick up receiver 108, a clock signal of a predetermined cycle is generated from an wobble signal included in the electric signal in a synchronous signal detection circuit 109, then is coded by a code determination circuit 110 including the circuit block shown in FIG. 1, and then is decoded by a decoder 111 and outputted as a reproduction signal. In the code determination circuit 110, as described in conjunction with FIG. 1, the amplitude level is detected and the detected amplitude level is outputted to a record shift detector 112 and an asymmetry detection circuit 116. Other configurations relating the determination of the recording conditions will be described later.

In this manner, the record characteristics of the record system including the drive and the media depend on variations in characteristic of the drive and the variations in characteristic of the media, and hence the improvement of the record characteristics is achieved by absorbing the effect by the aforementioned strategy. The applicable media includes various optical information recording medium such as dye material type media represented by CD-R or DVD-R or phase transition type media represented by CD-RW or DVD-RW.

Detailed description of a flow of determination of the write pulse conditions shown in FIG. 10A performed by the aforementioned drive will be described.

Determination of Reference Conditions

Figure 16:
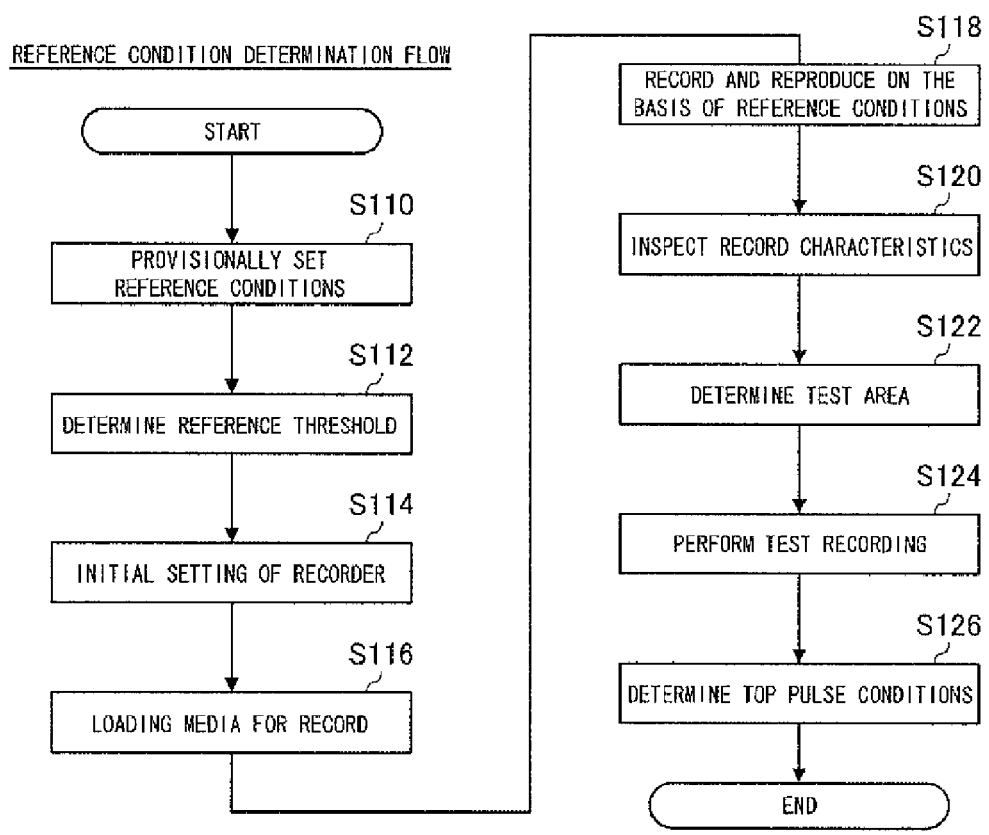
FIG. 16 is a flowchart showing a detailed procedure of a reference condition determination step shown in FIG. 10A.

FIG. 16 is a flowchart showing a detailed procedure of a reference condition determination step shown in FIG. 10A. As shown in FIG. 10A, the drive 100 performs Steps S110 to S114 for performing initial setting of the drive, performs Steps S116 to S122 for performing determination of the conditions of the test recording, then performs Step S124 for performing the test recording under the determined conditions and, on the basis of the result, and performs Step S126 for determining the conditions of the top pulse. These steps will be described in detail below.

Provisional Determination of Reference Conditions

In Step S110 shown in FIG. 16, the test recording is performed while changing the recording velocity using a given standard media to obtain one pulse width and three power values as reference conditions. The three power values are preferably a value at which the error rate of the pattern including 2 T becomes a minimum value as a result of the above-described test recording, and two power values positioned before and after. The two power values before and after are preferable values close to the threshold which serves as a reference to determine whether the error rate is acceptable or not. The reference conditions obtained here are used at the time of record characteristic inspection.

Determination of Standard Threshold

As described later, in order to set the area which satisfies a predetermined recording margin as a range of the conditions of the test recording (hereinafter referred to as "test area"), it is necessary to determine a threshold which serves as a criteria. Standard values may be prepared according to the type of the drives or the media as the value of the threshold. However, the threshold which indicates a minimum line of an error rate allowance region depends on the optical system components shown in FIG. 16 or other components which constitute the pickup, and also depends on the velocity of recording with respect to the media.

Therefore, it is recommended to perform more adequate setting of the test area by obtaining the thresholds for the respective combinations of the drive and the media to provide more adequate criteria.

Of course, setting of the thresholds for the respective combinations of the drive and the media may cause increase in number of recording steps, and hence it is also possible to assume that the piece-to-piece variations of the drives are main cause of fluctuations in threshold and store the thresholds suitable for each piece of drive in a memory area 115 at the time of manufacture of the drive.

Figure 17:
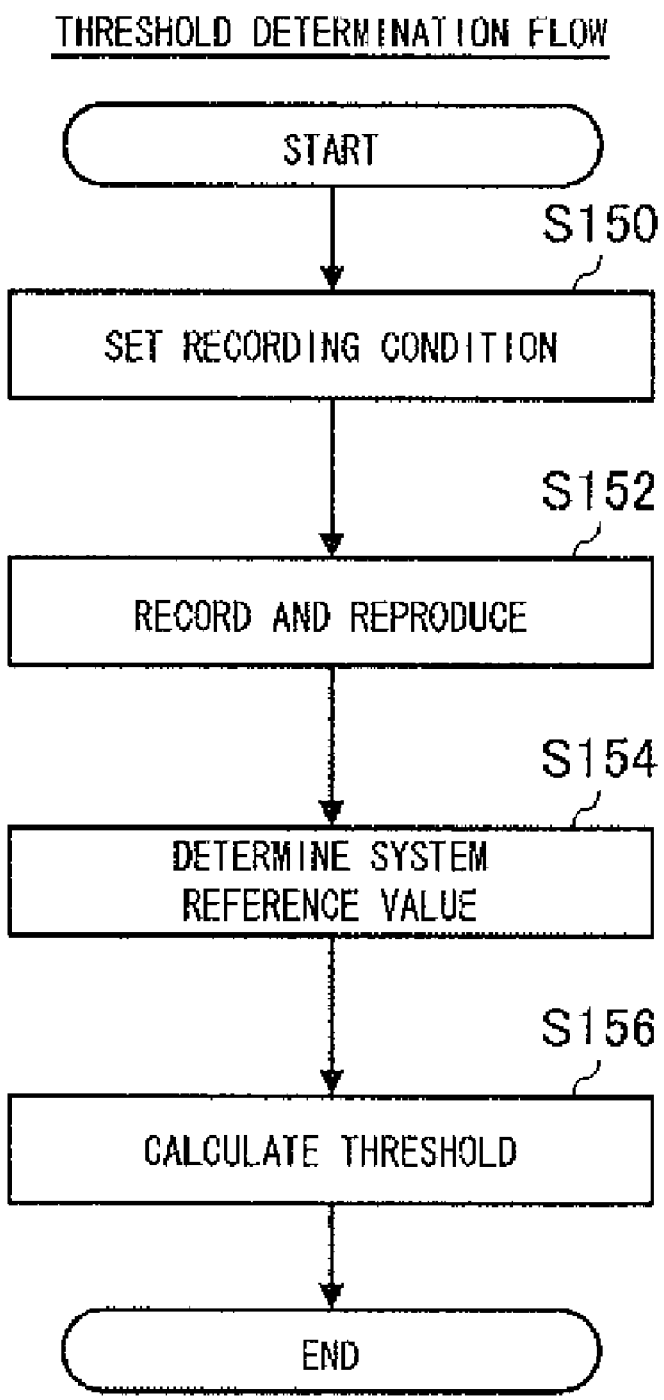
FIG. 17 is a flowchart showing a step of determining a standard threshold shown in FIG. 16 in detail.

FIG. 17 is a flowchart showing a step of determining a standard threshold shown in FIG. 16 in detail. As shown in FIG. 17, the determination of the standard threshold is achieved by performing recording reproduction under the predetermined recording conditions, determining the reference value as the system on the basis of the result of the recording reproduction, and employing a value in which a predetermined margin is secured from the reference value as a threshold to be used for determining the test area. The respective steps will be described below.

Firstly, Step S150 for setting the recording conditions is performed. In this step, conditions required for the recording reproduction such as the pulse width, the power, the recording reproduction speed, and the record address are prepared by a predetermined patterns, the recording conditions are set to the drive, and the reference media is loaded in the drive. Preferably, a media having standard characteristic is selected as the reference media from various media.

Subsequently, Step S152 for performing the recording and reproducing with respect to the reference media loaded under the recording conditions set in Step S150 is performed to obtain the recording reproduction characteristic values of each recording condition, for example, the error rate, jitter, amplitude, and C/N value. Values which indicate the recording characteristics are selected as the characteristic values to be obtained here. An example in which the jitter is used as an index of the record characteristics will be described.

Then, Step S154 for obtaining a most preferable value, that is, a minimum jitter value from the recording reproduction characteristic values obtained in Step S152, and employing the obtained value as a system reference value will be performed. Accordingly, the jitter value which seems to be closest to the optimum value in the corresponding drive is set as the reference value. The reference value may be an intermediate value between two points which intersect with a predetermined threshold, that is, an intermediate value of the power margins instead of the optimum point of the jitter.

Finally, Step S156 for calculating the value obtained by multiplying the system reference value determined in Step S154 by a predetermined coefficient $\alpha$ (preferably, $\alpha > 1$) as a threshold is performed. Accordingly, the determination is performed with a predetermined margin secured for the system reference value. In other words, calculation of the threshold using the system reference value is executed by the expression; threshold=system reference value×$\alpha$, and the coefficient $\alpha$ is preferably a value on the order of 1.5. As the coefficient $\alpha$, a suitable value according to the type of the drive or the media may be set, and a value close to the system reference value such as $\alpha$=0.8 to 1.2 or relatively large value such as $\alpha$=2.0 to 3.0 may be set.

FIG. 18 is a conceptual drawing showing an example of the flow shown in FIG. 17. The example shown in FIG. 18 is an example in which a jitter value is used as a characteristic value which indicates the record characteristics and the power is changed from P1 to P6 for the respective pulse widths from W1 to W4 so that reproduction characteristics 202-1 to 202-4 are obtained. In the example shown in FIG. 18, the pulse widths W1 to W4 and the powers P1 to P6 are recording conditions and the extreme value of the reproduction characteristic 202-3 from which the lowest jitter value is obtained is considered to be the system reference value, and the threshold is obtained by multiplying the system reference value by, for example, 1.5. Arrows indicated in the matrix in FIG. 18 indicate directions that the test conditions are to be changed, and these arrows are used in the same signification in the description shown below.

Figure 19:
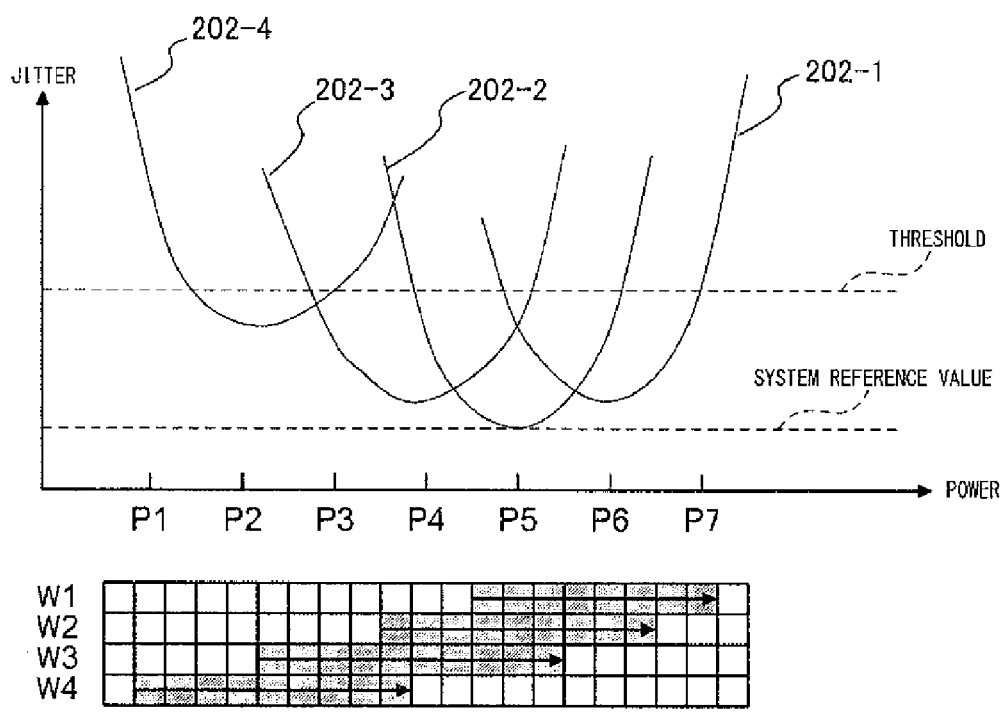
FIG. 19 is a conceptual drawing showing an example of the flow shown in FIG. 17.

FIG. 19 is a conceptual drawing showing an example of the flow shown in FIG. 17. The example shown in FIG. 19 is an example in which a jitter value is used as a characteristic value which indicates the record characteristics and the variable range of the power is changed for the respective pulse widths from W1 to W4 so that the reproduction characteristics 202-1 to 202-4 are obtained. In the example shown in FIG. 19, the extreme value of the reproduction characteristic 202-2 from which the lowest jitter value is obtained is considered to be the system reference value, and the threshold is obtained by multiplying the system reference value by, for example, 1.5. In this manner, the threshold may be determined by changing the power conditions for each pulse width.

Figure 20:
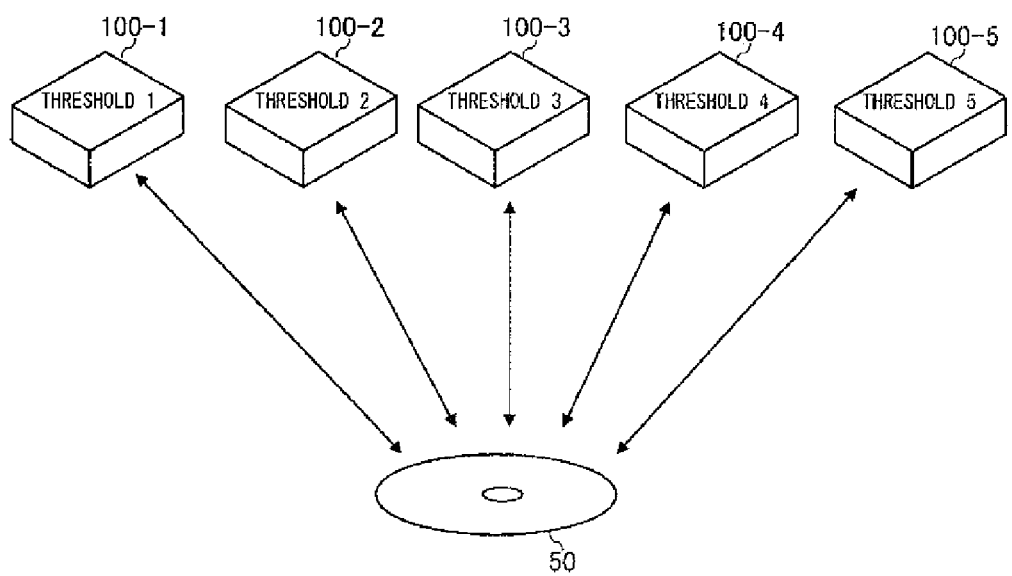
FIG. 20 is a conceptual drawing showing an example in which the threshold is obtained for each drive.

FIG. 20 is a conceptual drawing showing an example in which the threshold is obtained for each drive. When setting of the threshold according to the piece-to-piece variations of the drives is desired, the recording reproduction is performed with respect to the reference media 50 common for the respective drives 100-1 to 100-5 as shown in FIG. 20, and thresholds 1 to 5 specific for the respective drives are stored.

When simplification of the threshold setting procedure is desired, an average of the thresholds 1 to 5 obtained through recording reproduction of the reference media common for some standard drives is calculated, and the average threshold may be used as a threshold for other drives.

At this time, the drives used for obtaining the average threshold may be of the same design, or may be of similar designs instead of the completely same design. It is also possible to use the average threshold as the threshold for these drives. The average threshold once obtained may be used for multipurpose as the threshold for the drives of the same design or similar designs. A plurality of drives having variations may be prepared intentionally to obtain an average value from these drives.

Initial Setting of Recorder

Step S114 for storing the reference conditions and the reference threshold obtained in Step S110 and Step S112 in FIG. 16 in the record region 115 in the drive 100 will be performed. This process is preferably performed at the time of manufacture of the drive 100.

Loading of Media for Record

Subsequently, Step S116 for loading the media 50 for recording information in the drive 100 after having finished the initial setting in Step S114 is performed.

Recording Reproduction Under Reference Conditions

Subsequently, Step S118 for recording in the media 50 loaded in Step S116 using the conditions set in Step S114 is performed. More specifically, the recording reproduction is performed three times using one pulse width and three power values defined as the reference conditions to obtain jitter values at three points. When plotting the three jitter values with respect to the power axis, a tendency of the recording characteristics according to the combination of the drive 100 and the media 50 will be clearly understood.

Inspection of Record Characteristic

Figure 21A:
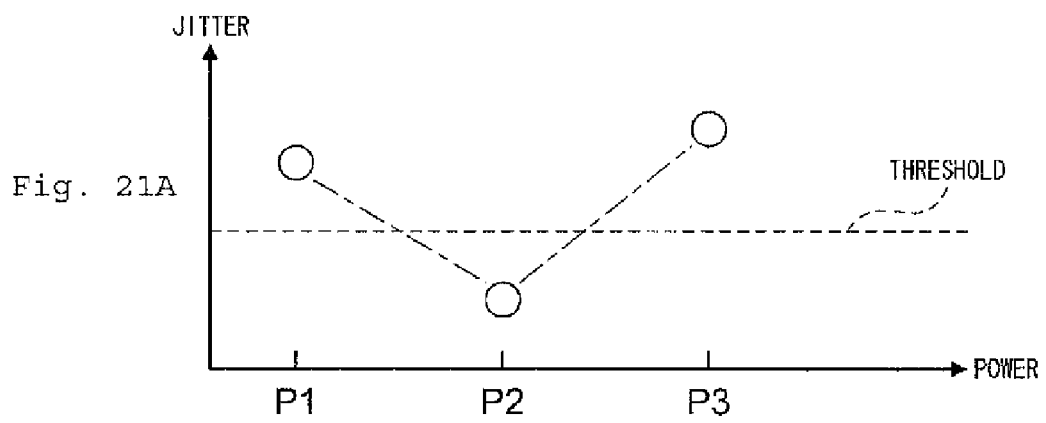
FIGS. 21A and 21B are concept drawings showing examples in which a valley type pattern is obtained as a result of the record characteristic inspection performed in Step S120 in FIG. 16.
Figure 21B:
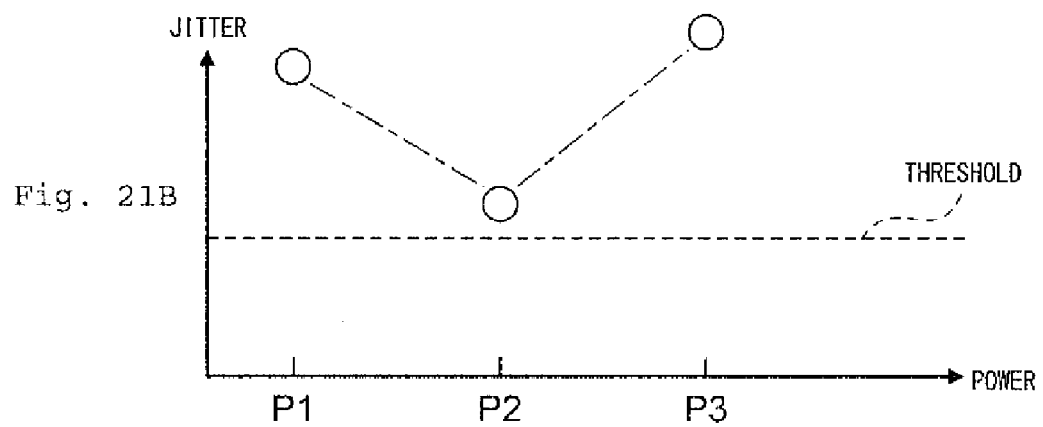

FIGS. 21A and 21B are concept drawings showing examples in which a valley type pattern is obtained as a result of the record characteristic inspection performed in Step S120 in FIG. 16. As shown in FIGS. 21A and 21B, the record characteristic inspection is performed using the jitter value and the threshold for the respective reference conditions obtained in the steps described thus far. The examples shown in FIGS. 21A and 21B are examples when the powers P1, P2 and P3 are used as the reference conditions, and virtual lines formed by connected the jitter values obtained by the respective power values assumes a valley type pattern. When such valley type pattern is obtained, it means that the reference media used in Step S110 and the media for record loaded in Step S116 have the same sensitivity, and have similar recording characteristics.

FIG. 21A shows an example in which the minimum value of the valley type pattern is smaller than the threshold, FIG. 21B shows an example in which the minimum value of the valley type pattern is larger than the threshold. In either pattern, the reference media and the media for record seem to have the same sensitivity. In this manner, when the reference media and the media for record have the same sensitivity, the conditions used in the test recording are set in a plane area of power×pulse width including the reference conditions at the center, as described later.

FIG. 21A and FIG. 21B are different in the amount of difference between the reproduction value and the reproduction reference value obtained respectively at recording points P1, P2 and P3, that is, in the example shown in FIGS. 21A and 21B, different in the amount of difference between the jitter value and the jitter threshold, so that the obtained reproduction value in FIG. 21A is closer to the reproduction reference value.

Therefore, since the optimum conditions seems to be found more easily in the case of FIG. 21A than FIG. 21B, it is also applicable that the number of times of the test is reduced in the case in which the recording characteristic in FIG. 21A is obtained in comparison with the case in which the recording characteristic in FIG. 21B is obtained, so that the more suitable solution is found with smaller number of times of the test.

In other words, when the amount of difference between the reproduction value and the reproduction reference value is small, the optimum condition is close to the aforementioned reference condition, while when the amount of difference between the reproduction value and the reproduction reference value is large, the optimum condition is father from the aforementioned reference condition. Therefore, the small number of times of the test is desired, the number of times of the test is preferably changed according to the amount of difference between the reproduction value and the reproduction reference value.

Figure 22A:
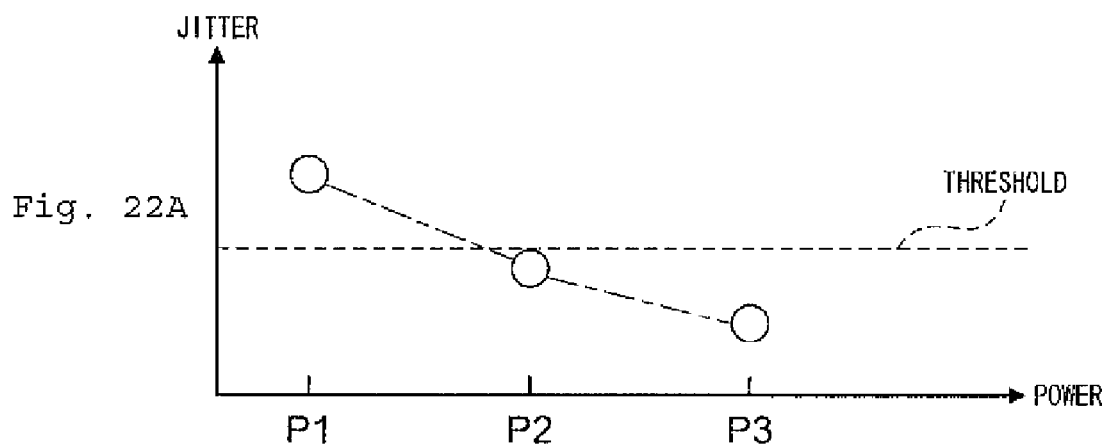
FIGS. 22A and 22B are conceptual drawings showing an example in which a rightwardly decreasing pattern is obtained as a result of the record characteristic inspection performed in Step S120 in FIG. 16.
Figure 22B:
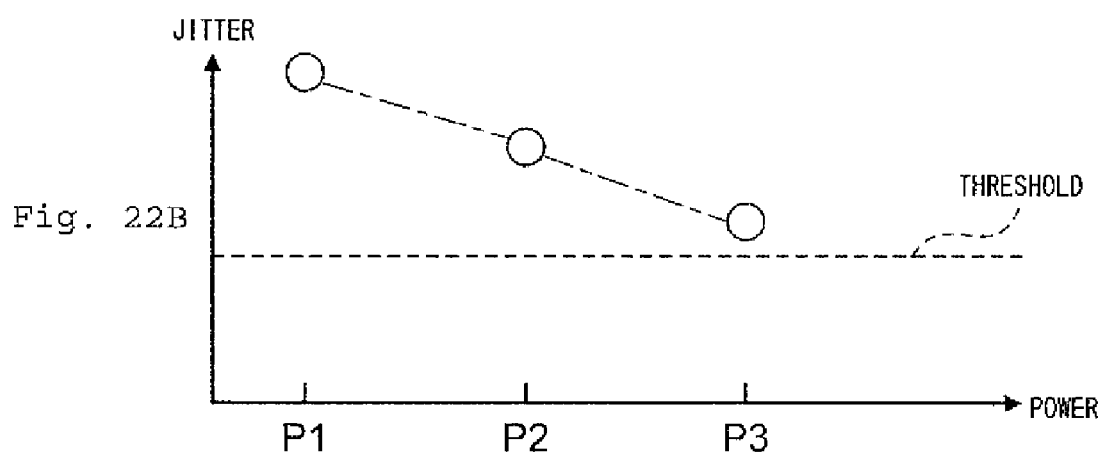

FIGS. 22A and 22B are conceptual drawings showing an example in which a rightwardly decreasing pattern is obtained as result of the record characteristic inspection performed in Step S120 in FIG. 16. In examples shown in FIGS. 22A and 22B, the rightwardly decreasing patterns in which the jitter values decrease with increase in powers from P1, P2 to P3 are obtained. When such rightwardly decreasing pattern is obtained, it means that the media for record is lower in sensitivity than the reference media.

FIG. 22A is an example in which the minimum value of the rightwardly decreasing pattern reaches a value smaller than the threshold, while FIG. 22B is an example in which the minimum value of the rightwardly decreasing pattern reaches a value larger than the threshold. In either patterns, it seems that the media for record is lower in sensitivity than the reference media. When the media for record is lower in sensitivity in this manner, the test recording is performed by shifting the test area defined by a plane area of power×pulse width including the reference conditions at the center toward the high power and wide pulse width side as described later.

When the rightwardly decreasing pattern is obtained as shown in FIGS. 22A and 22B, it seems that the minimum value of the jitter exists on the higher power side, and hence the recording characteristic may be confirmed again after having recorded again by a higher power than P3. In this case, the number of times of recording increments by one, the accuracy of the record characteristic inspection may be improved. When this pattern is obtained as well, the number of times of the test may be changed according to the amount of difference between the reproduction value and the reproduction reference value as in the case where the aforementioned valley type pattern is obtained.

When the rightwardly decreasing pattern is obtained as shown in FIGS. 22A and 22b, it seems that the optimum solution is farther from the reference conditions than the valley type pattern in FIGS. 21A and 21B. Therefore, it is desirable to increase the number of times of the test to a number larger than that in the case of the valley type pattern.

Figure 23A:
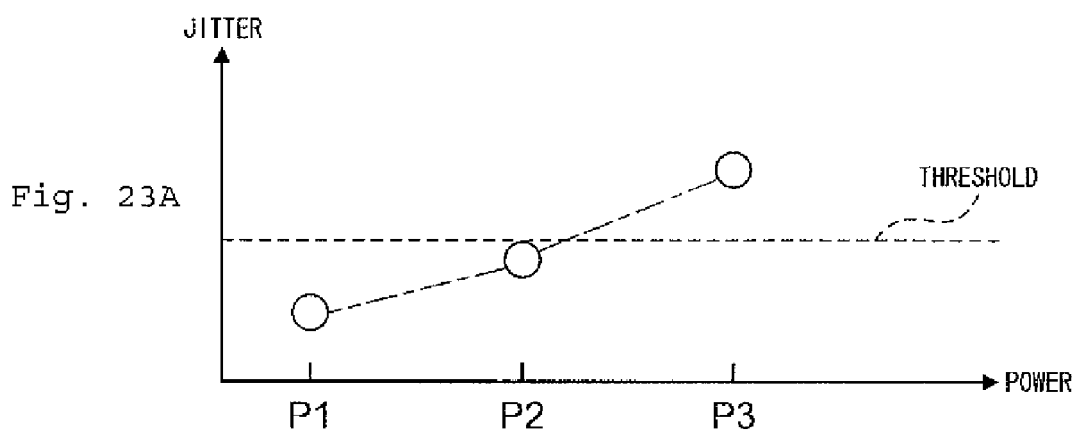
FIGS. 23A and 23B are conceptual drawings showing an example in which a rightwardly increasing pattern is obtained as the result of the record characteristic inspection performed in Step S120 in FIG. 16.
Figure 23B:
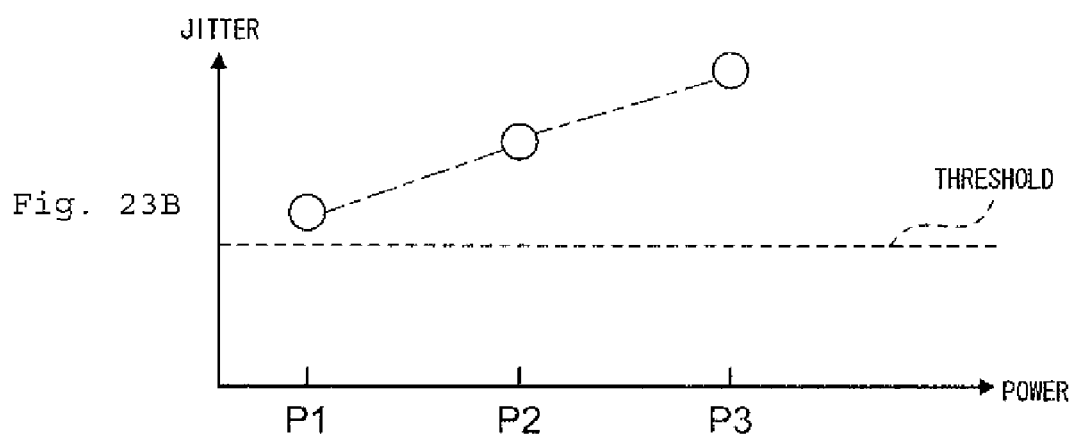

FIGS. 23A and 23B are conceptual drawings showing an example in which the rightwardly increasing pattern is obtained as a result of the record characteristic inspection performed in Step S120 in FIG. 16. In examples shown in FIGS. 23A and 23B, the rightwardly increasing patterns in which the jitter values increase with increase in powers from P1, P2 to P3 are obtained. When such rightwardly increasing pattern is obtained, it means that the media for record is higher in sensitivity than the reference media.

FIG. 23A is an example in which the minimum value of the rightwardly increasing pattern reaches a value smaller than the threshold, while FIG. 23B is an example in which the minimum value of the rightwardly increasing pattern reaches a value larger than the threshold. In either pattern, it seems that the media for record is higher in sensitivity than the reference media. When the media for record is higher in sensitivity in this manner, the test recording is performed by shifting the test area defined by a plane area of power×pulse width including the reference conditions at the center toward the low power and narrow pulse width side as described later.

When the rightwardly increasing pattern is obtained as shown in FIGS. 22A and 22B, it seems that the minimum value of the jitter exists on the lower power side, and hence the recording characteristic may be confirmed again after having recorded again by a lower power than P1. In this case, the number of times of recording increments by one, the accuracy of the record characteristic inspection may be improved. When this pattern is obtained as well, the number of times of the test may be changed according to the amount of difference between the reproduction value and the reproduction reference value as in the case where the aforementioned valley type pattern is obtained.

When the rightwardly increasing pattern is obtained as shown in FIGS. 23A and 23b, it seems that the optimum solution is farther from the reference conditions than the valley type pattern in FIGS. 21A and 21B. Therefore, it is desirable to increase the number of times of the test to a number larger than that in the case of the valley type pattern.

Determination of Test Area

Figure 24:
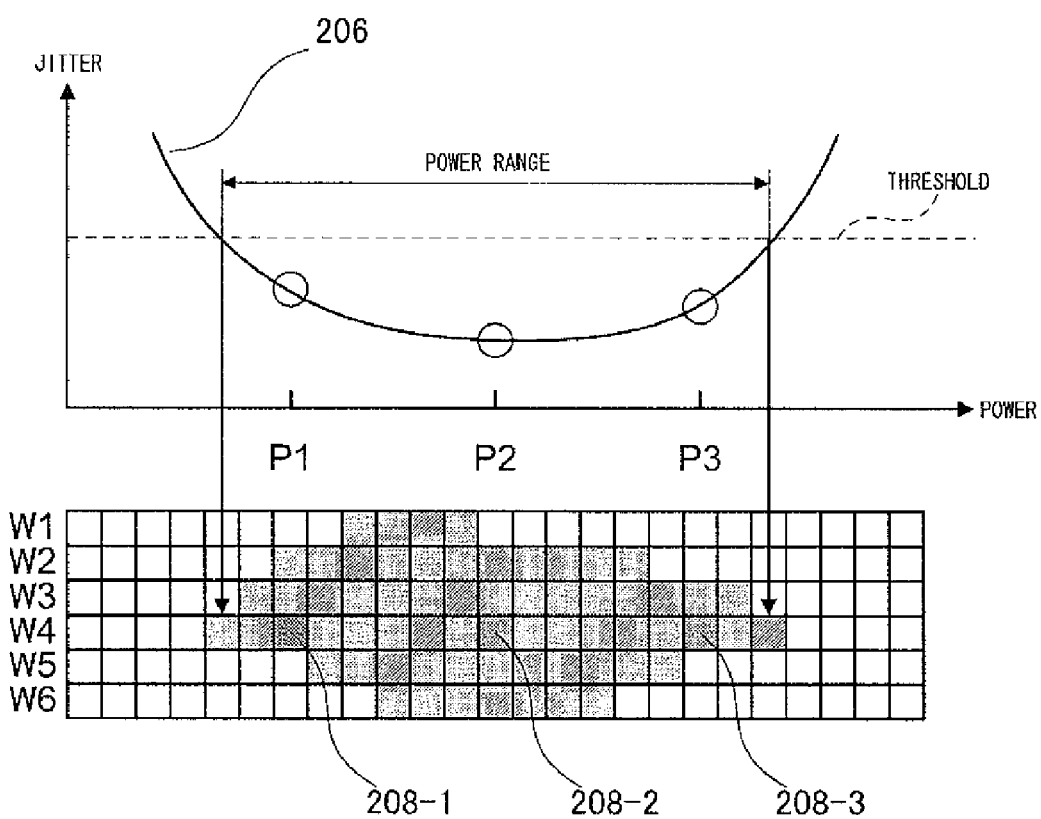
FIG. 24 is a conceptual drawing showing an example of determination of a test area performed in Step S122 in the case in which the valley type pattern is obtained in Step S120 in FIG. 16.

FIG. 24 is a conceptual drawing showing an example of determination of the test area performed in Step S122 in the case in which the valley type pattern is obtained in Step S120 in FIG. 16. When the valley type pattern is obtained as shown in FIG. 24, the crossing points between an approximation curve 206 drawn by the jitter values obtained respectively at P1, P2 and P3 and the threshold are determined to be change areas of the power used in the test recording, and this change areas correspond to a power range. In one embodiment, the range of the power used actually in the test recording is defined as a "power range", and the range of power in which the jitter assumes a value lower than the threshold is defined as a "power margin".

Since the approximation curve 206 varies with the pulse width, when the pulse width used in the reference conditions is assumed to be W4, recording is performed at the powers P1, P2 and P3 for the respective pulse widths W1 to W6 with the pulse width W4 at the center, and the crossing points between the approximation curve 206 obtained consequently thereby and the threshold are confirmed. Accordingly, as shown in a matrix image in FIG. 24, power ranges assuming a value lower than the threshold at each pulse width are obtained, and the hatched areas in FIG. 24 correspond to the test area. When the three power conditions P1, P2 and P3 and the pulse width W4 are shown in the image in the matrix, they correspond to 208-1, 208-2, 208-3 and the determined test area is set as the plane area of power×pulse width including the reference conditions at the center.

In this manner, by obtaining the power range per pulse width, the areas under the threshold may be intensively tested, more adequate conditions may be found with smaller number of times of the test.

The number of times of the test may be reduced by setting the step of the power change to a larger value when the power margin is wide, and setting the step of the power change to a small value when the power margin is narrow. For example, the following configuration is also possible. When a margin of 10 mW is resulted, it is assumed that the optimum value may be obtained even with a rough test, and hence the test is performed five times in a step of 2 mW, while when a margin of 1 mW is resulted, it is determined that further precise test is required, and hence the test may be performed ten times in a step of 0.1 mW.

Figure 25:
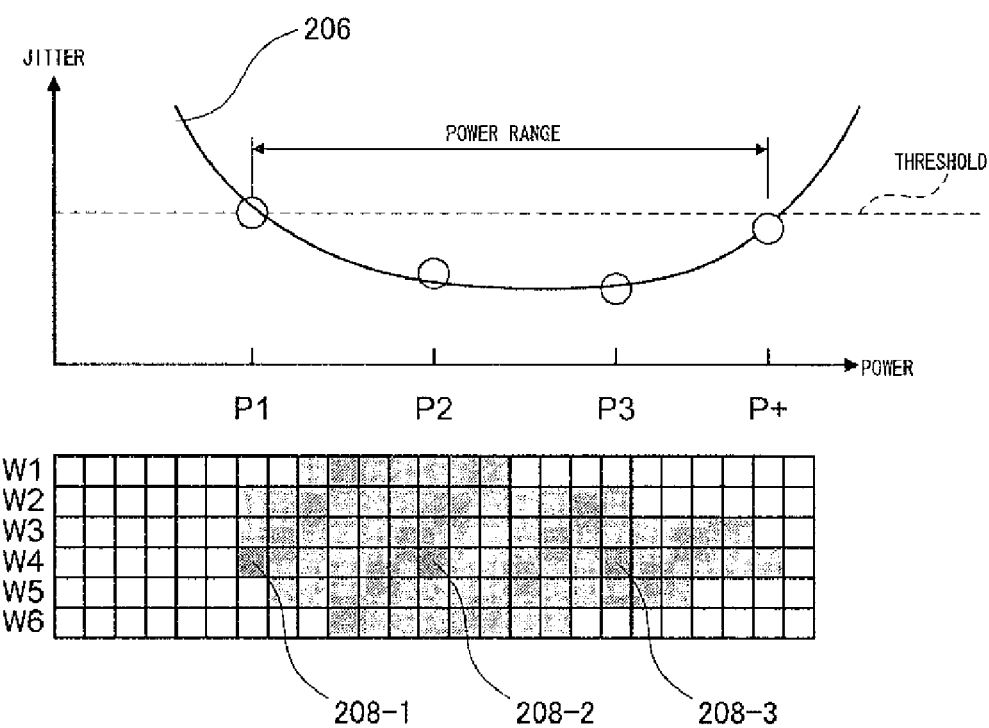
FIG. 25 is a conceptual drawing showing an example of determination of the test area performed in Step S122 when the rightwardly decreasing pattern is obtained in Step S120 in FIG. 16.

FIG. 25 is a conceptual drawing showing an example of determination of the test area performed in Step S122 when the rightwardly decreasing pattern is obtained in Step S120 in FIG. 16. As shown in FIG. 25, when the rightward decreasing pattern is obtained, it seems that the optimum condition is on the higher power side, the additional recording is performed at a power value P+ which is higher than P3 and crossing points between the approximation curve 206 drawn by the jitter values obtained at P1, P2, P3, P+, respectively, and the threshold are determined as a power range. This process is performed for the respective pulse widths W1 to W6, and the test area as shown in the matrix image shown in FIG. 25 is obtained.

Here, the test area determined by the procedure described above is such that the plane area of power×pulse width with the reference conditions 208-1, 208-2 and 208-3 at the center is shifted toward the higher power side. In this example, W1 to W6 used in the valley type pattern are used as is. However, since the sensitivity tends to be low in the case of the rightwardly decreasing pattern, the power range may be determined after having shifted to the pulse width region wider than W1 to W6.

Figure 26:
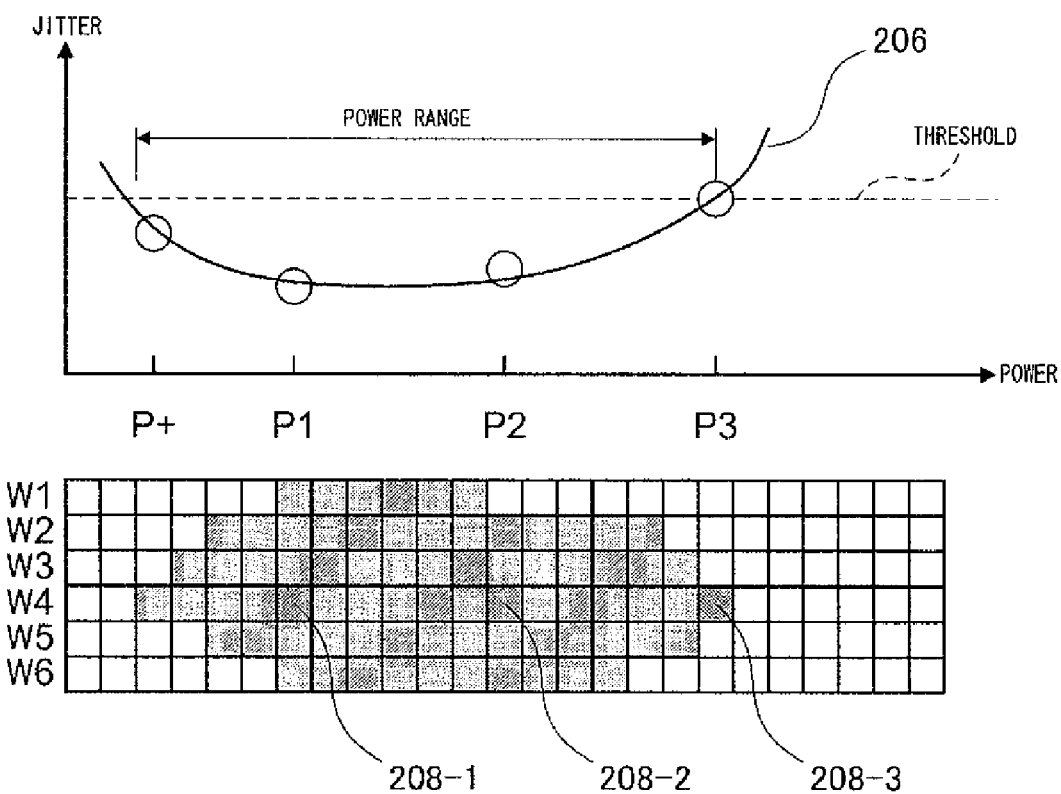
FIG. 26 is a conceptual drawing showing an example of determination of the test area performed in Step S122 when the rightwardly increasing pattern is obtained in Step S120 in FIG. 16.

FIG. 26 is a conceptual drawing showing an example of determination of the test area performed in Step S122 when the rightwardly increasing pattern is obtained in Step S120 in FIG. 16. As shown in FIG. 25, when the rightward increasing pattern is obtained, it seems that the optimum condition is on the lower power side, the additional recording is performed at a power value P+ which is lower than P1 and the crossing points between the approximation curve 206 drawn by the jitter values obtained at P+, P1, P2, P3, respectively, and the threshold are determined as a power range. This process is performed for the respective pulse widths W1 to W6, and the test area as shown in the matrix image shown in FIG. 26 is obtained.

Here, the test area determined by the procedure described above is such that the plane area of power×pulse width with the reference conditions 208-1, 208-2 and 208-3 at the center is shifted toward the lower power side. In this example, W1 to W6 used in the valley type pattern are used as is. However, since the sensitivity tends to be high in the case of the rightwardly increasing pattern, the power range may be determined after having shifted to the pulse width region narrower than W1 to W6.

In other words, since the record characteristic inspection is performed for each pulse width in the above-described method and, on the basis of the result, the number of times of the test is determined for each pulse width. Therefore, the reduction of the number of times of test is expected. The record characteristic inspection described above is an example performed by patterning the jitter change by the recording under the reference conditions and, more preferably, by using eight patterns shown below.

FIG. 27 is a drawing showing an example of a case in which Step S120 in FIG. 16 is performed using the eight patterns. As shown in FIG. 27, the pattern 1 is a pattern which is applied when the maximum value of the jitter is reduced to a value lower than the threshold irrespective of the type of the patterns such as the valley type, the rightwardly increasing or rightwardly decreasing. When such pattern is obtained, it is regarded to have the equivalent sensitivity with the reference media, and is determined that a large margin of values lower than the threshold is secured, so that the power condition is extended toward the lower power side and the higher power side, respectively. In other words, in the pattern 1, since there is no value near the threshold, the additional recording is performed both on the low power side and the high power side.

Then, the jitter characteristic obtained as a consequence of the additional recording is approximated, and the distance between the two points, the maximum value and the minimum value, where the approximation curve intersects with the jitter threshold is determined as a reference value of the power range.

When this pattern is obtained, the pulse width area of the reference value ±0.2 T is determined as the test area, and at the time of test recording, the interior of the test area is changed at every 0.2 T to detect the optimum recording conditions. The sign T represents the unit time length of the record mark.

Assuming that the pulse width as the reference value is a pulse condition 1, and the two extended points are a pulse condition 2 and a pulse condition 3, the pulse conditions 2 and 3 of the pattern 1 assume the pulse widths after having extended by ±0.2 T. According to the condition change of the pulse width, a slight change is applied also to the power range to be used as the test condition.

In other words, when the pulse width is changed by 0.1 T, the value obtained by the expression;

reference value of power range×(1−0.05×1)mW is determined as a power range with the corresponding pulse width. When the pulse width is changed by 0.2 T, the value obtained by the expression;

reference value of the power range×(1−0.05×2)mW is determined as a power range with the corresponding pulse width. When the pulse width is changed by −0.1 T, the value obtained by the expression;

reference value of the power range×(1−0.05×(−1)mW is determined as a power range with the corresponding pulse width.

Therefore, the test conditions in the case of the pattern 1 will be;
(1) reference value of pulse width, reference value of power range,
(2) reference value of pulse width−0.2 T, reference value of power range×(1−0.05×(−2)) mW
(3) reference value of pulse width+0.2 T, reference value of power range×(1−0.05×(+2)) mW.

In one embodiment, the reference condition shown in (1) may not used in the actual test recording.

The pattern 2 represents a case in which the valley type pattern is obtained, and is a pattern applied when the minimum value of the jitter is lower than the threshold. When this pattern is obtained, it is determined that the media for record has the same sensitivity as reference media, and the reference value±0.1 T is selected as the pulse width condition. Then, the power ranges are set for each pulse condition according to the same procedure as the pattern 1. Consequently, the test conditions in the case of the pattern 2 will be;
(1) reference value of pulse width, reference value of power range
(2) reference value of pulse width−0.1 T, reference value of power range×(1−0.05×(−1)) mW
(3) reference value of pulse width+0.1 T, reference value of power range×(1−0.05×(+1)) mW.

The pattern 3 represents a case in which the valley type pattern is obtained, and is a pattern applied when the minimum value of the jitter exceeds the threshold. When this pattern is obtained, it is determined that the media for record has the same sensitivity as the reference media and the difference in feature of the media is significant, and the reference value±0.2 T is selected as the pulse width condition. Then, the power ranges are set for each pulse condition according to the same procedure as the pattern 1. Consequently, the test condition in the case of the pattern 3 will be;

(1) reference value of pulse width, reference value of power range
(2) reference value of pulse width −0.2 T, reference value of power range×(1−0.05×(−2)) mW
(3) reference value of pulse width+0.2 T, reference value of power range×(1−0.05×(+2)) mW.

The pattern 4 represents a case in which the rightwardly decreasing pattern is obtained, and is a pattern applied when the minimum value of the jitter is smaller than the threshold. When this pattern is obtained, it is determined that the media for record is slightly lower in sensitivity than the reference media, and three points of the reference value, +0.1 T and +0.2 T are selected as the pulse width conditions. Then, the power range is set for each pulse condition according to the same procedure as the pattern 1. Consequently, the test conditions in the case of the pattern 4 will be;

(1) reference value of pulse width, reference value of power range
(2) reference value of pulse width+0.1 T, reference value of power range×(1−0.05×(+1)) mW
(3) reference value of pulse width+0.2 T, reference value of power range×(1−0.05×(+2)) mW.

The pattern 5 represents a case in which the rightwardly decreasing pattern is obtained, and is a pattern applied when the minimum value of the jitter exceeds the threshold. When this pattern is obtained, it is determined that the media for record is significantly lower in sensitivity than the reference media, and the three points of the reference value, +0.2 T and +0.4 T are selected as the pulse width conditions. Then, the power range is set for each pulse condition according to the same procedure as the pattern 1. Consequently, the test conditions in the case of the pattern 5 will be;

(1) reference value of pulse width, reference value of power range
(2) reference value of pulse width+0.2 T, reference value of power range×(1−0.05×(+2)) mW
(3) reference value of pulse width+0.4 T, reference value of power range×(1−0.05×(+4)) mW.

The pattern 6 represents a case in which the rightwardly increasing pattern is obtained, and is a pattern applied when the minimum value of the jitter is smaller than the threshold. When this pattern is obtained, it is determined that the media for record is slightly higher in sensitivity than the reference media, and three points of the reference value, −0.1 T and −0.2 T are selected as pulse width conditions. Subsequently, the power range is set for each pulse condition according to the same procedure as pattern 1. Consequently, the test condition in the case of the pattern 6 will be;

(1) reference value of pulse width, reference value of power range
(2) reference value of pulse width−0.1 T, reference value of power range×(1−0.05×(−1)) mW
(3) reference value of pulse width−0.2 T, reference value of power range×(1−0.05×(−2)) mW.

The pattern 7 represents a case in which the rightwardly increasing pattern is obtained, and is a pattern applied when the minimum value of the jitter exceeds the threshold. When this pattern is obtained, it is determined that the media for record is significantly higher in sensitivity than the reference media, and the three points of the reference value, −0.2 T and −0.4 T are selected as the pulse width condition. Then, the power range is set for each pulse condition according to the same procedure as the pattern 1. Consequently, the test conditions in the case of the pattern 7 will be;

(1) reference value of pulse width, reference value of power range
(2) reference value of pulse width−0.2 T, reference value of power range×(1−0.05×(−2)) mW
(3) reference value of pulse width−0.4 T, reference value of power range×(1−0.05×(−4)) mW.

The pattern 8 represents a case in which a chevron pattern is obtained, and is a pattern applied when the maximum value of the jitter exceeds the threshold. When this pattern is obtained, it is determined as a wrong pattern and the reference value±0.2 T is selected as the pulse width condition. Then, the power range is set for each pulse condition according to the same procedure as the pattern 1. Consequently, the test conditions in the case of the pattern 8 will be;

(1) reference value of pulse width, reference value of power range
(2) reference value of pulse width−0.2 T, reference value of power range×(1−0.05×(−2)) mW
(3) reference value of pulse width+0.2 T, reference value of power range×(1−0.05×(+2)) mW.

A configuration such that when the pattern other than the pattern 2 which is the closest to the reference media is detected from among the eight patterns described above, the recorded result as a base of this pattern is reproduced again for confirming that it is not because of the reproduction error and the jitter is detected again may also be applicable.

In this case, when the characteristics other than the pattern 2 are detected when reproduced again, the recording condition may be added and extended according to the conditions shown in FIG. 27.

When the pattern 8 is detected as a result of confirmation of the reproduction error, there is a probability of recording error. Therefore, recording is performed again with the reference value of the pulse width before performing additional recording and extension of the pulse width. When the pattern 8 is obtained even when the rerecorded result is reproduced, extension of the pulse conditions, that is, extension of the pulse conditions 2 and 3 is performed instead of the additional recording, that is, the power extension for performing margin measurement in the pulse condition 1. The extension of the power according to the extension of the pulse conditions 2 and 3 may be performed through the method described above.

In other words, in the case of the pattern 8, since the margin cannot be secured under the pulse condition 1, and hence the power range which serves as a base of the extension cannot be obtained, the initial power condition range is set as a power range as a reference.

Determination of Test Area, Determination of Power Range Through Approximation

While the test area effective for obtaining the optimum solution with a small number of times of the test is determined by performing the aforementioned procedure, a method of determining the power range which is important for determining the test area will be additionally explained below.

According to one embodiment, the test conditions are concentrated in the area lower than the threshold because increase in accuracy in finding of the optimum solution with the possible smallest number of times of the test is desired as described above. On the basis of this idea, the power range used in the case of the test recording may be obtained from the power values at the two points, the higher point and the lower point which indicates the margin with respect to the threshold. Here, the margin with respect to the threshold means the width in which the characteristic values lower than the threshold are obtained in the corresponding area, and the power value at the two points; the higher point and the lower point means the value on the low power side and the value on the high power side which define the width of the margin.

Considering the reduction of the test recording time for the various media and increase in efficiency of the test area of the media which has a limitation in the test recording area such as a write once media, a smaller number of the recording points required for the test recording is preferable. However, since the power range obtained here is an important parameter which serves as a criterion of the optimum recording condition, it is desired to have a high degree of accuracy.

Since obtaining the power range with high degree of accuracy means the test concentrating in the area selected further strictly, it contributes to reduction of the number of times of the test. For example, when performing the test recording at a frequency of once per 0.1 mW, ten times of the test recording is performed when the power range is 1 mW, and twenty times of the test recording is performed when the power range is 2 mW. Therefore, narrowing the power range contributes to the reduction of the number of times of the test.

In one embodiment, paying attention to the fact that the record characteristics of the recording reproduction signal follows a change of quadratic curve having an extreme value at the optimum point with respect to the recording power, a method for obtaining a desired amount of margin by approximating the characteristic curve using some recording points is proposed. Through the utilization of such approximation, the power range may be obtained using some recording points with high degreed of accuracy and easiness, and hence reduction of the number of times of the test is achieved.

Figure 28:
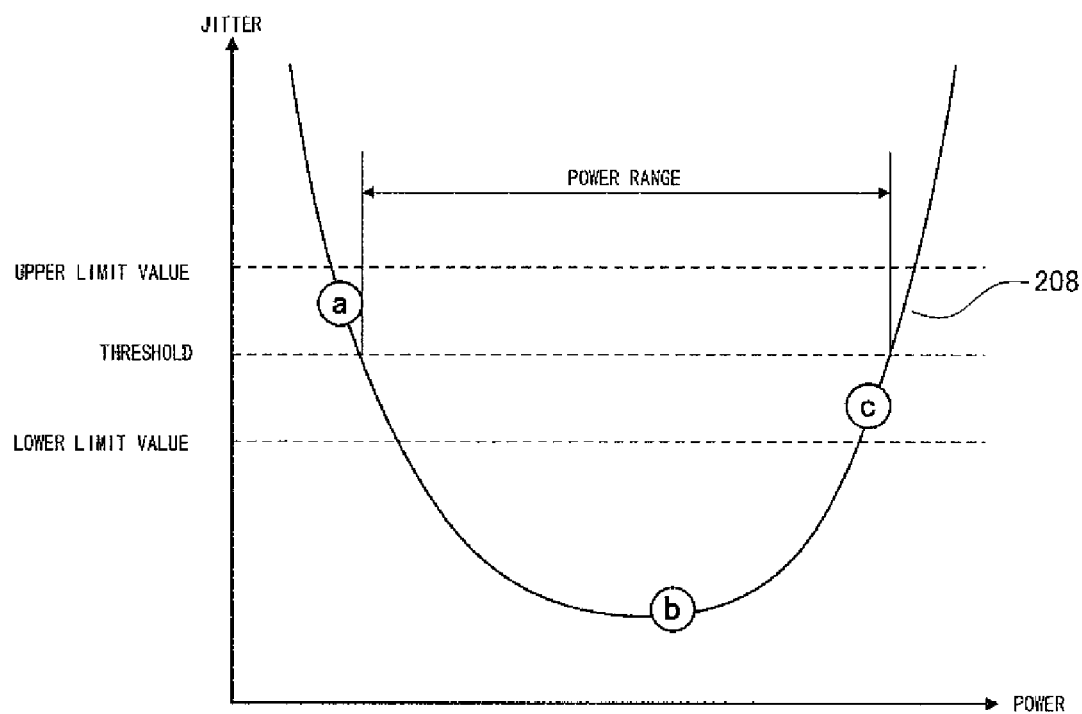
FIG. 28 is a conceptual drawing showing a method of obtaining a power range used in Step S122 in FIG. 16 through curve approximation.

FIG. 28 is a conceptual drawing showing a method of obtaining the power range used in Step S122 in FIG. 16 through curve approximation. As shown in FIG. 28, when performing the approximation, a value "b" being positioned between a value "a" whose jitter value as the criteria of the recording characteristic close to the threshold on the low power side and a value "c" on the high power side, and having a jitter value smaller than any of the values "a" and "c" and the threshold is selected. In other words, the values "a", "b" and "c" selected here have a relation of, a>b,c>b and threshold>b.

Here, the term "close to the threshold" described above is defined as a position between an upper limit value and a lower limit value having a certain width from the threshold as shown in FIG. 28, preferably, the upper limit value is set to 40% of the threshold, and the lower limit value is set to 5% of the threshold. Then, the values "a", "b" and "c" are approximated by a quadratic function, and the difference between the two points; the higher point and the lower point where the quadratic function intersects with the threshold is determined as a power range. The range defined as "close to the threshold" may be varied as needed such as −5% to +40% or −10% to 30% considering the distance between the recording points.

Figure 29:
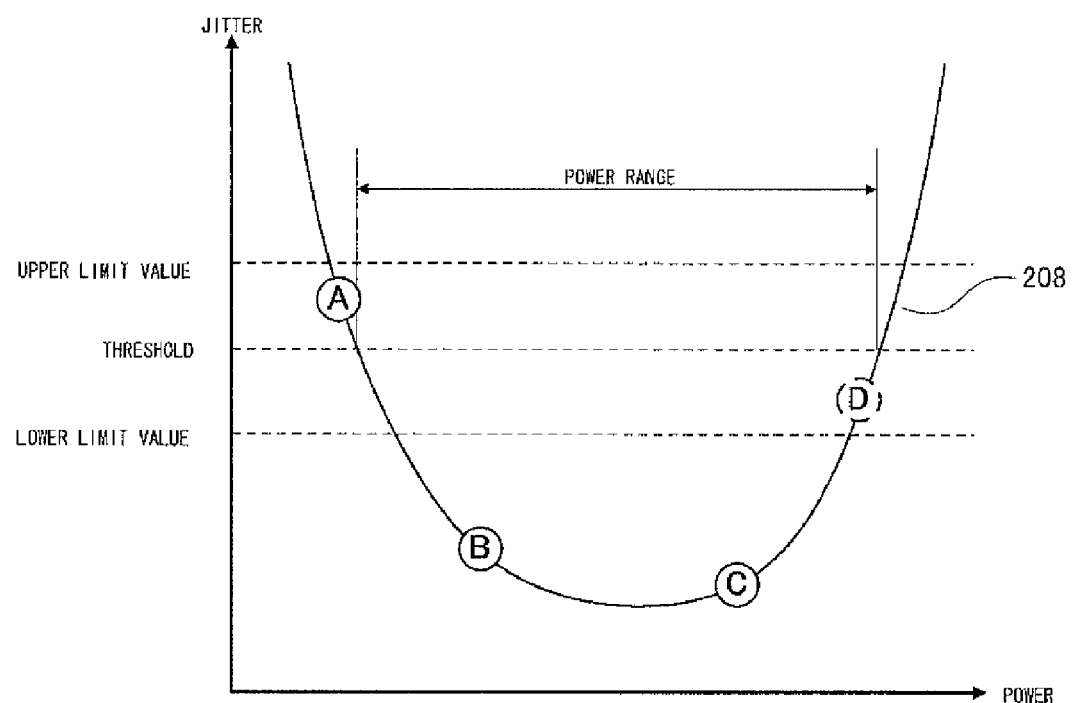
FIG. 29 is a conceptual drawing showing another method of obtaining the power range used in Step S122 in FIG. 16 through curve approximation.

FIG. 29 is a conceptual drawing showing another method of obtaining the power range used in Step S122 in FIG. 16 through curve approximation. As shown in FIG. 29, when the relation which satisfies the aforementioned a>b, c>b and threshold>b cannot be obtained only with the three conditions of A, B and C, it is preferable to obtain the values close to the threshold by adding D on the high power side.

Moreover, as shown in FIG. 29, when the relation B>C is satisfied, it is preferable to calculate an approximation expression with the three points of A, C and D without using B.

At this time, the relation among the three recording points and the threshold is expressed as "A>C, D>C, threshold>C" which is a relation suitable for drawing the approximation cure. Therefore, the approximation curve with high degree of accuracy may be obtained through three point approximation. The additional recording condition shown by D may be determined according to A>B, B>C and the threshold that the recording points before addition indicate.

In contrast to FIG. 28, when there is no value close to the threshold on the lower power side, the additional recording may be performed under the condition of lower power than "A" and, depending on the relation between the recording point and the threshold, one or more recording condition may be added as needed.

The range of the power used in the additional recording condition may have a certain variation with respect to a predetermined power step, or the power condition may be set on the basis of the relation of the variation of the jitter with respect to the variation of the power, which is obtained in advance.

When the recording points sufficient for obtaining the power range cannot be obtained even after the addition of the recording condition is performed, the addition of the recording condition is performed again according to the procedure shown above to change the recording points.

In a case in which there is a limitation in the test recording area as in the case of the write once media, or in order to avoid the utilization of the huge test time, it is also possible to provide an upper limit value to the number of times of addition of the recording conditions, or to provide an upper limit value to the additional power so that the recording power does not exceed a laser power value by the addition of the recording conditions.

In the example shown above, the power range is obtained through the three point approximation. However, it is also possible to select the two points which are closest to the threshold and determine the power range from the difference in power value between the two points; the higher point and the lower point indicated by these selected two points.

As another method of selecting two points close to the threshold, a method of varying and recording the power until the two points; the higher point and the lower point which interpose the threshold are found, and selecting two points which are the closest to the threshold from the recorded power, or selecting these two points as they are may also be applicable. This method will be additionally described in detail below.

Determination of Test Area: Determination of Power Range Through Sampling

Figure 30:
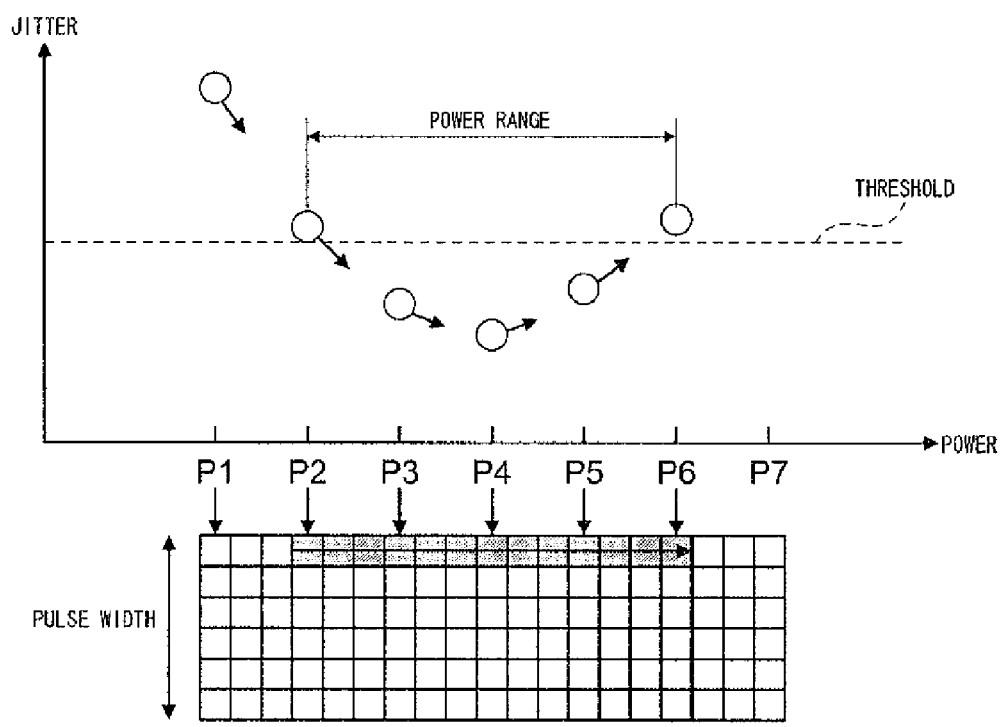
FIG. 30 is a conceptual drawing for explaining an example in which the power range used in Step S122 in FIG. 16 is obtained through sampling.

FIG. 30 is a conceptual drawing for explaining an example in which the power range used in Step S122 in FIG. 16 is obtained through sampling. In the example shown in FIG. 30, the power range is obtained on the basis of the power values at the two points; the higher point and the lower point close to the threshold by varying gradually the power until the values close to the threshold are obtained instead of the three points approximation described above.

In other words, as shown in FIG. 30, the recording reproduction is performed by increasing the recording power from P1, P2, P3 . . . in sequence, and is repeated to the power value P6 where a value higher than the threshold is obtained. When the image of this process is shown in matrix, although the power change is performed from P1 to P6, the power range only covers the portion between the P2 on the low power side, which is the closest to the threshold and P6 on the high power side. In this manner, the power range may be determined also by selecting two points which interpose the threshold.

Here, the method of selecting the two points; the higher point and the lower point close to the threshold may be achieved by selecting and using the following mode.

1) A method of selecting the two points; the higher point and the lower point which defines the power margin. That is, a method of selecting two points within a power range which satisfies the reproduction reference value, having values which are the closest respectively to the reproduction reference value.
2) A method of selecting the two points which are closest to the reproduction reference value although they are slightly outside the power margin.
3) A method of selecting the two points; the higher point and the lower point which interpose the reproduction reference value on the low power side.
4) A method of selecting the two points; the higher point and the lower point which interpose the reproduction reference value on the high power side.
5) A method of selecting two points which interpose the reproduction reference value on the low power side and the high power side, which are the closest respectively to the reproduction reference value.

It is also possible to use the two points selected through the above-described methods, approximate the recording characteristic, and obtain the two points of the higher point and the lower point which intersect the reproduction reference value. In the steps described thus far, the conditions of the top pulse which serves as the reference of the write pulse conditions are determined.

Determination of Last Pulse

Figure 31:
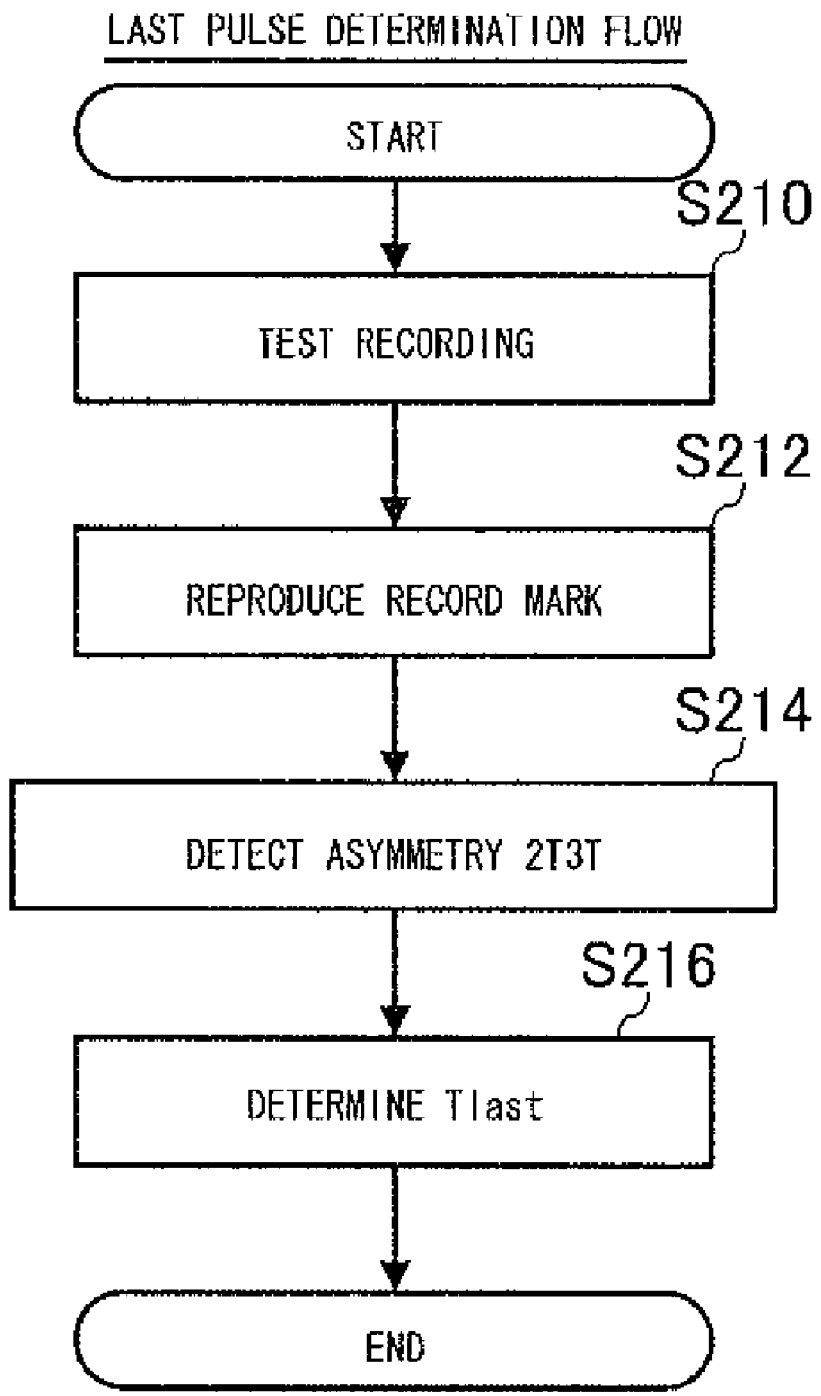
FIG. 31 is a flowchart showing a detailed procedure of the step of determining the condition of the last pulse shown in FIG. 10A.

FIG. 31 is a flowchart showing a detailed procedure of the step of determining the conditions of the last pulse shown in FIG. 10A. As shown in the FIG. 31, when determining the conditions of the last pulse, the test recording is performed using the conditions of the top pulse determined in the procedure described above and the conditions of the intermediate pulse set provisionally (Step S210), the record mark formed thereby is reproduced (Step S212), and the value of the asymmetry 2T3T is detected (Step S214). Then, the pulse width with which the value of the asymmetry 2T3T becomes "0", a predetermined target value or a value close thereto is specified, and this width is set as the condition of the last pulse (Step S216).

Figures 32A, 32B:
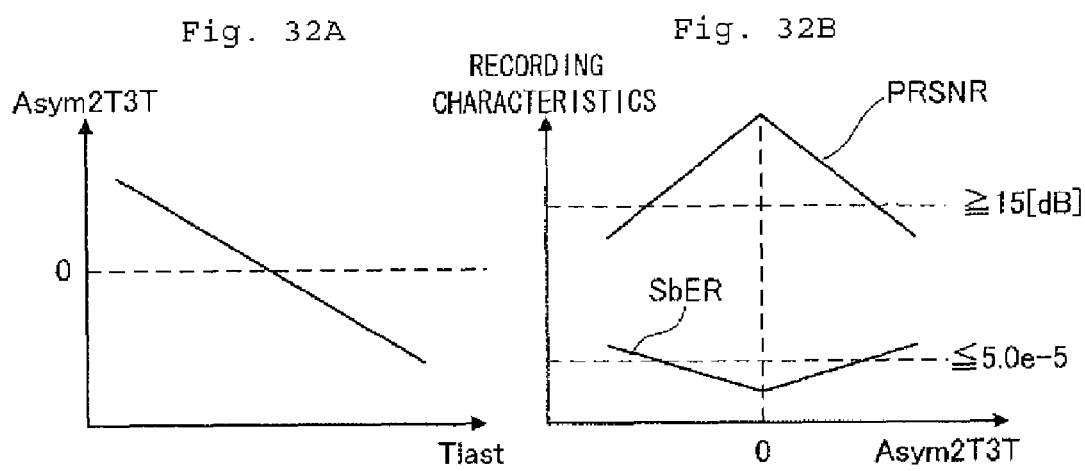
FIGS. 32A and 32B are graphs showing results obtained by performing the process shown in FIG. 31.

FIGS. 32A and 32B are graphs showing the results obtained by performing the process shown in FIG. 31. FIG. 32A shows the value of the asymmetry 2T3T obtained by changing the width of the last pulse Tlast step-by-step, and the width with which the asymmetry becomes "0" is set as the condition of the last pulse in FIG. 32A. FIG. 32B shows recording characteristics with respect to the change in asymmetry 2T3T. As shown in FIG. 32B, the recording characteristics of both PRSNR and SbER become most preferable values at points where the asymmetry 2T3T becomes "0". Here, the value of PRSNR is preferably 15 dB or higher, and SbER is desirably 5.0e-5 or lower. Therefore, sufficient recording characteristics may be achieved with the recording conditions under which the asymmetry 2T3T becomes "0".

Determination of Intermediate Pulse

Figure 33:
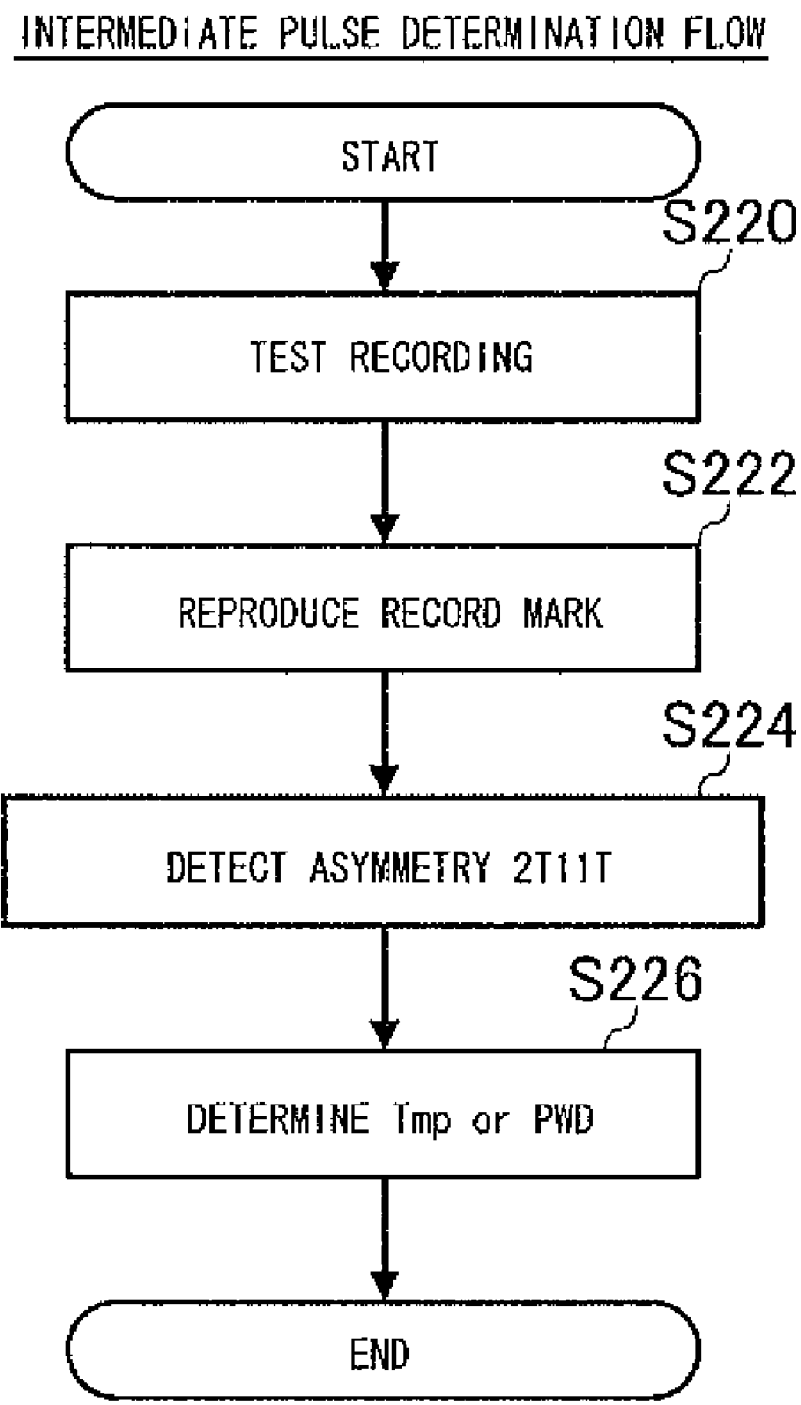
FIG. 33 is a flowchart showing a detailed procedure of the step of determining the condition of the intermediate pulse shown in FIG. 10A.

FIG. 33 is a flowchart showing a detailed procedure of the step of determining the conditions of the intermediate pulse shown in FIG. 10A. As shown in the FIG. 33, when determining the conditions of the intermediate pulse, the test recording is performed using the conditions of the top pulse and the conditions of the last pulse determined in the procedure described above (Step S220), the record mark formed thereby is reproduced (Step S222), and the value of the asymmetry 2T11T is detected (Step S224). Then, the pulse width with which the value of the asymmetry 2T11T becomes "0", a predetermined target value or a value close thereto is specified, and this width is set as the condition of the intermediate pulse (Step S226).

Figure 34:
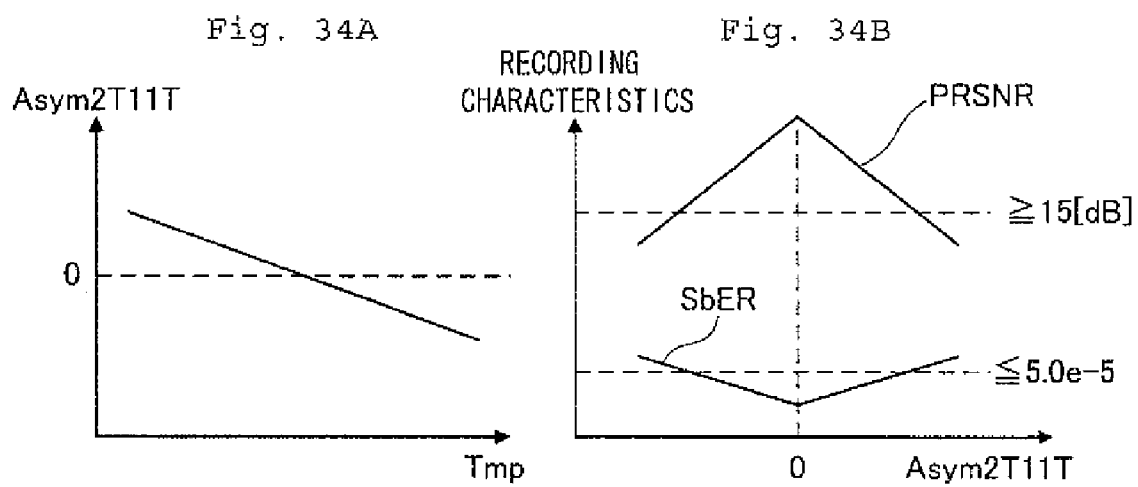
FIGS. 34A and 34B are graphs showing the results obtained by performing the process shown in FIG. 33.

FIGS. 34A and 34B are graphs showing the results obtained by performing the process shown in FIG. 33. FIG. 34A shows the value of the asymmetry 2T11T obtained by changing the width of the intermediate pulse Tmp step-by-step, and the width with which the asymmetry becomes "0" is set as the condition of the intermediate pulse. FIG. 34B shows recording characteristics with respect to the change in asymmetry 2T11T. As shown in FIG. 34B, the recording characteristics of both PRSNR and SbER become most preferable values at points where the asymmetry 2T11T becomes "0". Here, the value of PRSNR is preferably 15 dB or higher, and SbER is desirably 5.0e-5 or lower. Therefore, sufficient recording characteristics may be achieved with the recording conditions under which the asymmetry 2T11T becomes "0".

Through the adjustment of the last pulse, the center levels of the signal amplitudes of 2 T and 3 T match, and through the adjustment of the intermediate pulse, the center levels of the signal amplitudes of 2 T and 11 T match. Therefore, the center levels of the signal amplitudes of 3 T and 11 T match automatically. Consequently, three asymmetry indices; the asymmetry 2T3T, the asymmetry 2T11T and the asymmetry 3T11T match substantially at zero, and hence the recording characteristics are stabilized most under these conditions. The adjustment of the intermediate pulse is preferably achieved by controlling the power ratio between the top pulse and the intermediate pulse in the case of the single pulse and by controlling the width of the intermediate pulse in the case of the multi-pulse.

Phase Shift Correction

The phase shift correction is performed by performing the test recording of a predetermined pattern using the write pulses of the respective codes determined in the steps shown above, and reproducing the mark and space rows formed thereby, and correcting the shift of the obtained code information. In the description below, 3 T is assumed to be the shortest code. However, it is also applicable to an example in which 2 T is the shortest code.

Figure 35:
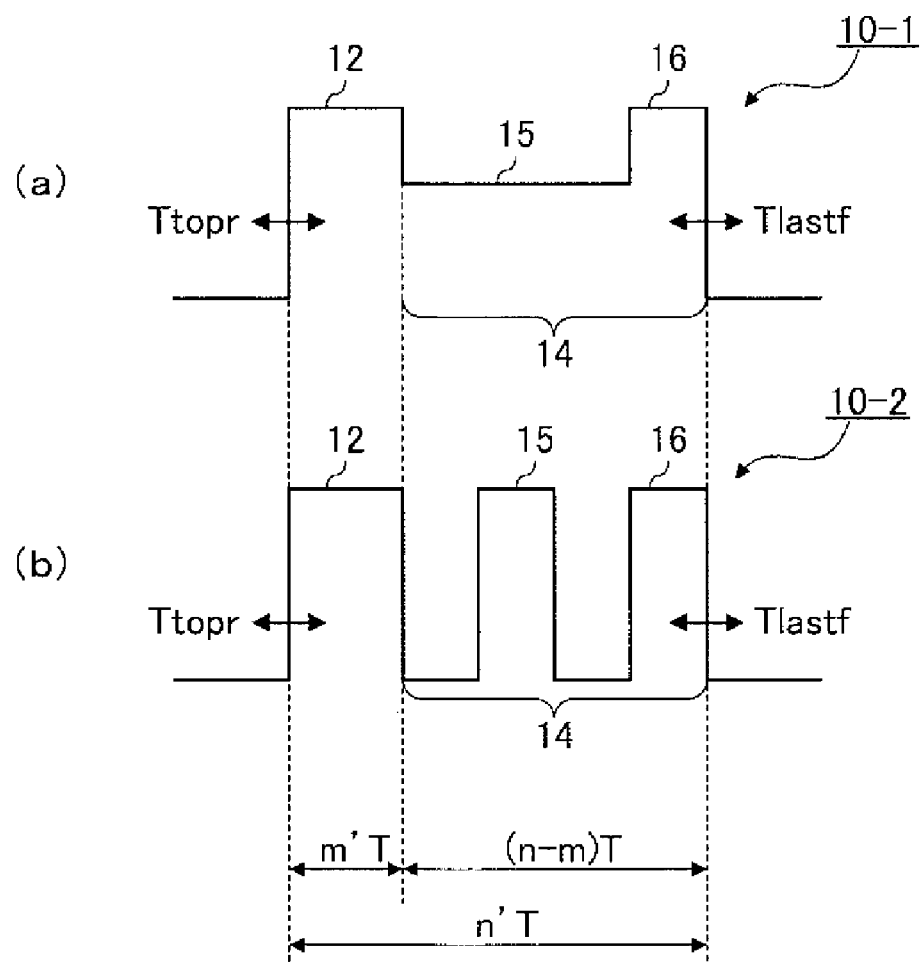
FIG. 35 is a conceptual drawing showing an example of the write pulse for testing used in the phase shift correction shown in FIG. 10A.

FIG. 35 is a conceptual drawing showing an example of the write pulse for testing used in the phase shift correction shown in FIG. 10A. The upper part of the drawing indicated by (a) is an example in a case in which the single pulse including a single pulse pattern is used, and the lower part of the drawing indicated by (b) is an example in a case in which the multi-pulse including a plurality of pulse patterns is used.

As shown in the respective drawings, in both cases of the single pulse 10-1 and the multi-pulse 10-2, Ttopr for adjusting the start position of the top pulse 12 and Tlastf for adjusting the end position of the last pulse 16 are set as phase conditions of the write pulse. Through the adjustment of these values, the mark length after recording is further optimized. The phase conditions are determined by performing the test recording on the basis of the conditions of the top pulse and the conditions of the subsequent pulses determined through the flow described above.

Figure 36:
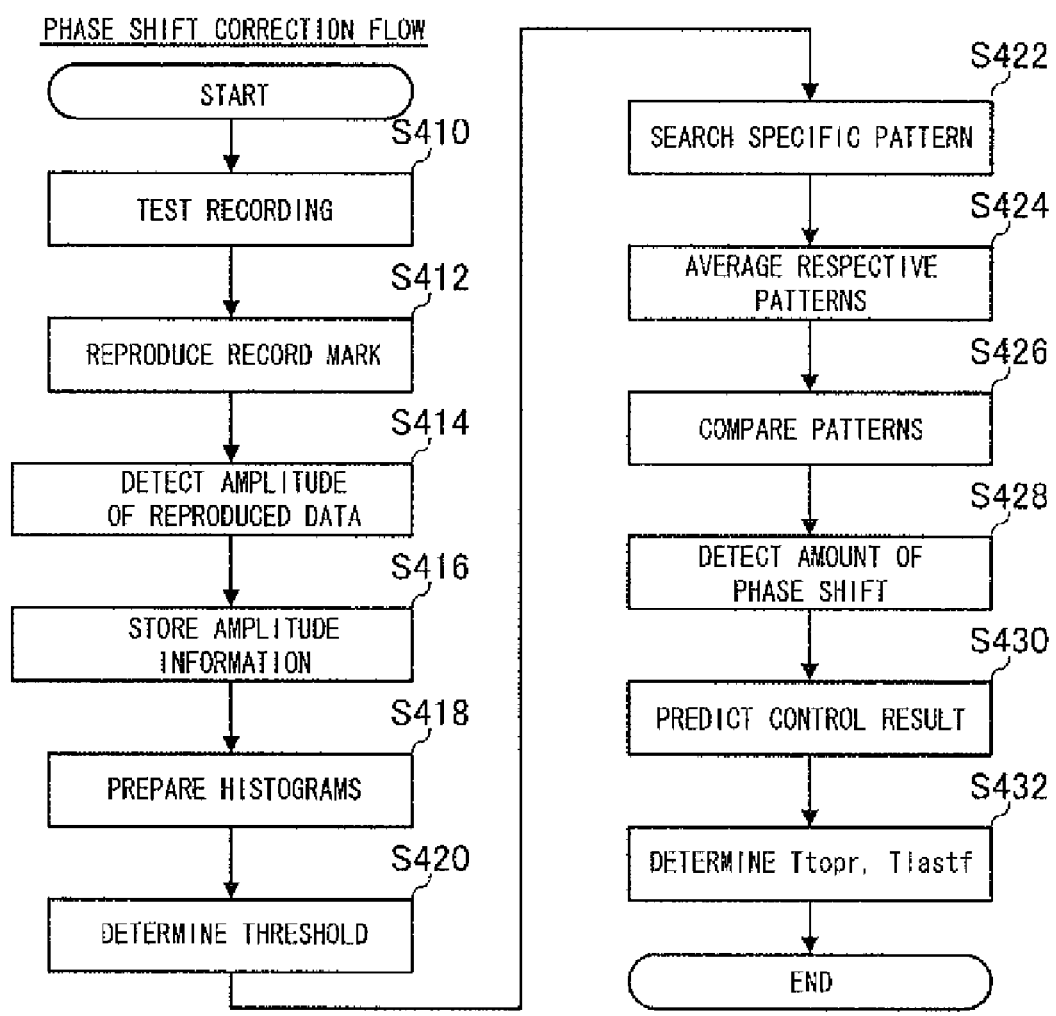
FIG. 36 is a flow chart showing the procedure of the phase shift correction shown in FIG. 10A.

FIG. 36 is a flow chart showing the procedure of the phase shift correction shown in FIG. 10A. As shown in FIG. 36, the drive shown in FIG. 15 firstly performs the test recording for the media 50 with a plurality of write patterns in which the phase conditions of the write pulse including the top pulse and the subsequent pulses are changed (Step S410). At this time, the conditions of the top pulse and the conditions of the subsequent pulses are fixed to the values obtained through the flow shown above.

Subsequently, the write pattern formed through the test recording is reproduced (Step S412), the amplitude information of the reproduction signal is detected in the amplitude detection block shown in FIG. 1, provided in the code determination circuit 110 thereby (Step S414), and the obtained amplitude data is stored in the record region 115 (Step S416).

Then, the record shift detector 112 prepares a histogram showing the appearance frequencies of the respective codes using the amplitude data stored in the record region 115 (Step S418), and the threshold of the amplitude level as a criterion of the mark length and the space length from the histogram is determined (Step S420).

Then, the record shift detector 112 searches a plurality of types of specific patterns including a specific mark/space patterns from the amplitude data stored in the record region 115 with reference to the threshold (Step S422), averages the amplitude data which seem to be the same mark length contained in the specific patterns and averages the amplitude data which seem to be the same space length, and obtains the average levels of the respective marks and the respective spaces which constitute the specific patterns (Step S424).

Subsequently, the record shift detector 112 sets one of the extracted plurality of specific patterns as the reference pattern, compares the reference pattern and other patterns (Step S426), and detects the shift amounts shown below independently (Step S428).

1) amount of front side phase shift of the mark with respect to the write pulse
2) amount of rear side phase shift of the mark with respect to the write pulse
3) shift amount of the mark from the write pulse due to heat interference.

Subsequently, an operational expression deriving part 113 derives the operational expression for determining the optimum strategy on the basis of the shift amount detected by the record shift detector 112, and a strategy determining part 114 predicts the results of control of the respective parameters using the operational expression derived by the operational expression deriving part 113 (Step S430) and, on the basis of the result of prediction, Ttopr and Tlastf are determined shown in FIG. 35, and are set in the strategy circuit 102 (Step S432).

Figure 37:
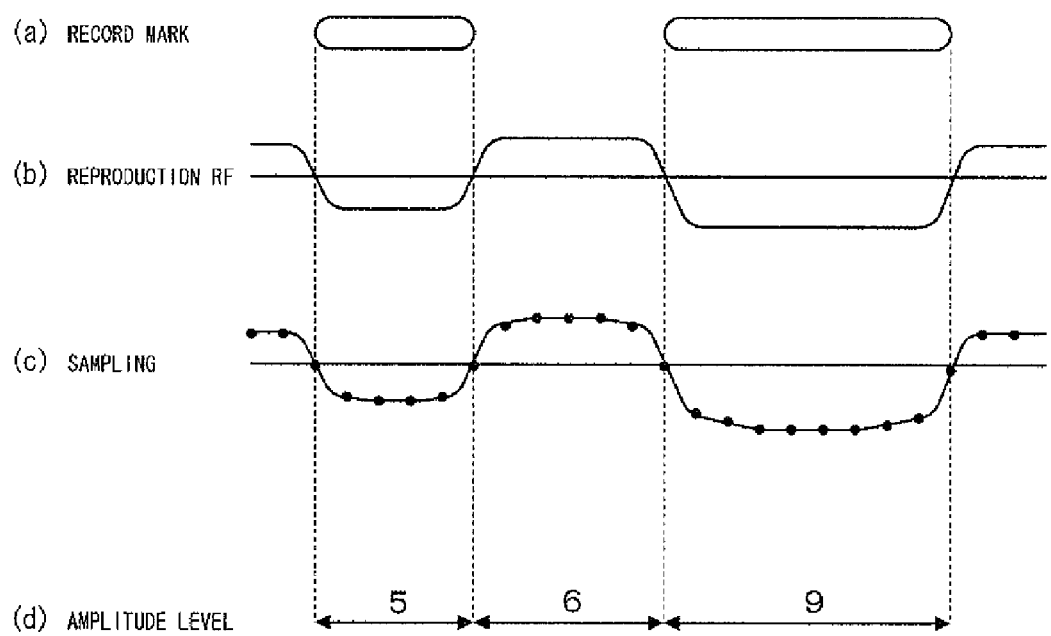
FIG. 37 is a conceptual drawing showing a concept of operation from the test recording to the detection of the amplitude level shown in FIG. 36.

FIG. 37 is a conceptual drawing showing a concept of operation from the test recording to the detection of amplitude level shown in FIG. 36. As shown in FIG. 37, when the test recording is performed, the record mark as shown in the part indicated by (a) is formed on an optical disk. Then, when the record mark is reproduced, a reproduction RF signal corresponding to the record mark is obtained as shown in the part indicated by (b). When this reproduction RF signal is sampled, the sampling data as indicated by black dots shown in the part indicated by (c) is obtained. Then, by extracting the maximum value or the minimum value from the sampling data, the amplitude level as shown in the part indicated by (d) is obtained.

FIG. 38 is a conceptual drawing showing a storage image of the amplitude level shown in FIG. 36. As shown in FIG. 38, the amplitude levels of binary signals detected by the clock signal are stored in a table provided in the memory area 115 with the increment of inversion parts together with discrimination of the mark and the space in time sequence. The table shown in FIG. 38 is stored in a state in which the address which can be searched later is added.

FIGS. 39A and 39B are conceptual drawings showing images of preparation of histograms shown in FIG. 36. As shown in FIGS. 39A and 39B, the histogram is obtained by creating a graph of the appearance frequency of the detected value. When the histograms are prepared with discrimination of the mark and the space, two types of histograms, that is, a mark histogram showing the detection tendency of the mark as shown in FIG. 39A, and a space histogram showing the detection tendency of the space as shown in FIG. 39B are obtained. In this manner, in the case of the optical disk, the length of the unit length nT (n=3, 4, 5, ... 14) with respect to the reference clock is logically determined, chevrons of the appearance frequency distribution with respect to the respective unit lengths nT are obtained.

FIGS. 40A and 40B are conceptual drawings showing an image of determination of the threshold shown in FIG. 36. As shown in FIGS. 40A and 40B, valley portions formed between the chevrons in the histograms may be used as the threshold of determination of the length of the respective unit lengths nT, the mark length threshold which serves as a criterion of the mark length and the space length threshold which serves as a criterion of the space length are set respectively for the mark histogram and the space histogram.

FIGS. 41A and 41B are conceptual drawings showing an example of the threshold obtained by the method shown in FIGS. 40A and 40B. As shown in FIG. 41A, the mark length thresholds are defined for the respective boundaries of the mark lengths, and as shown in FIG. 41B, the space length thresholds are defined for the respective boundaries of the space lengths. In the example shown in FIG. 41A, the threshold as a boundary between 2 T and 3 T is "amplitude level=2", the threshold as a boundary between 3 T and 4 T is "amplitude level=9", and the setting of the thresholds follows to the boundary between the 14 T and 15 T. In the example shown in FIG. 41B, the threshold as the boundary between 2 T and 3 T is "amplitude level=2", the threshold as the boundary between 3 T and 4 T is "amplitude level=10", and the setting of the thresholds follows to the boundary between 14 T and 15 T Subsequently, detailed description of the respective steps from the search of the specific patterns shown in FIG. 36 (Step S422) to the detection of the shift amount (Step S428) shown in FIG. 36 will be added. These steps are performed on the basis of the principle of detection of various shifts in the record shift detector 112.

Figure 42:
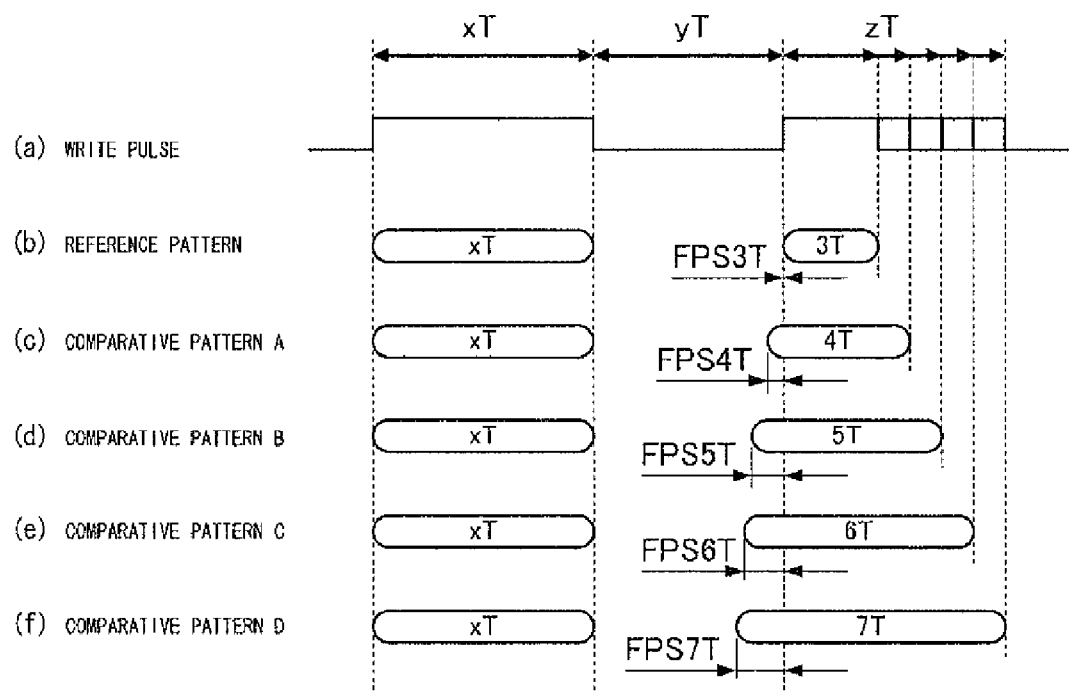
FIG. 42 is a conceptual drawings showing an example of a write pattern and a reproduction pattern for detecting the amounts of front side phase shift for the respective mark lengths.

FIG. 42 is a conceptual drawings showing an example of the write pattern and a reproduction pattern for detecting the amounts of front side phase shift for the respective mark lengths. As shown in FIG. 42, when detecting the amounts of the front side phase shift for the respective mark lengths, the write pulse shown in the part indicated by (a) is used to perform the test recording. The write pulse includes a pattern having a fixed mark MxT, a fixed space SyT, a variable mark MzT consecutively arranged, in which the mark length of the fixed mark MxT and the space length of the fixed space SyT are fixed, the mark length of the variable mark MzT is changed from 3 T, 4 T, ... to 7 T as shown in the parts indicated by (b) to (f). Although not shown in the drawing, the change of the variable mark length is to be performed to 14 T.

When the length of the fixed space SyT in this write pattern is measured here, the length of the fixed space SyT is expected to be constant in the ideal recording state. However, when the length of the fixed space SyT is deviated from the prescribed ideal length, since the mark length of the mark MxT is fixed, the shift amount of the length of the fixed space SyT from the prescribed ideal length corresponds to the amount of the front side phase shift with respect to the write pulses of the respective marks M3T, M4T, . . . M14T of 3 T, 4 T, . . . 14 T in the strategy at the time of recording.

Therefore, when the pattern shown in the part indicated by (b) where the variable mark MzT is 3 T is set as a reference pattern, the remaining patterns shown from the parts indicated by (c) to (f) are set as compared patterns, and the lengths of the fixed spaces SyT of the compared patterns are compared with the length of the fixed space SyT of the reference pattern, the amounts of front side phase shift FPS4T to FPS7T with respect to the reference pattern are obtained as shown in FIG. 42.

Here, since the respective shift amounts FPS3T to FPS7T must simply be detected as relative values with respect to a certain portion, the amount of front side phase shift FPS3T of the reference pattern may be defined as zero, or may be detected as the shift amount from the ideal length. It is also applicable to set any one of the patterns shown in the parts indicated by (c) to (f) as the reference pattern instead of the pattern show in the part indicated by (b).

Figure 43:
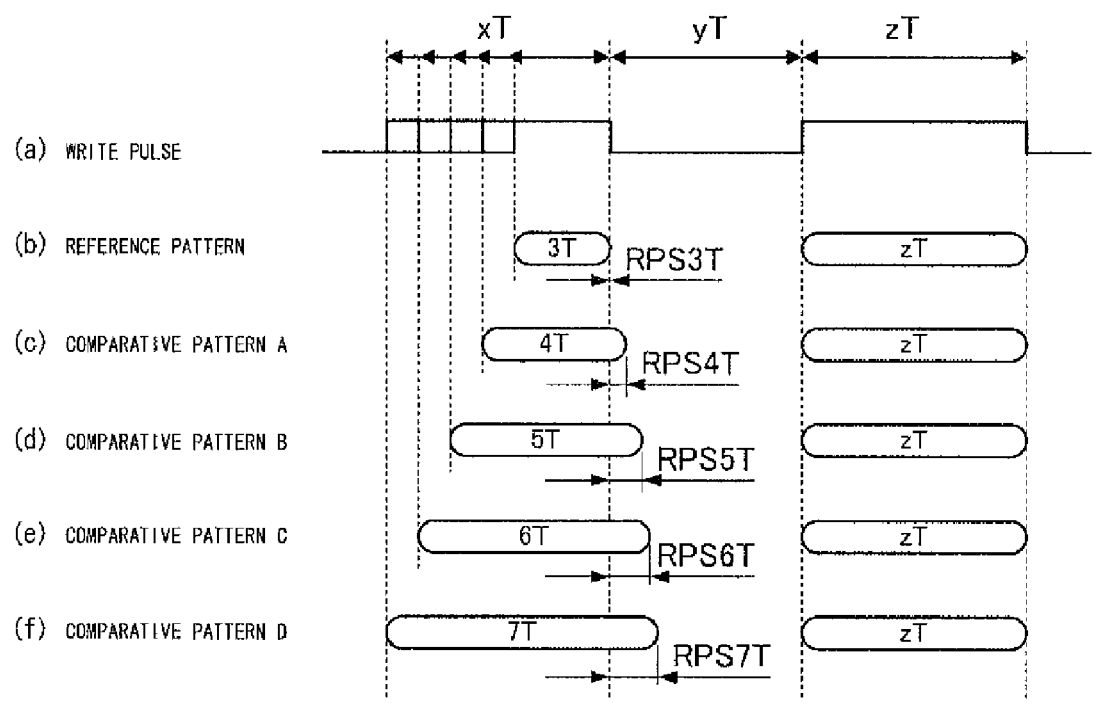
FIG. 43 is a conceptual drawing showing an example of the write pattern and the reproduction pattern for detecting the amounts of rear side phase shift for the respective mark lengths.

FIG. 43 is a conceptual drawing showing an example of the write pattern and the reproduction pattern for detecting the amounts of rear side phase shift for the respective mark lengths. As shown in FIG. 43, when detecting the amounts of rear side phase shift for the respective mark lengths, the write pulse shown in the part indicated by (a) is used to perform the test recording. The write pulse includes a pattern having a variable mark MxT, a fixed space SyT, a fixed mark MzT consecutively arranged, in which the space length of the fixed space SyT and the mark length of the fixed mark MzT are fixed, and the mark length of the variable mark MxT is changed from 3 T, 4 T, . . . to 7 T as shown in the parts indicated by (b) to (f). Although not shown in the drawing, the change of the variable mark length is to be performed to 14 T.

When the length of the fixed space SyT in this write pattern is measured here, the length of the fixed space SyT is expected to be constant in the ideal recording state. However, when the length of the fixed space SyT is deviated from the prescribed ideal length, since the mark length of the mark MzT is fixed, the shift amount of the length of the fixed space SyT from the prescribed ideal length corresponds to the amount of the rear side phase shift with respect to the write pulses of the marks M3T, M4T, . . . M14T of 3 T, 4 T, 14 T in the strategy at the time of recording.

Therefore, when the pattern shown in the part indicated by (b) where the variable mark MxT is 3 T is set as a reference pattern, the remaining patterns shown from the parts indicated by (c) to (f) are set as compared patterns, and the lengths of the fixed spaces SyT of the compared patterns are compared with the length of the fixed space SyT of the reference pattern, the amount of rear side phase shift RPS4T to RPS7T with respect to the reference pattern are obtained as shown in FIG. 43.

Here, since the respective shift amounts RPS3T to RPS7T must simply be detected as relative values with respect to a certain portion, the amount of rear side phase shift RPS3T of the reference pattern may be defined as zero, or may be detected as the shift amount from the ideal length. It is also applicable to set any one of the patterns shown in the parts indicated by (c) to (f) as the reference pattern instead of the pattern shown in the part indicated by an (b).

Figure 44:
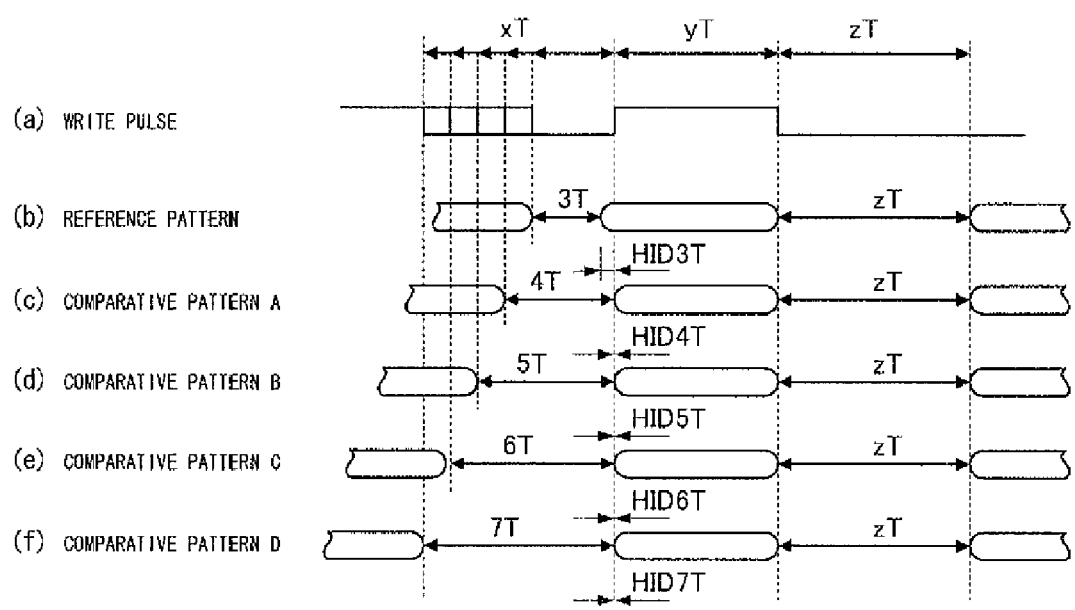
FIG. 44 is a drawing showing an example of the write pattern for detecting the amount of mark shift due to heat interference.

FIG. 44 is a conceptual drawing showing an example of the write pattern for detecting the amount of mark shift due to heat interference. As shown in FIG. 44, when detecting the amount of mark shift due to the heat interference, the write pulse shown in the part indicated by (a) is used to perform the test recording. The write pulse includes a pattern having a space SxT, a mark MyT, a space SzT consecutively arranged, in which the mark length of the fixed mark MyT and the space length of the fixed space SzT are fixed, and the space length of the variable space SxT is changed from 3 T, 4 T, . . . to 7 T as indicated in the parts from (b) to (f). Although not shown in the drawing, the change of the variable space length is to be performed to 14 T.

When the length of the fixed mark MyT in this write pattern is measured here, the length of the fixed mark MyT is expected to be constant in the ideal recording state. However, when the length of the fixed mark MyT is deviated from the prescribed ideal length, since the space length of the space SzT is fixed, the shift amount of the length of the fixed mark MyT from the prescribed ideal length corresponds to the shift amount of the mark formed immediately before the variable space Sxt due to heat interference.

Therefore, when the pattern shown in the part indicated by (b) where the variable space SxT is 3 T is set as a reference pattern, the remaining patterns shown from the parts indicated by (e) to (f) are set as compared patterns, and the lengths of the fixed mark MyT of the compared patterns are compared with the length of the fixed Mark MyT of the reference pattern, the amount of front side phase shift HID3T to HID7T with respect to the reference pattern are obtained.

Here, since the respective shift amounts HID3T to HID7T must simply be detected as relative values with respect to a certain portion, the amount of front side phase shift HID3T of the reference pattern may be defined as zero, or may be detected as the shift amount from the ideal length. It is also applicable to set any one of the patterns shown in the parts indicated by (c) to (f) as the reference pattern instead of the pattern shown in (b).

FIGS. 45A and 45B are conceptual drawings showing configurations of tables for searching the specific pattern used in the mark front phase shift detection and the mark rear phase shift detection. When performing the mark front phase shift detection, data stored in the memory area 115 in FIG. 10 is searched on the basis of the threshold ranges shown in FIG. 45A relating the mark MxT, the space SyT, and the mark MzT set for the respective specific patterns (which corresponds to Step S422 in FIG. 36), and extracts the data row which satisfies the threshold.

Subsequently, the amplitude levels which corresponds to the mark MxT, the space SyT and the mark MzT respectively are classified, and the average values are obtained for the mark MxT, the space SyT and the MzT respectively (which corresponds to Step S424 in FIG. 36). By performing the pattern comparison described above is performed using the average value of the amplitude levels, the amount of front side phase shift in the respective mark lengths is obtained. FIG. 45B shows an example of the thresholds in a case in which the mark rear phase shift detection is performed. The idea and the operation are the same as in the case of performing the mark front phase shift detection.

Figure 46:
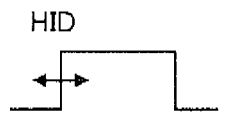
FIG. 46 is a conceptual drawing showing a configuration of a table for searching a specific pattern used in the mark interference shift detection.

FIG. 46 is a conceptual drawing showing a configuration of a table for searching the specific pattern used in the mark interference shift detection. As shown in FIG. 46, mark interference shift detection is performed in the same method as for the mark front phase shift and the mark rear phase shift which has been described in conjunction with FIGS. 45A and 45B.

Figure 47:
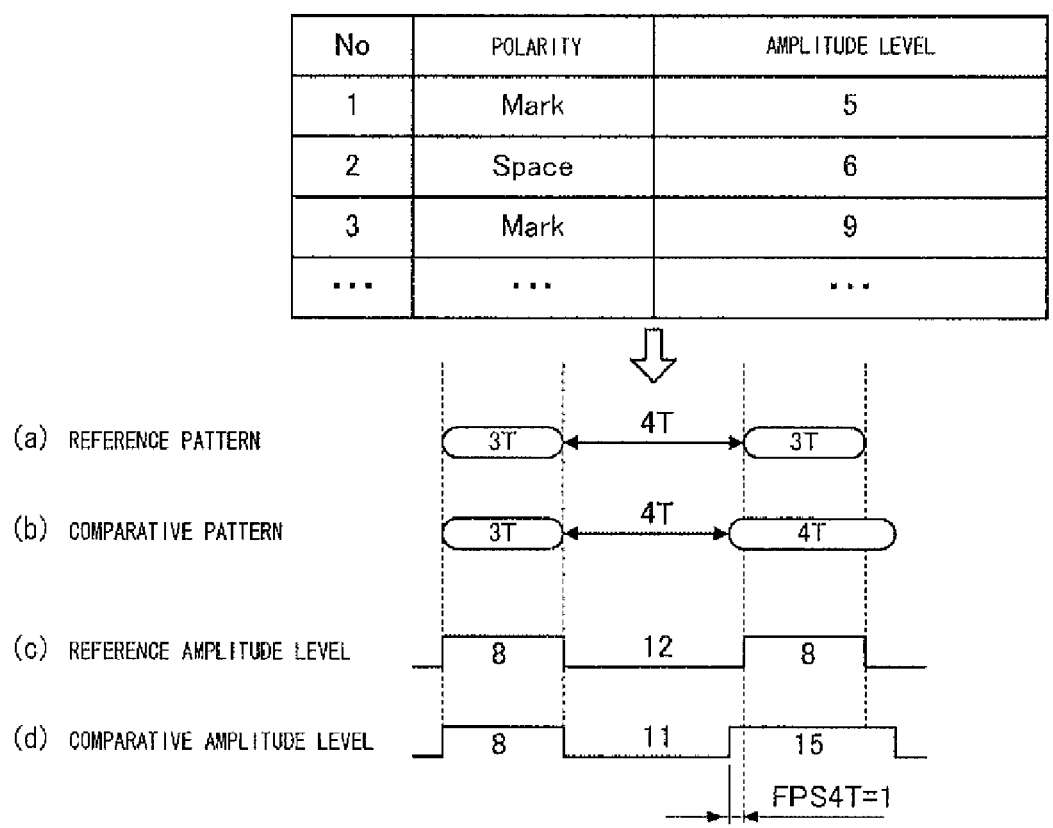
FIG. 47 is a conceptual drawing showing a detailed example in case in which the shift amount is detected through the relative comparison of the amplitude level.

FIG. 47 is a conceptual drawing showing a detailed example in case in which the shift amount is detected through the relative comparison of the amplitude level. Although FIG. 47 shows an example in which the mark front phase shift is detected, the same method is used for detecting other shift amounts. When detecting the shift amount, the reference pattern and the comparative pattern shown in the parts indicated by (a) and (b) are searched and extracted from the data amount stored in the memory area first, and then the amplitude level for a portion which is expected to have the fixed length is compared as shown in the parts indicated by (c) and (d). In the example shown in FIG. 47, since the space SyT corresponds to a portion to be compared, the difference between the value "12" shown in the part indicated by (c) as the amplitude level of the reference pattern and the value "11" shown in the part (d) which is the amplitude level of the comparative pattern is obtained, and the obtained difference "1" corresponds to the value of the shift amount FPS4T.

Figure 48:
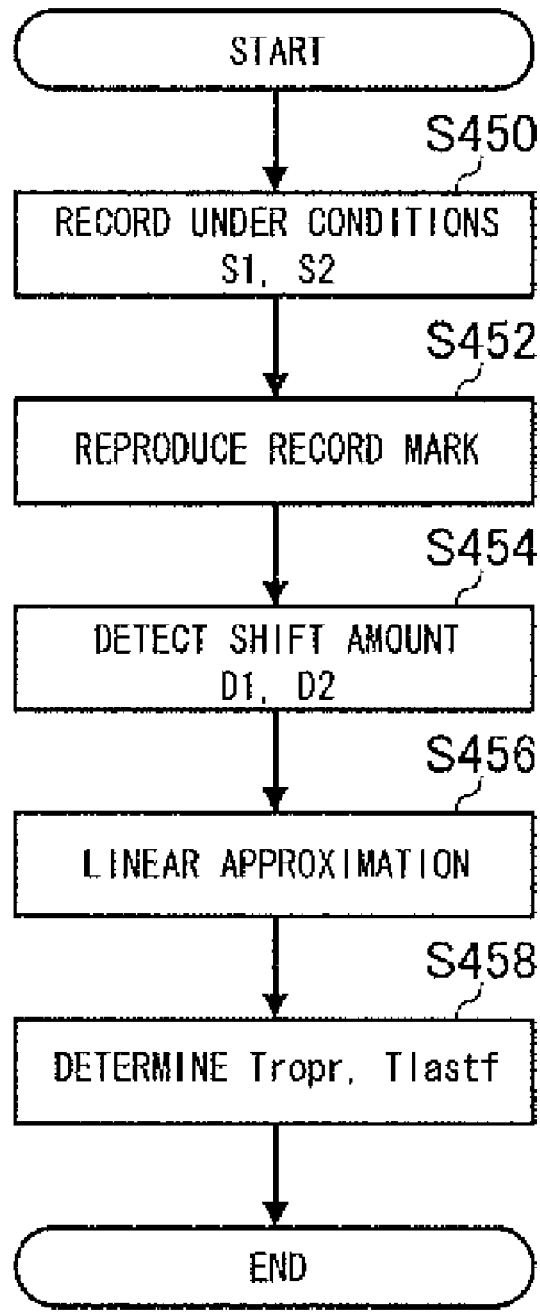
FIG. 48 is a flowchart showing an example of determination of Ttopr and Tlastf through prediction of the amount of control shown in FIG. 36.

FIG. 48 is a flowchart showing an example of determination of Ttopr and Tlastf through prediction of the amount of control shown in FIG. 36. As shown in FIG. 48, the prediction of the amount of control is achieved by performing the test recording under at least two types of conditions of S1 and S2 having the different recording conditions (Step S450), reproducing the record mark obtained thereby (Step S452), obtaining the shift amount D1 corresponding to the condition S1 and the shift amount D2 corresponding to the condition S2 by the comparison of the reproduction pattern obtained thereby (Step S454), linearly approximating relations between S1 and S2, and between D1 and D2 (Step S456), and determining the optimum Ttopr and Tlastf using a straight line (Step S458).

Figure 49:
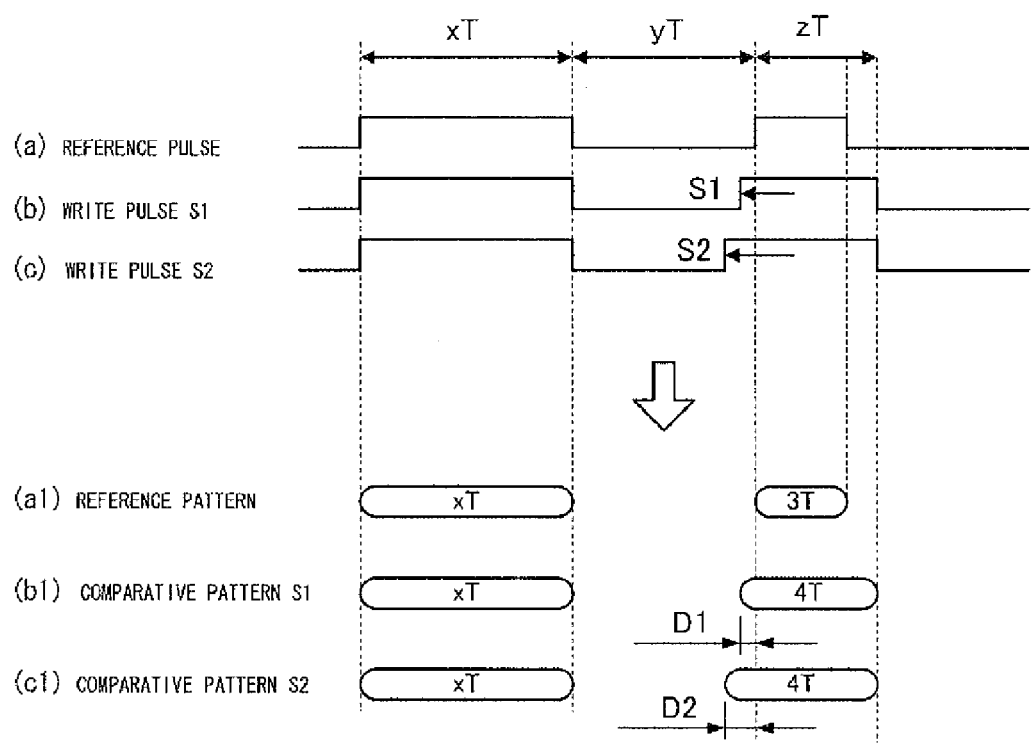
FIG. 49 is a conceptual drawing showing a relation between the change of the recording conditions S1 and S2 and the shift amounts D1 and D2.

FIG. 49 is a conceptual drawing showing a relation between the change of the recording conditions S1 and S2 and the shift amounts D1 and D2. Assuming that the write pulse shown in the part indicated by (a) is the reference pulse of "MzT=3 T", the write pulse of "MzT=4 T" as the object of comparison is subject to the test recording under the two conditions of the write pulse S1 shown in the part indicated by (b) in which the leading end of MzT is changed by S1 and the write pulse S2 shown in the part indicted by (c) in which the leading end of MzT is changed by S2.

Consequently, the reference pattern shown in the part indicated by (a1) is obtained corresponding to the write pulse in the part indicated by (a), the comparative pattern S1 shown in the part indicated by (b1) is obtained corresponding to the write pulse shown in the part indicated by (b), and the comparative pattern S2 indicated in the part indicated by (c1) is obtained corresponding to the write pulse shown in the part indicated by (c). The comparative pattern S1 here is shifted by the shift amount D1 corresponding to the amount of control S1 and the comparative pattern S2 is shifted by the amount D2 corresponding to the amount of control S2.

When the shift amounts D1 and D2 with respect to the amounts of control S1 and S2 are known, the relations among the parameter, the amount of control to be given to that parameter and the amount of shift which may be resulted from that amount of control may be predicted, so that the prediction of the amount of control and the determination of the correction value are performed using these relations.

Figure 50:
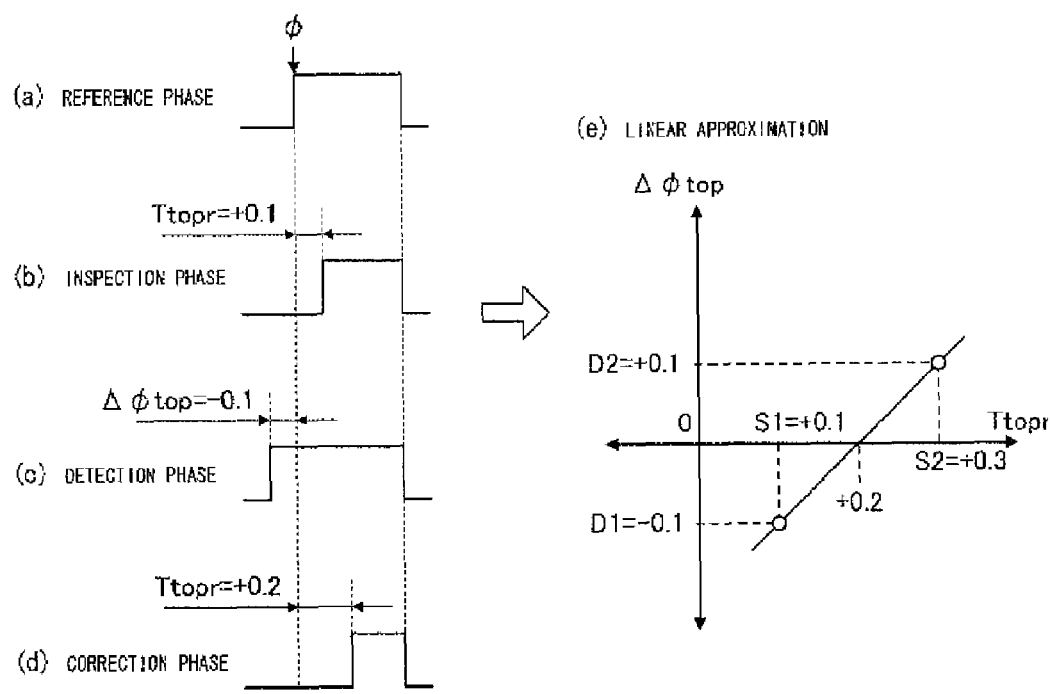
FIG. 50 is a conceptual drawing showing an example of correction of a front side phase shift using the linear approximation.

FIG. 50 is a conceptual drawing showing an example of correction of the front side phase shift using the linear approximation. When determining the amount of correction Ttopr with respect to the front side phase shift, firstly, when the pulse position as a reference is assumed to be a standard phase φ as shown in the part indicated by (a), the test recording is performed with a waveform shifted in pulse position by Ttopr as shown in the part (b) (which corresponds to the recording conditions S1 and S2) and, consequently, the phase shift Δφtop of the obtained reproduction signal is detected as shown (which corresponds to the shift amounts D1 and D2) as shown in the part indicated by (c).

In the example shown in FIG. 50, Ttopr is changed under two conditions; S1=+0.1 and S2=+0.3 to obtain the detection phase Δφtop as the shift amounts D1=−0.1 and D2=+0.1. Then, the relation of the control result Δφtop with respect to the amount of control Ttopr is linearly approximated using the obtained values S1, S2, D1 and D2 as shown in the part indicated by (e), and the correction phase Ttopr=+0.2 from which the phase shift may be cancelled with the obtained straight line is determined as a value of the optimum amount of correction.

In this manner, since the relation between the change in strategy S1, S2 and the change in shift amount D1, D2 may be approximated using a straight line or curve by obtaining at least two changed points, and hence the optimum amount of correction which makes the shift amount zero may be obtained using this straight line.

More specifically, the optimum correction of the write pulse is achieved by obtaining the shift amount D when several points of the strategy S are changed, substituting the relation between the strategy S and the shift amount D at this time into a general expression "D=a×S+b" and solving a simultaneous equation to obtain constants a and b, obtaining the strategy S which finally corresponds to the ideal shift amount D, and setting the strategy S to the strategy circuit 102 shown in FIG. 9.

For example, assuming that the shift amount detected by the record shift detector 112 shown in FIG. 15 from a reproduction pattern of in the test recording using a certain strategy S1 is D1 and the shift amount detected by the same detector from a reproduction pattern in the test recording using another strategy S2 is D2, the optimum strategy S is determined by calculating "a" and "b" from expressions;

$$D1 = a \times S1 + b$$

$$D2 = a \times S2 + b,$$

obtaining a function;

$$S = (D-b)/a$$

using the calculated values "a" and "b", and
substituting the output shift amount D for correcting the initial output shift or the like occurred in an equalizer or the like into this function for improving the record characteristic.

The function for obtaining the optimum strategy S may be obtained corresponding to the respective marks M3T, M4T, . . . M14T of 3 T, 4 T, . . . 14 T. The function for obtaining the optimum strategy S may also be obtained respectively corresponding to the recording velocity.

Figure 51:
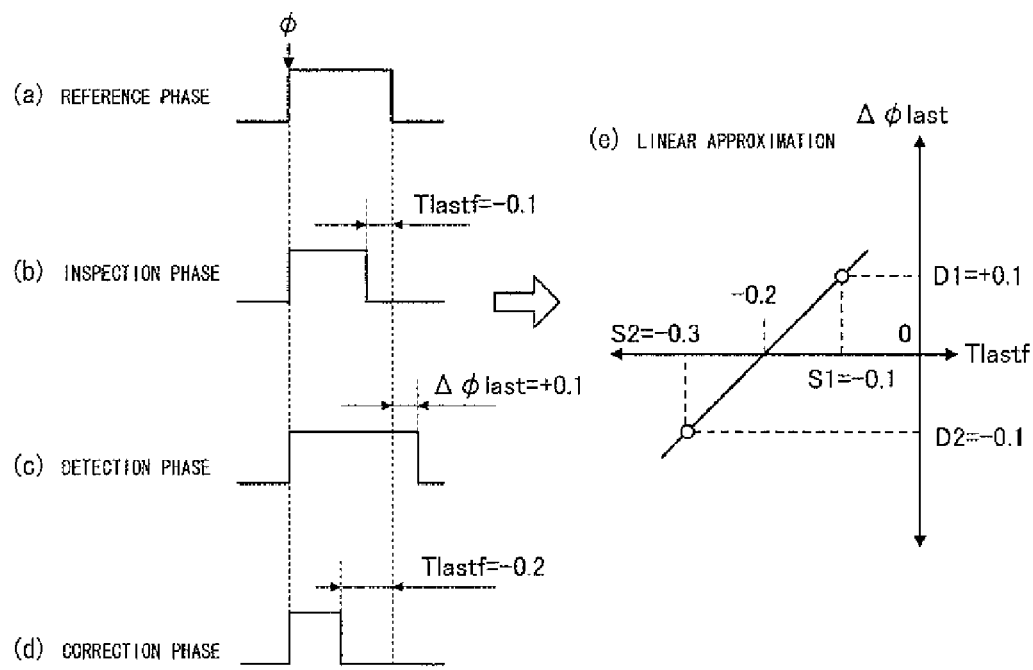
FIG. 51 is a conceptual drawing showing an example of correction of a rear side phase shift using the linear approximation.

FIG. 51 is a conceptual drawing showing an example of correction of the rear side phase shift using the linear approximation. When determining the amount of correction Tlastf with respect to the rear side phase shift, firstly, when the pulse position as a reference is assumed to be the standard phase φ as shown in the part indicated by (a), the test recording is performed with a waveform shifted in pulse position by Tlastf as shown in the part (b) and, consequently, the phase shift of the obtained reproduction signal Δφlast is detected as shown in the part indicated by (c).

In the example shown in FIG. 50, Tlastf is changed under two conditions; S1=−0.1 and S2=−0.3 to obtain the detection phase Δφlast as the shift amounts D1=+0.1 and D2=−0.1. Then, the relation of the control result Δφlast with respect to the amount of control Tlastf is linearly approximated using the obtained values S1, S2, D1 and D2 as shown in the part indicated by (e), and the correction phase Tlastf=−0.2 from which the phase shift may be cancelled with the obtained straight line is determined as a value of the optimum amount of correction.

FIGS. 52A and 52B are conceptual drawings showing configurations of tables for storing the amounts of correction Ttopr and Tlastf. As shown in FIG. 52A, the amount of correction Ttopr is defined by the combination of the mark length to be corrected and the front space length of the mark. For example, when the mark to be corrected is 3 T, and the front space of the mark is 3 T, the amount of correction is stored in an area indicated by "3-3", in the drawing, and when the mark to be corrected is 4 T and the front space of the mark is 3 T, the amount of correction is stored in an area indicated by 3-4. In this manner, the storage of the amounts of correction is continued to 5 T, . . . 14 T in the same manner as 3 T and 4 T.

As shown in FIG. 52B, the amount of correction Tlastf is defined by the combination of the mark length to be corrected and the rear space length of the mark. For example, when the mark to be corrected is 3 T, and the rear space of the mark is 3 T, the amount of correction is stored in an area indicated by "3-3" in the drawing, and when the mark to be corrected is 4 T and the rear space of the mark is 3 T, the amount of correction is stored in an area indicated by "3-4". In this manner, the storage of the amounts of correction is continued to 5 T, . . . 14 T in the same manner as 3 T and 4 T.

Figure 53:
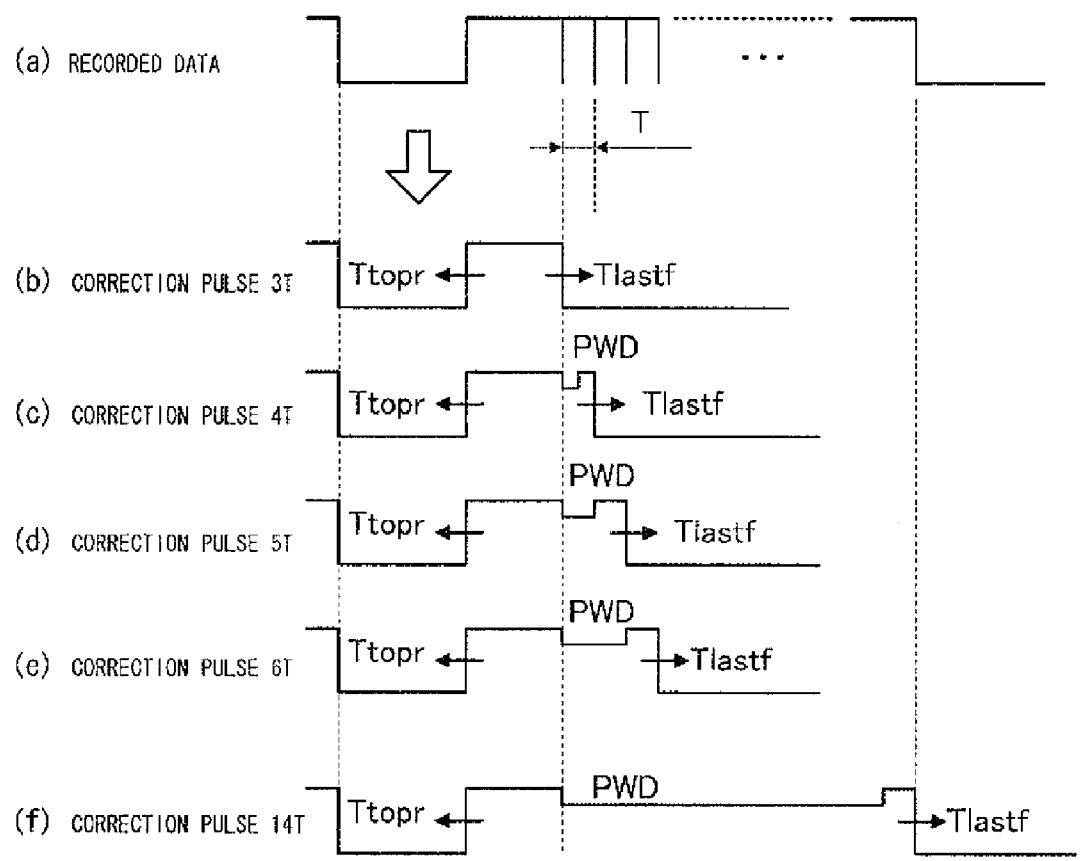
FIG. 53 is a conceptual drawing showing an example of a single pulse after correction.

FIG. 53 is a conceptual drawing showing an example of the single pulse after correction. As shown in FIG. 53, when recording the recorded data on the optical disk as shown in the part indicated by (a), a strategy to which a value of the optimum amount of correction is applied is set to each mark length. For example when recording 3 T mark, as shown in the part indicated by (b), the front end correction value Ttopr of 3 T mark is read according to the front space length from the table shown in FIG. 52A and the rear end correction value Tlastf of 3 T mark is read according to the rear space length from the table shown in FIG. 52B, so that the front end and the rear end of the write pulse are corrected by Ttopr and Tlastf which are read from the tables.

When correcting from 4 T mark on, as shown in the parts indicated by (c) to (f), the PWD correction value of the corresponding mark length is read from the predetermined table in addition to Ttopr and Tlastf to correct the pulse shape according to the value of the PWD.

Figure 54:
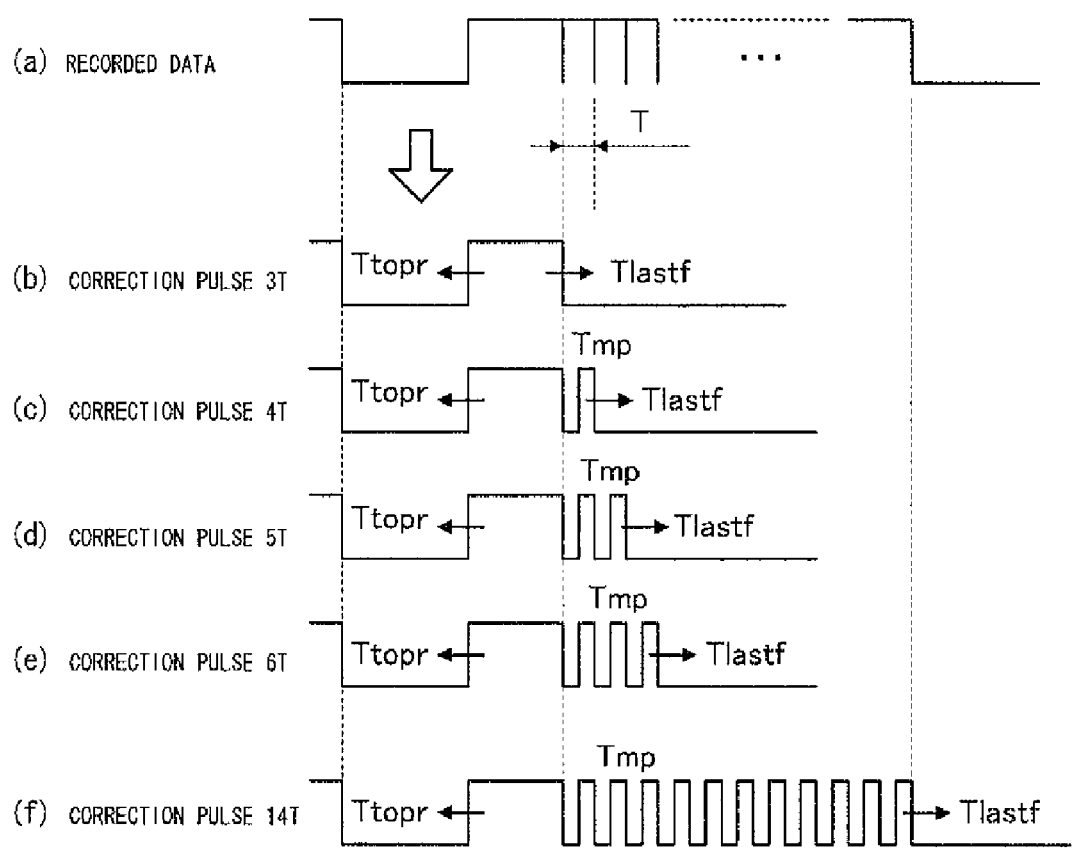
FIG. 54 is a conceptual drawing showing an example of a multi-pulse after correction.

FIG. 54 is a conceptual drawing showing an example of the multi-pulse after correction. As shown in FIG. 54, in the case of the multi-pulse, Tmp correction value is read out from a predetermined table to correct the pulse shape according to the value of Tmp instead of PWD correction value of the single pulse shown in FIG. 53. Other portions are the same as the single pulse.

In the embodiment described thus far, the optimum strategy S is determined by substituting the shift amount D into the function for obtaining the optimum strategy S. Alternatively, it is also possible to prepare a correction table obtained from the function so that the optimum strategy S is determined on the basis of the correction table.

Alternatively, the setting of the optimum strategy may be performed each time when the type of the optical disk is changed, or each time when the recording velocity is changed. A configuration in which the conditions of the optimum strategy determined by the aforementioned setting of the optimum strategy are stored in the memory correspondingly to the type of the optical disk and the recording velocity, and the optimum strategy stored in the memory is read out for use when recording on the same type of optical disk again or at the same recording velocity may also be applicable.

Figure 55:
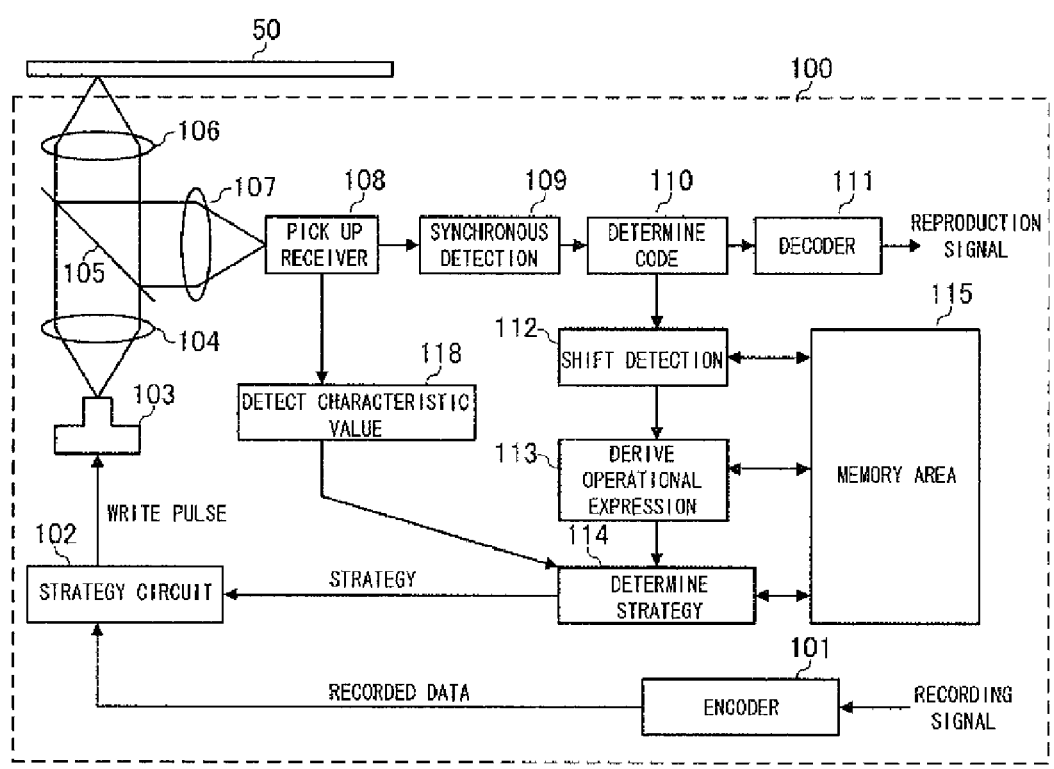
FIG. 55 is a block diagram showing an internal configuration of a drive according to a second embodiment.

FIG. 55 is a block diagram showing an internal configuration of a drive according to a second embodiment. In the configuration shown in FIG. 55, a characteristic detector 118 is provided instead of the asymmetry detection circuit shown in FIG. 15, and with the characteristic detector 118, the evaluation index value for figuring out the characteristics of the reproduction signal obtained by reproducing the recording media 50 detected by the pick up receiver 108 is obtained.

The characteristic detector 118 preferably includes the A/D converter and the bitabi decoder shown in FIG. 1, and derivation of the evaluation index value in this configuration is achieved by, when a code pattern detected from the reproduction signal is recognized, comparing the acquired reproduction signal with an ideal signal generated according to the detected code pattern and quantifying the recording state.

Here, the reproduction signal used for the comparison is preferably digital data after PR equalization, and the ideal signal is preferably an ideal reproduction signal obtained when the detected code pattern is accurately recorded under the same detecting conditions as the reproduction signal.

Figure 56:
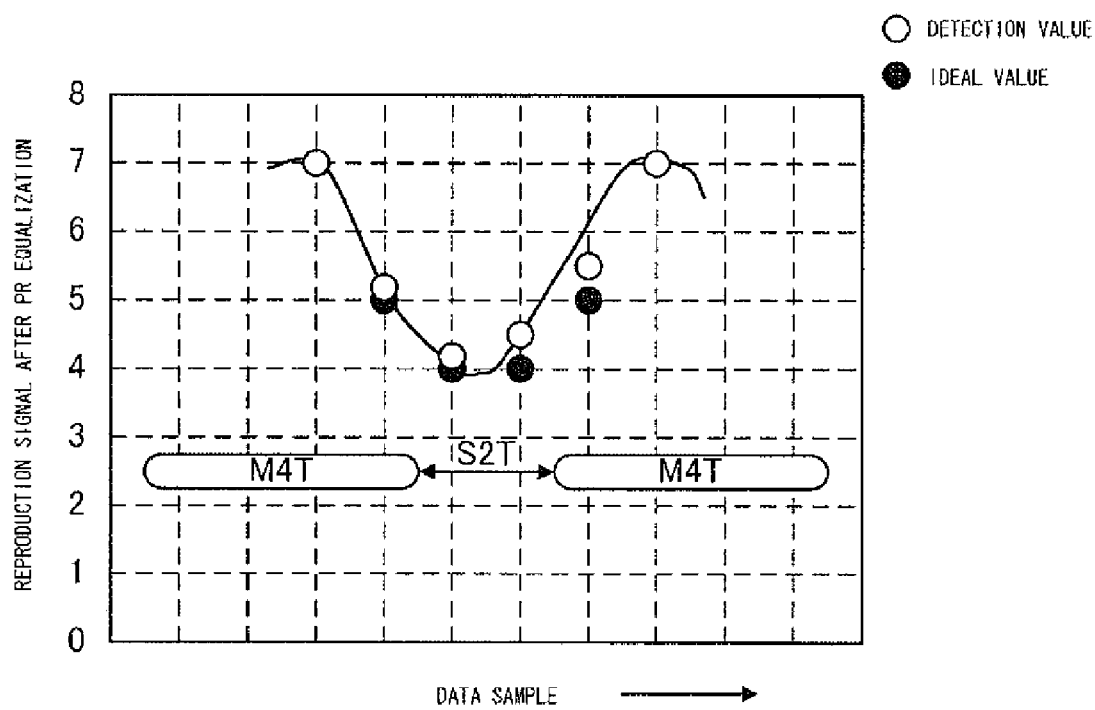
FIG. 56 is a conceptual drawing showing a comparative concept between a detected value and an ideal value.

FIG. 56 is a conceptual drawing showing a comparative concept between a detected value and an ideal value. FIG. 56 shows an example in which the PR (1, 2, 2, 2, 1) is used in the recording reproduction system in which a PRML signal processing unit shown in FIG. 1 is mounted. However, the invention is not limited thereto, and other means such as PR (1, 2, 2, 1) may be used.

FIG. 56 is on the basis of the media conditions in which the amount of reflective light at the record mark portion is larger than that at the space portion. However, the invention is not limited thereto, and the media conditions in which the amount of the reflective light at the record mark portion is smaller than that at the space portion are also acceptable.

FIG. 56 shows an example of a pattern including a space S2T having a length of 2 T and marks M4T having a length of 4 T arranged on both sides thereof. However, the invention is not limited thereto, and it may be a pattern according to conditions for performing evaluation or correction.

In the case of the pattern condition shown in FIG. 56, the ideal signal after the PR equalization will be " . . . 7_5_4_4_5_7 . . . ". In contrast, the actual detected signal will have a reference from the ideal state depending on the type of the drive and the media and the recording conditions. Therefore, the amount of reference with respect to the aforementioned ideal state is quantified using a deriving expression shown below to evaluate the recording state. The aforementioned evaluation index for quantization is referred to as PRerror in the description.

$$PRerror[cnt]=[\Sigma\{(\text{detected value}-\text{ideal value})^2\}/N]^{(1/2)}$$

Here, cnt in the expression shown above represents the number of times of detection in a predetermined patterns, and hence cnt[number] pieces of effective data is obtained in the sampling data having a predetermined length. It is preferable to obtain an average value from a plurality (cnt) of derived value for deriving a final PRerror value considering the effect of variations in recording or detection.

In the expression shown above, N represents the number of the sampling data used for one detection, and, in the example shown in FIG. 56, N equal 4; "N=4" since a case in which the PRerror values are derived only at four points "5_4_4_5" from the pattern of " . . . 7_5_4_4_5_7 . . . " is exemplified. The set values of "cnt" or "N" may be varied according to the detection pattern, the recording conditions, the detected results, and the like so that adequate and stable PRerror value is derived.

The expression shown above and the method of calculation are representative examples. The invention is not limited thereto as long as the object to evaluate the state of the recording signal is achieved, and similar means may be used.

An example in which the recording conditions are set using the index value PRerror obtained by the expression shown above is described. Although an example in which the rising phase (Ttopr in FIGS. 53 and 54) of the top pulse 12 shown in FIG. 9 is set is described below, the invention is not limited thereto, and the index value PRerror may be used for setting other conditions of write pulse such as a dropping phase (Tlastf in FIGS. 53 and 54) of the last pulse 16 shown in FIG. 9, the intermediate pulse 15 or a cooling pulse, not shown, and may also be used for setting the recording power conditions PW, PWD.

Figure 57:
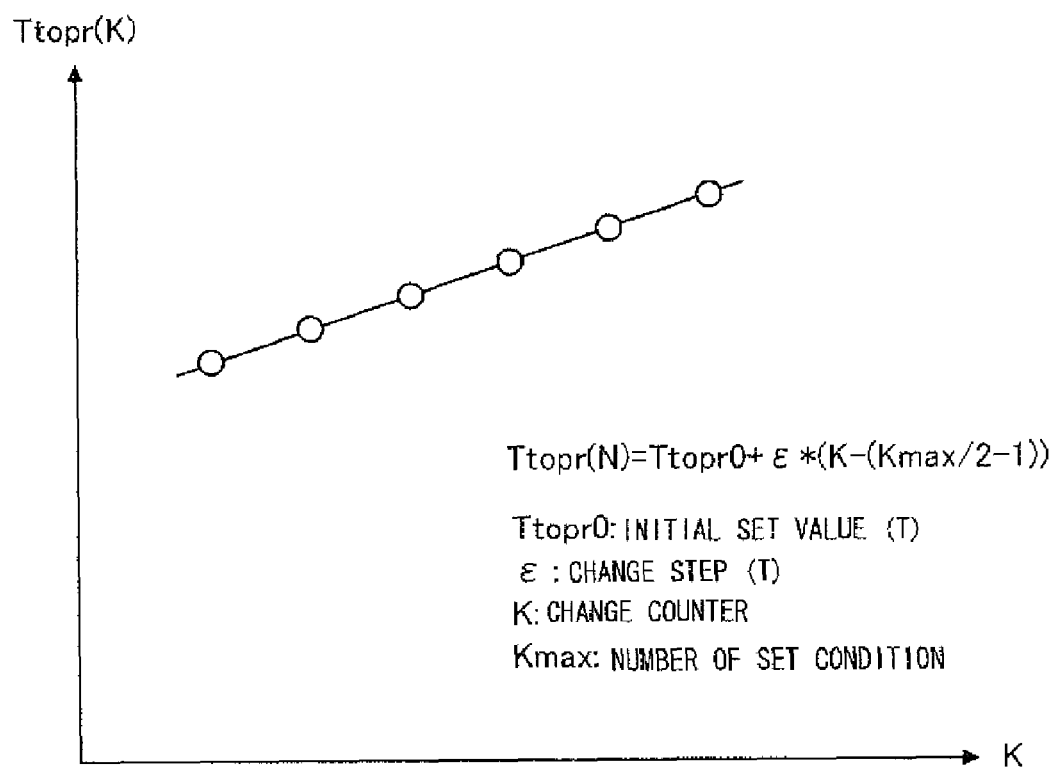
FIG. 57 is a conceptual drawing showing an example of the change of the recording conditions used for obtaining a PRerror value.

FIG. 57 is a conceptual drawing showing an example of the change of the recording conditions used for obtaining the PRerror value. As shown in FIG. 57, when obtaining the PRerror value corresponding to the rising phase Ttopr of the top pulse, the test recording is performed under a predetermined number Kmax of the Ttopr conditions Ttopr(K) and the points recorded under the respective recording conditions are reproduced, so that the PRerror value is obtained through the method of derivation using the expression shown below.

$$PRerror[cnt] = [\Sigma\{(\text{detected value} - \text{ideal value})^2\}/N]^{(1/2)}$$

In the example shown in FIG. 57, Ttopr(K) is calculated with the expression shown below while incrementing the value of K under the condition of "Kmax=6", so that PRerror value associated with the change of the recording condition Ttopr is obtained.

$$Ttopr(N) = Ttopr0 + \epsilon*(K - (Kmax/2 - 1))$$

where, Ttopr0 represents an initial set value, $\epsilon$ represents a change step, K represents a change counter, and Kmax represents the number of set conditions.

Figure 58:
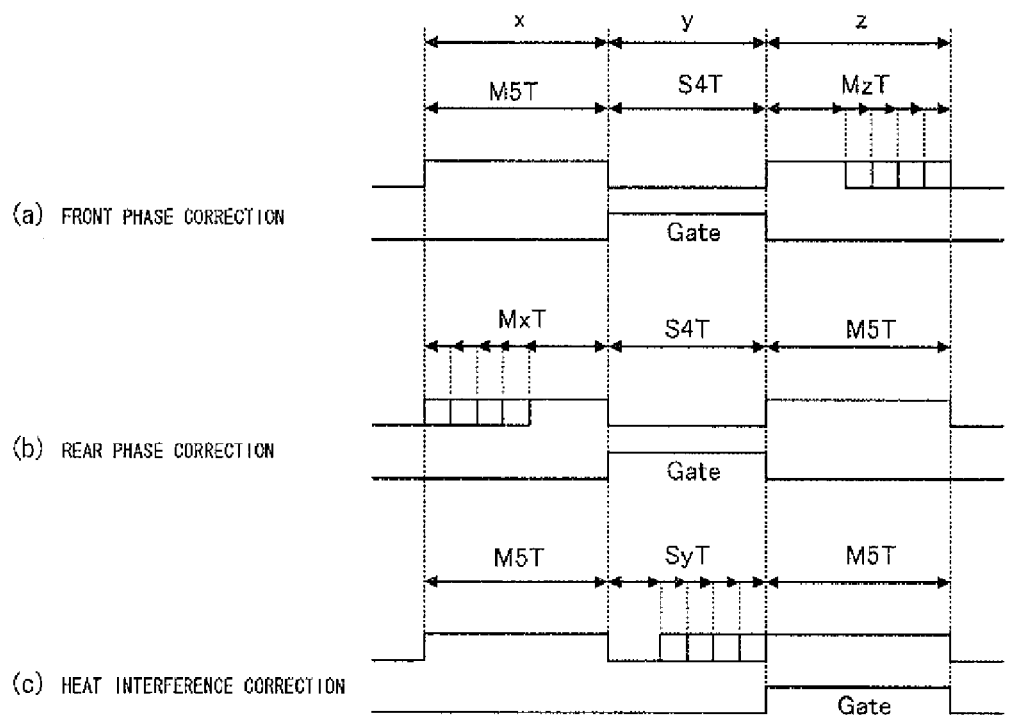
FIG. 58 is a conceptual drawing showing an example of a detection pattern used in a case in which the phase shift correction and the heat interference correction are performed under the concept of the change of the recording conditions shown in FIG. 57.

FIG. 58 is a conceptual drawing showing an example of a detection pattern used in a case in which the phase shift correction and the heat interference correction are performed under the concept of the change of the recording conditions shown in FIG. 57. As shown in the part indicated by (a) in FIG. 58, in the case of front phase correction, in a specified pattern including a row of continuous codes of xyz, the portion for detection y specified by the gate signal Gate shown in FIG. 2 is set to be 4 T spaces, and a preceding mark x is set to have a fixed length mark (preferably, 5 T or longer), and the following mark z is set to be a variable length mark of MzT (z=2 to 11).

Then, the test recording by the specified pattern is performed and the front end portions which correspond to the start positions of the laser radiation of the respective following marks 2 T to 11 T are adjusted on the basis of the amplitude change obtained by reproducing 4 T spaces for detection. At this time, it is preferable to set a code whose signal modulation is almost equivalent to a rarefaction mark such as 11 T, for example, 8 T as a reference mark, and determine the difference as the amount of amplitude shift.

In the case of rear phase correction shown in the part indicated by (b) in FIG. 58, in a specified pattern including a row of continuous codes of xyz, the portion for detection y specified by the gate signal Gate is set to be 4 T spaces, and the following mark z is set to have a fixed length mark (preferably, 5 T or longer), and the preceding mark x is set to be a variable length mark of MzT (z=2 to 11).

Then, the test recording by the specified pattern is performed and the rear end portions which correspond to the end positions of the laser radiation of the respective following marks 2 T to 11 T are adjusted on the basis of the amplitude change obtained by reproducing 4 T spaces for detection. At this time, it is preferable to set a code whose signal modulation is almost equivalent to a rarefaction mark such as 11 T, for example, 8 T as a reference mark, and determine the difference as the amount of amplitude shift.

In the case of heat interference correction shown in the part indicated by (c) in FIG. 58, in a specified pattern including a row of continuous codes of xyz, the portion of detection z specified by the gate signal Gate is set to be 5 T mark, and the preceding space y is set to be a variable length mark of MzT (z=2 to 11), and the preceding mark x is set to have a fixed length mark (preferably, 5 T or longer).

Then, the test recording by the specified pattern is performed and the front end portions which correspond to the start positions of the laser radiation of the marks 2 T to 11 T are adjusted on the basis of the amplitude change obtained by reproducing 5 T marks for detection. At this time, it is preferable to set a code whose signal modulation is almost equivalent to a rarefaction mark such as 11 T, for example, 5 T as a reference mark, and determine the difference as the amount of amplitude shift.

Figure 59:
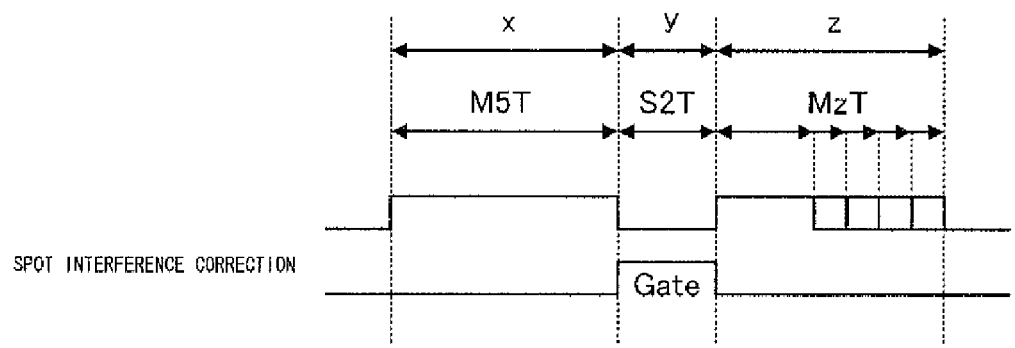
FIG. 59 is a conceptual drawing showing an example of a detection pattern used in a case in which spot interference correction is performed under the concept of the change of the recording conditions shown in FIG. 57.

FIG. 59 is a conceptual drawing showing an example of a detection pattern used in a case in which spot interference correction is performed under the concept of the change of the recording conditions shown in FIG. 57. As shown in FIG. 59, in the case of the spot interference correction, in a specific pattern including a row of continuous codes of xyz, the portion for detection y specified by the gate signal Gate shown in FIG. 2 is set to be 2 T spaces, and a preceding mark x is set to have a fixed length mark (preferably, 5 T or longer), and the following mark z is set to be a variable length mark of MzT (z=2 to 11).

Then, the test recording by the specified pattern is performed and the front end portions which correspond to the start positions of the laser radiation of the respective following marks 2 T to 11 T are adjusted on the basis of the amplitude change obtained by reproducing 2 T spaces for detection. At this time, it is preferable to set a code whose signal modulation is almost equivalent to a rarefaction mark such as 11 T, for example, 8 T as a reference mark, and determine the difference as the amount of amplitude shift.

The effect of the preceding marks may be obtained by counterchanging the conditions between the preceding marks and the following marks, or the effects of both the following marks and the preceding marks may be obtained. It is also possible to counterchange the mark condition and the space condition to obtain the effect on the mark portion in which the portion for detection y is set to be 2 T mark, or obtain both of them. The sample value used for deriving PRerror may only be the code of the amplitude detection signal or may include adjacent codes as shown in FIG. 56.

Figure 60:
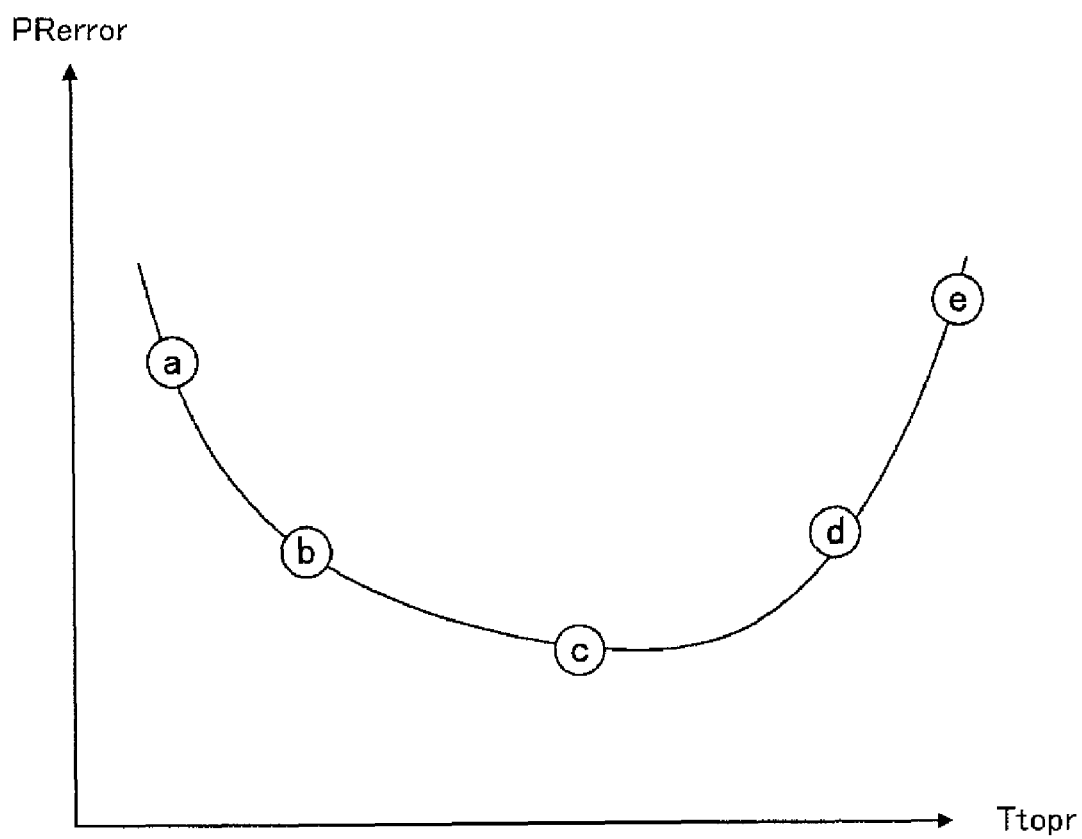
FIG. 60 is a conceptual drawing showing a concept of derivation of optimum recording conditions using the change of the PRerror value.

FIG. 60 is a conceptual drawing showing a concept of derivation of the optimum recording conditions using the change of the PRerror value. As shown in FIG. 60, the PRerror value derived in association with the change of the recording conditions indicates the change having an extreme value shown by a sign "c", and the extreme value is preferably selected as the optimum Ttopr.

The method of determining the optimum value in one embodiment is not limited thereto, and it is also possible to take the change of PRerror value with respect to Ttopr condition as an approximation function to calculate the Ttopr condition which assumes the extreme value, or to determine Ttopr condition so as to be a preset target value or a value close thereto.

Figure 61:
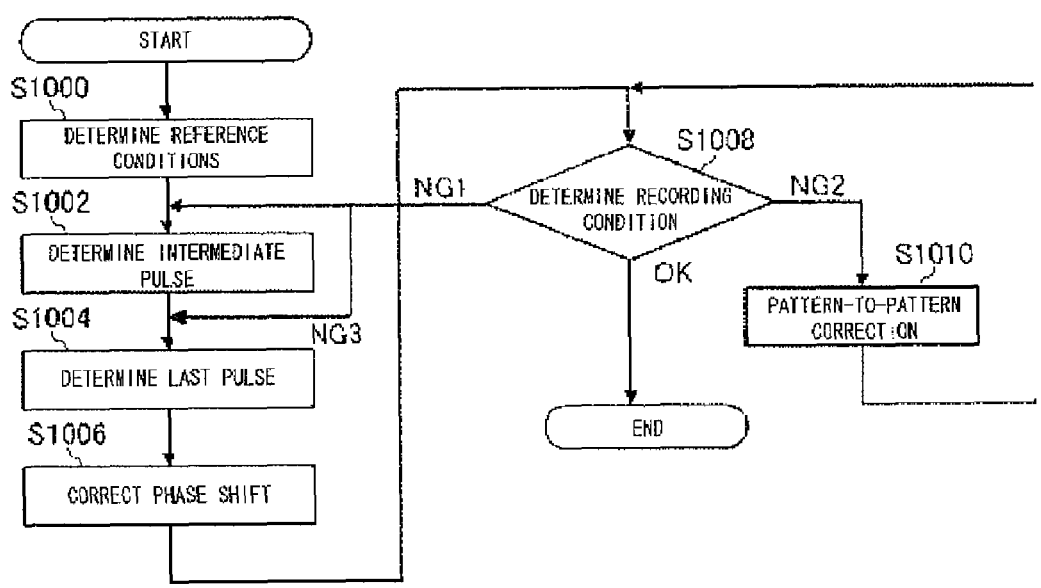
FIG. 61 is a flowchart showing a procedure to determine the conditions of the write pulse considering achievement both the improvement of the recording characteristics and reduction of the required time.

FIG. 61 is a flowchart showing a procedure to determine the conditions of the write pulse considering achievement both the improvement of the recording characteristics and reduction of the required time. As shown in FIG. 61, when determining the conditions of the write pulse according to this procedure, the reference conditions of the write pulse corresponding to the respective codes are determined first (Step S1000). The determination of the reference conditions is achieved by obtaining the conditions under which the jitter of 2 T code becomes minimum by adjusting the power and the width of the top pulse.

Subsequently, the recording conditions of the intermediate pulse are determined by performing the test recording using the reference conditions (Step S1002). Setting the condition of the intermediate pulse is achieved by adjusting the power of the intermediate pulse in the case of the single pulse, and adjusting the width of the divided pulses which constitute the intermediate pulse in the case of the multi-pulse, and obtaining conditions under which the asymmetry 2T11T becomes a predetermined value.

Subsequently, the recording conditions of the last pulse are determined by performing the test recording using the reference conditions obtained in Step S1000 and the intermediate pulse obtained in Step S1002 (Step S1004). Setting the condition of the last pulse is achieved by adjusting the width of the last pulse in a state in which the conditions of the intermediate pulse are fixed to predetermined conditions and obtaining the conditions under which the asymmetry 2T3T becomes a predetermined value.

Since the conditions of the write pulse are determined by performing the Steps S1000 to S1004, the phase shift correction of the write pulse is performed by further performing the test recording using the write pulse (Step S1006). The phase shift correction is performed by adjusting the start position and end position of the write pulse, and obtaining the conditions under which PRerror value becomes minimum or a smaller value.

Subsequently, the recording state from the result obtained by performing the test recording under the determined recording conditions is determined (Step S1008) and, when the result of determination does not reach an allowable value, whether to perform determination of the recording conditions again (NG1 in Step S1008), or to perform pattern-to-pattern correction (NG2 in Step S1008) is selected according to the result.

In other words, in this procedure, it is not necessary to perform all the adjustment parameters and, for example, when a plurality of adjustment processes exist as shown in FIG. 61, it is also possible to provide a process of confirming the recording state from the index values such as PRerror value or the asymmetry value in the final stage of the operation of some or all the adjustment parameters and stop the adjustment operation when a predetermined target level is satisfied, whereby the time required for adjustment may be reduced while securing the sufficient recording characteristics.

The determination of the recording state in Step S1008 is preferably performed by checking the asymmetry 2T3T, the asymmetry 2T11T, the asymmetry 3T11T, pre-heat, post-heat, pattern shift, and PRerror value, and the allowable values of the respective indices such as the asymmetry or PRerror value are preferably stored for each drive.

Figure 62:
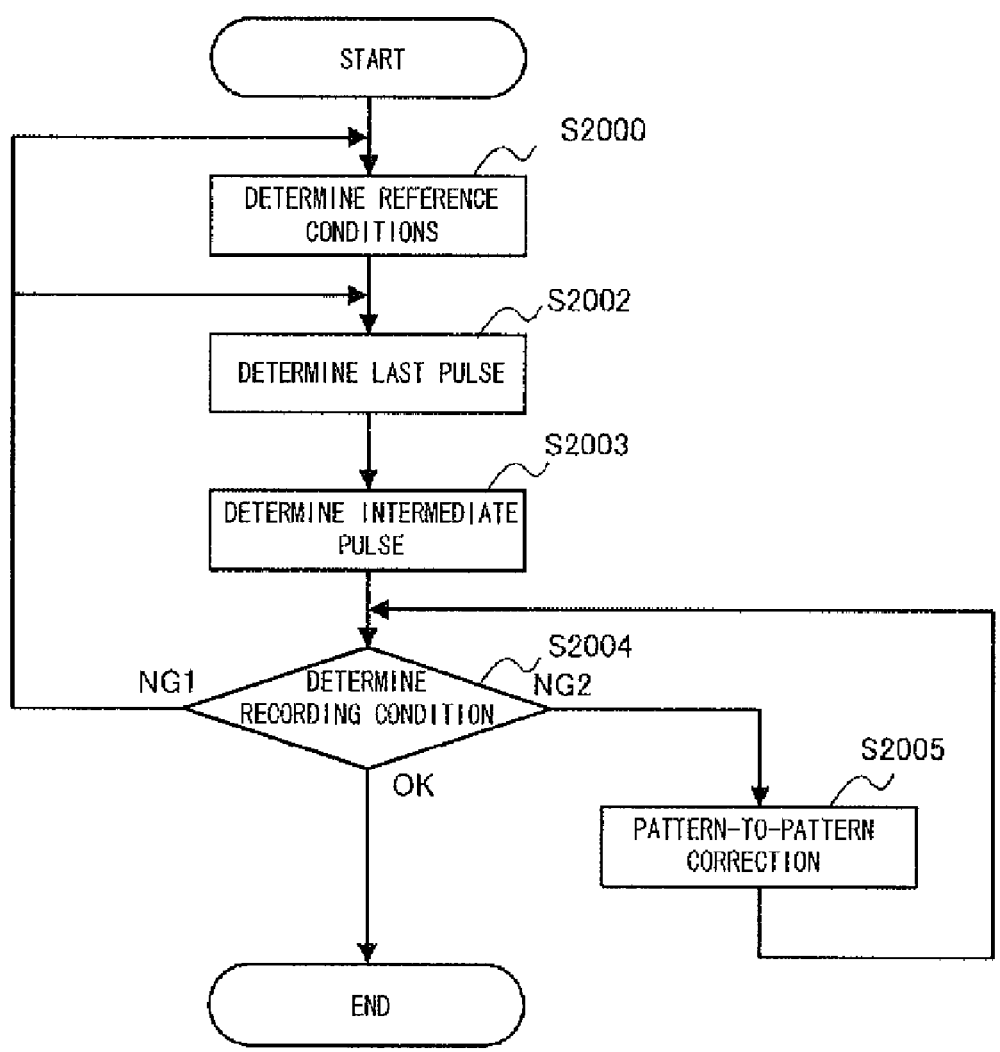
FIG. 62 is another flowchart showing a procedure to determine the conditions of the write pulse considering achievement both the improvement of the recording characteristics and reduction of the required time.

FIG. 62 is another flowchart showing a procedure to determine the conditions of the write pulse considering achievement both the improvement of the recording characteristics and reduction of the required time. In FIG. 62, the intermediate pulse is determined after having determined the last pulse (Steps S2000 to S2003), and then the recording state is determined (Step S2004). Then, according to the result, whether to perform the determination of the recording conditions (Step S2000 or Step S2002) again (NG1 in Step S2004) or to perform pattern-to-pattern correction (NG2 in Step S2004) is selected according to the result. Other processes are the same as those shown in a flowchart in FIG. 61.

Although the description given above is for the HD-DVD system, it may be applicable to Blu-ray system or the like.

In the example described above, the example in which the indices are changed in the respective steps has been described. However, arbitrary indices may be employed in the respective steps such as to employ the error rate or PRerror value in all the steps as the indices, or to employ the error rate for adjustment of the reference conditions, employ the asymmetry for the adjustment of the last pulse and the intermediate pulse, and employ the amount of the amplitude shift for the phase shift correction.

According to one embodiment, not only that the recording conditions which are closer to the optimum condition may be obtained even though the media is unknown for the drive, but also the recording conditions which are closer to the optimum conditions corresponding to the change in recording environment, such as the recording velocity, the disturbance and the change with time, and the piece-to-piece variations of the drive may be obtained even for the known media. Therefore, compatibility to further severe recording environment is expected.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An optical information recording method in an optical recording regeneration method for performing recording and reproduction of information by radiating laser light which is pulse-modulated according to a recording waveform having a plurality of setting parameters onto an optical storage medium comprising:

reading information recorded in the storage medium;

determining positions corresponding to a detection pattern from the detection pattern and a reproduction signal, the detection pattern being defined according to a specific parameter from among the plurality of setting parameters, and the reproduction signal being obtained by reading the information;

detecting the state of the reproduction signal according to the result of the determination;

generating an ideal reproduction signal according to the detection pattern; and obtaining a predetermined signal evaluation index value using the result of detection of the state of the reproduction signal and the ideal reproduction signal.

2. The optical information recording method according to claim 1, further comprising controlling the specific parameter using the evaluation index value.

3. The optical information recording method according to claim 2, wherein the control of the specific parameter is achieved by changing the conditions of the specific parameter so that the evaluation index value becomes smaller.

4. The optical information recording method according to claim 2, wherein control of the specific parameter is achieved by changing conditions of the specific parameter so that the evaluation index value satisfies a predetermined target level or a predetermined allowable range.

5. The optical information recording method according to claim 1, wherein the specific parameter is a laser power intensity condition.

6. The optical information recording method according to claim 1, wherein the specific parameter is a write pulse width condition.

7. The optical information recording method according to claim 1, wherein the specific parameter is a start position and/or an end position of the laser radiation.

8. The optical information recording method according to claim 1, wherein the reproduction signal is a digital signal obtained by sampling light returned from the storage medium at a predetermined frequency.

9. The optical information recording method according to claim 1, wherein the reproduction signal is a signal obtained by applying a waveform equalizing process to the digital data obtained by sampling light returned from the storage medium at a predetermined frequency.

10. The optical information recording method according to claim 1, wherein the detection pattern is a code pattern having one or more marks and space periods.

11. The optical information recording method according to claim 1, wherein the determining of the positions corresponding to the detection pattern outputs a detection instruction signal as a result, and the detection instruction signal is a gate signal comprising the positions corresponding to the detection pattern.

12. The optical information recording method according to claim 1, wherein the ideal reproduction signal is an ideal signal corresponding to the reproduction signal obtained when the mark and the space corresponding to the detection pattern are recorded accurately in the storage medium.

13. The optical information recording method according to claim 1, wherein the signal evaluation index value is an evaluation index obtained by quantizing the amount of reference of the detection signal with respect to the ideal signal.

14. The optical information recording method according to claim 1, wherein the signal evaluation index value is an evaluation index showing the possibility that the detection signal is recognized as a code pattern different from the one actually recorded.

15. A computer readable medium having stored therein a program for causing a circuit to perform the method according to claim 1.

16. The medium according to claim 15, wherein the medium is an optical information recording medium.

17. The medium according to claim 16, wherein a target value and/or an allowable range of the signal evaluation index value is recorded in advance.

18. An optical information regeneration recorder in an optical recording reproduction device for performing recording and reproduction of information by radiating laser light which is pulse-modulated according to a recording waveform having a plurality of setting parameters onto a storage medium, the recorder comprising:
    an optical drive configured to read information recorded in the storage medium;
    a determining circuit configured to determine positions corresponding to a detection pattern from the detection pattern and a reproduction signal, the detection pattern being defined according to a specific parameter from among the plurality of setting parameters, and the reproduction signal being obtained by reading the information;
    a detecting circuit configured to detect the state of the reproduction signal according to the result of the determination;
    a generating circuit configured to generate an ideal reproduction signal according to the detection pattern; and
    a obtaining circuit configured to obtain a predetermined signal evaluation index value using the result of detection of the state of the reproduction signal and the ideal reproduction signal.

19. The optical information regeneration recorder according to claim 18, further comprising a display configured to display at least one of a value obtained in a process of obtaining the evaluation index value, the recording conditions, the quality of the storage medium, and the result of processing.

20. The optical information regeneration recorder according to claim 18, further comprising a storage device configured to store at least one of the recording reproduction setting condition used in a process of obtaining the evaluation index value, an obtained characteristic value, a calculated evaluation parameter value, the amount of laser power correction, storage medium positional information, temperature information, moisture information and the result of processing.

21. The optical information regeneration recorder according to claim 18, further comprising a registering circuit configured to for register a target value and/or an allowable range of the signal evaluation index value in advance.

22. A signal processing circuit suitable for being integrated in an optical recording reproduction device for performing recording and reproduction of information by radiating laser light which is pulse-modulated according to a recording waveform having a plurality of setting parameters onto a storage medium, comprising:
    a reading device configured to read information recorded in the storage medium;
    a determining device configured to determine positions corresponding to a detection pattern from the detection pattern and a reproduction signal, the detection pattern being defined according to a specific parameter from among the plurality of setting parameters, and the reproduction signal being obtained by reading the information;
    a detecting device configured to detect the state of the reproduction signal according to the result of the determination;
    a generating device configured to generate an ideal reproduction signal according to the detection pattern; and
    a obtaining device configured to obtain a predetermined signal evaluation index value using the result of detection of the state of the reproduction signal and the ideal reproduction signal.

23. A system for performing recording and reproduction of information by radiating laser light which is pulse-modulated according to a recording waveform having a plurality of setting parameters onto a storage medium comprising:

means that reads information recorded in the storage medium;

means that determines positions corresponding to a detection pattern from the detection pattern and a reproduction signal, the detection pattern being defined according to a specific parameter from among the plurality of setting parameters, and the reproduction signal being obtained by reading the information;

means that detects the state of the reproduction signal according to the result of the determination;

means that generates an ideal reproduction signal according to the detection pattern; and means that obtains a predetermined signal evaluation index value using the result of detection of the state of the reproduction signal and the ideal reproduction signal.

* * * * *

UNITED STATES PATENT AND TRADEMARK OFFICE
CERTIFICATE OF CORRECTION

PATENT NO. : 7,652,961 B2  
APPLICATION NO. : 11/757144  
DATED : January 26, 2010  
INVENTOR(S) : Kakimoto et al.

Page 1 of 1

It is certified that error appears in the above-identified patent and that said Letters Patent is hereby corrected as shown below:

Column 6, Line 52, after "PRML" insert --which--.

Column 15, Line 60, change "22B." to --12B.--.

Column 36, Line 22, change "(e)" to --(c)--.

Column 42, Line 21, change "5 T" to --T--.

Column 46, Line 37 (approx.), in Claim 21, before "register" delete "for".

Signed and Sealed this

Twentieth Day of July, 2010

David J. Kappos  
*Director of the United States Patent and Trademark Office*